(12) United States Patent
Corcillo et al.

(10) Patent No.: US 11,790,334 B1
(45) Date of Patent: Oct. 17, 2023

(54) BLOCKCHAIN SUPPORTED RESOURCE TRANSFER COMMUNICATION PROTOCOL

(71) Applicant: Block, Inc., San Francisco, CA (US)

(72) Inventors: Rebecca Corcillo, San Francisco, CA (US); Emily Chiu, San Francisco, CA (US); Moiz Jangda, Austin, TX (US); Megan Coleman, San Francisco, CA (US); Tianlong Yun, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 18/090,039

(22) Filed: Dec. 28, 2022

Related U.S. Application Data

(60) Provisional application No. 63/348,571, filed on Jun. 3, 2022.

(51) Int. Cl.
  *G06Q 20/10* (2012.01)
  *G06Q 20/36* (2012.01)
  *G06Q 20/38* (2012.01)
  *G06Q 20/40* (2012.01)
  (Continued)

(52) U.S. Cl.
  CPC ......... *G06Q 20/10* (2013.01); *G06Q 20/3678* (2013.01); *G06Q 20/381* (2013.01);
  (Continued)

(58) Field of Classification Search
  CPC .. G06Q 20/10; G06Q 20/3678; G06Q 20/381; G06Q 20/3821; G06Q 20/3827; G06Q 20/3829; G06Q 20/389; G06Q 20/4016; G06Q 20/42; G06Q 30/0611; G06Q 2220/00
  (Continued)

(56) References Cited

U.S. PATENT DOCUMENTS

| 11,063,770 B1* | 7/2021 | Peng | G06F 21/64 |
| 11,410,214 B2* | 8/2022 | Tardiou | H04L 9/50 |

(Continued)

OTHER PUBLICATIONS

* Vincent et al. "Blockchain or EDI", https://sfmagazine.com/articles/2020/june/blockchain-or-edi/?psso=true, Jun. 1, 2020, 19 pages (Year: 2020).*

(Continued)

*Primary Examiner* — James D Nigh
(74) *Attorney, Agent, or Firm* — FIG. 1 Patents

(57) ABSTRACT

Blockchain supported resource transfer communication protocol techniques are described. In an implementation, a semantic message is received encoding parameters to be implemented as part of a resource transfer involving a digital wallet. A quote is generated specifying attributes as part of implementing communication connections to perform the resource transfer in compliance with the parameters specified by the semantic message. An acceptance message is received indicating acceptance of the quote, the acceptance message including credentials of the digital wallet. Generation is initiated of an application executable as part of a blockchain as complying with the parameters and the attributes. Data describing the application as executable as part of the blockchain is transmitted for distribution to the digital wallet. The resource transfer is initiated through execution of the application as part of the blockchain.

20 Claims, 24 Drawing Sheets

(51) Int. Cl.
*G06Q 20/42* (2012.01)
*G06Q 30/06* (2023.01)
*G06Q 30/0601* (2023.01)

(52) U.S. Cl.
CPC ....... *G06Q 20/389* (2013.01); *G06Q 20/3821* (2013.01); *G06Q 20/3827* (2013.01); *G06Q 20/3829* (2013.01); *G06Q 20/4016* (2013.01); *G06Q 20/42* (2013.01); *G06Q 30/0611* (2013.01); *G06Q 2220/00* (2013.01)

(58) Field of Classification Search
USPC ......................................................... 705/69
See application file for complete search history.

(56) References Cited

U.S. PATENT DOCUMENTS

2018/0341910 A1* 11/2018 Broveleit ............... G06Q 50/28
2019/0385215 A1* 12/2019 Ferenczi ................ G06Q 20/12
2023/0015535 A1* 1/2023 Smeltzer ............... G06Q 30/08

OTHER PUBLICATIONS

• Danford "Can Blockchain Help Machine Shops Win Work?", Modern Machine Shop, Oct. 18, 2018, pp. 75-81 (Year: 2018).*
• Fiaidhi et al. "EDI with Blockchain as an Enabler for Extreme Automation", IT Professional published by the IEEE Computer Society, Jul./Aug. 2018, 7 pages (Year: 2018).*
• Lopez-Pintado et al. "Caterpillar: A Business Process Execution Engine on the Ethereum Blockchain", retrieved from arXiv: 1808.03517v3, Apr. 22, 2019, 32 pages (Year: 2019).*

* cited by examiner

BLOCKCHAIN SUPPORTED RESOURCE TRANSFER COMMUNICATION PROTOCOL

TECHNICAL FIELD

This application claims priority under 35 U.S.C. 119(e) to U.S. Provisional Application No. 63/348,571, filed Jun. 3, 2022, the entire disclosure of which is hereby incorporated by reference.

TECHNICAL FIELD

Blockchain networks provide a variety of functionality in connection with implementing and securely transferring various digital assets, examples of which include cryptocurrencies and blockchain-based tokens, such as tokens for "smart contracts" implemented as part of a distributed state machine. Additional functionality has been developed that leverage blockchain networks.

BRIEF DESCRIPTION OF THE DRAWINGS

One or more embodiments of the disclosed technologies are illustrated by way of example and are not limited by the figures of the accompanying drawings, in which like references indicate similar elements.

DETAILED DESCRIPTION

Figure 1:
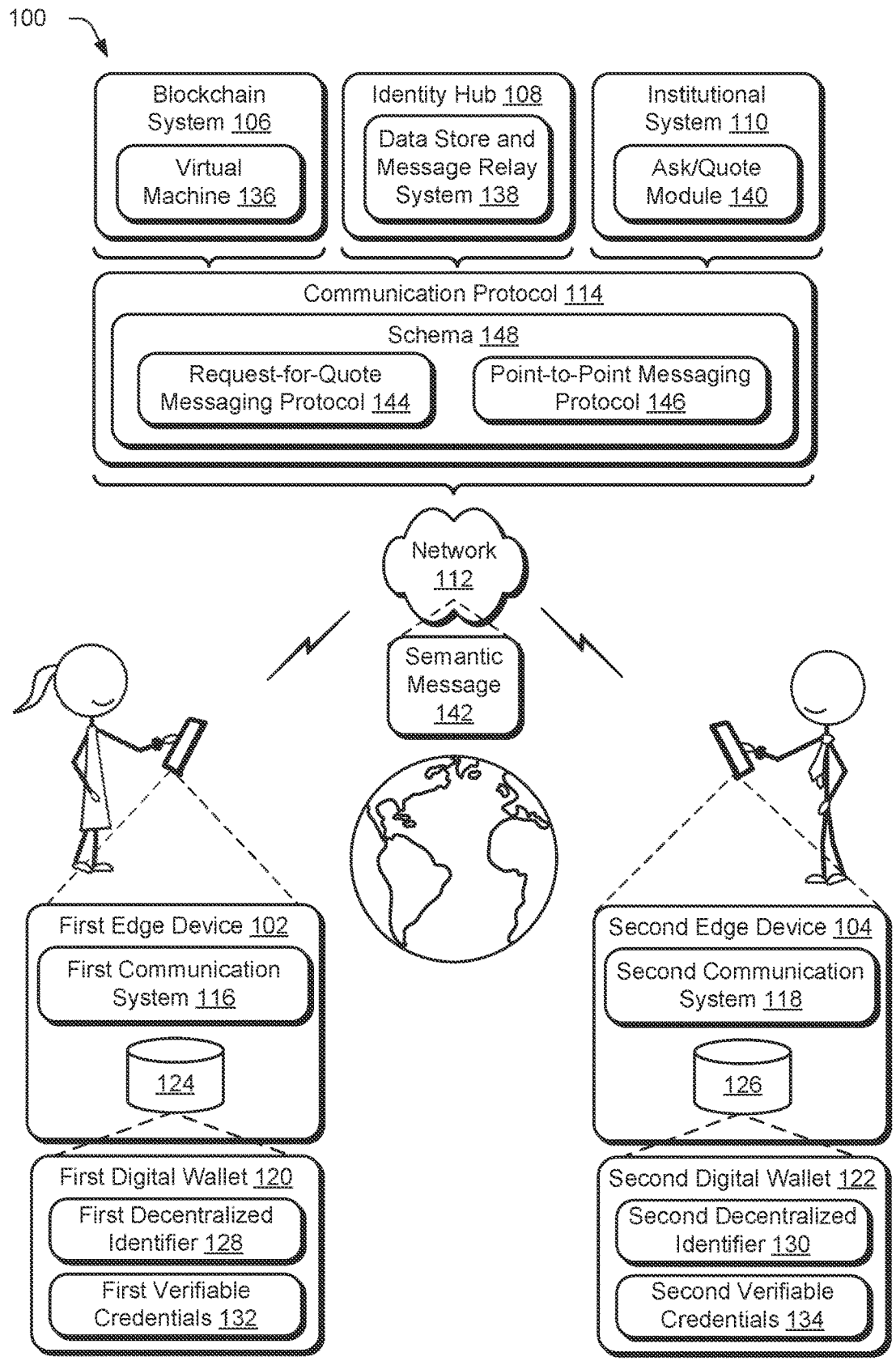
FIG. 1 is a non-limiting illustration of an example system that is operable to implement blockchain supported resource transfer communication protocol techniques described herein, according to an embodiment of the present subject matter.

Conventional techniques involved in an exchange of resources as part of blockchains and other crypto technologies are beyond the reach of a significant number of everyday users. For example, access to cryptocurrency typically involves interaction with a centralized exchange. Accessing decentralized systems in these conventional usage scenarios also involves multiple asset transfers and transactions fees for a significant number of steps, each introducing an additional amount of latency in performing the transfer and corresponding resource consumption. Additionally, complexity and lack of insight into this process is a significant barrier to entry, and further, conventional techniques do not support transfer of different types of resources, directly, by these systems.

Accordingly, in some implementations, a communication protocol as described herein addresses these challenges through use of blockchain support as part of a resource transfer. To do so, the communication protocol provides a framework for creating and using on-ramps and off-ramps from institutional systems using fiat resources and blockchain systems implementing cryptocurrencies and other cryptographic assets. Further, this is performable separate from centralized exchanges and affords secure exchange of identity. The communication protocol also supports mechanisms to ensure compliance with laws and regulations potentially involved in the resource transfer.

To do so, a "request-for-quote" and "quote" mechanism is supported by the communication protocol to enable users to request quotes from institutional systems to perform a resource transfer. A quote is then selected and executed by the institutional systems in communication with the sender involved in the resource transfer to "on ramp" funds to a recipient. The recipient then utilizes "off ramp" functionality to transfer the funds to a desired definition, also through use of a "request-for-quote" and "quote" mechanism. In an implementation, stable coins are used as an intermediary to support resource transfers across boundaries (e.g., geographic boundaries, political boundaries, linguistic boundaries, temporal boundaries, etc.) and as such overcomes the challenges of conventional techniques.

The on-ramp and off-ramp mechanisms between edge devices of a user, institutional systems, and blockchain systems are implemented in an example without use of centralized intermediaries and traditional trust broker systems. This improves access, reduces resource transfer latency, and improves device operation that implements these techniques.

In some implementations, the communication protocol incorporates a schema that is employed as part of decentralized networks to support resource transfer. The communication protocol does so in an example by providing a framework for establishing social trust using a decentralized identity and verifiable credentials to establish provenance (e.g., chronology of ownership) of an identity. The communication protocol is configurable as being agnostic with respect to anonymity, thereby supporting participation as desired to negotiate and establish an amount of information that is acceptable to entities involved in the resource transfer once, for example identity is established.

Accordingly, in some implementations, the communication protocol as described herein, addresses these challenges through use of blockchain support as part of a resource transfer, e.g., use of stable coins or other cryptocurrency as an intermediary. To do so, the communication protocol provides a framework for creating and using on-ramps and off-ramps from institutional systems using fiat resources and blockchain systems implementing cryptocurrencies and other cryptographic assets. Further, this is performable separate from centralized exchanges and affords secure exchange of identity. The communication protocol also supports mechanisms to ensure compliance with laws and regulations potentially involved in the resource transfer.

The communication protocol, for instance, is configurable to employ decentralized identifiers through a public key infrastructure (PKI) that is usable to secure communication between entities. Decentralized identifiers in this example support verifiable, decentralized digital identity. As such, decentralized identifiers are configurable as part of the communication protocol to refer to a variety of different entity types (e.g., a user, organization, institution, data model, thing, abstract entity, and so forth) as determined by a controlling entity of the decentralized identifier. This is in contrast to typical federated identifiers, in that, decentralized identifiers are decoupled from centralized registries, identity providers, and certificate authorities.

Decentralized identifiers (DIDs) are configurable as uniform resource identifiers (URIs) that associate a DID subject with a DID document, thereby supporting trustworthy interactions associated with that subject. Decentralized identifier (DID) documents, which are linked to the decentralized identifiers, are configurable as a metadata file that includes a variety of data elements, examples of which include cryptographic material and routing endpoints. Use of decentralized identifiers by the communication protocol supports functionality that is open, public, and permissionless, censorship resistant, and is tamper resistant. Further, the communication protocol is not reliant on authorities, trusted third parties, or entities that cannot be displaced through competitive market processes.

In some implementations, credentials are also used as part of the communication protocol, examples of which are verifiable credentials stored using digital wallets. These credentials are configured as cryptographically secure, respect privacy, and are machine verifiable. Inclusion of a zero-knowledge proof, for instance, is usable to further advance privacy and safety by preventing an ability to link across disclosures, reduces an amount of data that is discoverable, and reduces raw data value exposure.

As described herein, the communication protocol leverages a system that includes edge devices of respective users, i.e., devices positioned at an "edge" of a network implemented by the protocol. The communication protocol also employs a variety of additional entities, examples of which include a blockchain system, an identity hub implementing a data store and message relay system, and institutional systems.

In some implementations, the identity hub provides an interface to store, discover, and fetch data related to communications involved in a resource transfer supported by the communication protocol. The data store and message relay system of the identity hub, for instance, is usable to locate public or permissioned private data related to a particular decentralized identifier. The identity hub is configurable as having a mesh-like datastore construction that supports an entity to operate multiple instances that synchronize to a same state across one another. This provides an entity that is associated with the decentralized identity with an ability to secure, manage, and transact data with other entities without reliance on location or provider-specific infrastructure, interfaces, or routing mechanisms.

The identity hub supports use of a semantically encoded message and respective data interfaces (e.g., as inferential application programming interfaces (APIs)) that are accessible without direct knowledge of a semantic type of data that is to be exchanged. A diverse set of interactions and flows are modeled within these interfaces by externally codifying sets of message schemas and processing directives to form corresponding protocols.

The semantic message, for instance, employs a schema supporting a naming convention of the datatypes of objects included in the message. This enables entities that receive the semantic message to readily parse the message using the schema, e.g., to determine whether the semantic message is of interest to the entity and process it accordingly. Use of the schema helps support the distributed architecture of the communication protocol. For example, the identity hub is configured to identify, through semantics of the message, and process/forward the semantic message to a respective institutional system which can then also process the semantic message based on the schema. As part of this, the semantic message is signed by each entity through the process as part of a point-to-point messaging protocol of the communication protocol.

Digital wallets act as agents for individuals or institutions by facilitating exchanges, e.g., between edge devices and institutional systems. As such, digital wallets are configurable to support a variety of functionalities. Digital wallets, for instance, support secure encrypted storage for verifiable credentials. Digital wallets also support discovery of an institutional system by crawling a decentralized identity directory space. Digital wallets also support mechanisms for receiving, offering, and presenting verifiable credentials used as part of the communication protocol. Further, digital wallets implement digital signature mechanisms and support an ability to store a transaction history. As a result, digital wallets are configurable to support seamless transfer of credentials between the digital wallets, and as such does not claim "ownership" of verifiable credentials. Additionally, operation of the digital wallets is consent driven by an entity associated with the digital wallet.

Functionality of the digital wallets operates to significantly simplify a user experience to perform a resource transfer, e.g., to move assets between fiat and cryptographic tokens. Entities using the communication protocol, for instance, are not involved as in conventional examples in techniques to first onboard through a separate, centralized exchange to procure cryptographic tokens with fiat payment instruments, before transferring those crypto assets into the digital wallets. The entities are also provided with an ability to leverage the communication protocol to off-ramp a resource maintained as cryptographic tokens back into fiat.

The communication protocol includes a plurality of communication layers, examples of which include a request-for-quote messaging protocol and a point-to-point messaging protocol. The request-for-quote messaging protocol is used by a digital wallet to broadcast an intent to engage in a resource transfer. This intent is broadcast as a semantic message to seek an institutional system to engage in the resource transfer, e.g., to exchange fiat currency for in-kind cryptographic tokens such as stablecoins or other tokenized assets (e.g., non-fungible tokens, or "NFTs") or vice versa. Stablecoins, as leveraged as part of resource transfer, are available via a plurality of different blockchains, and bitcoin is configurable for settlement using a variety of solutions, such as Lightning (LBTC). For fiat currencies, settlement protocols are used include mechanisms such as single Euro payments area (SEPA), automated clearing house (ACH), payment cards, society for worldwide interbank financial telecommunication (SWIFT), or others.

The point-to-point messaging protocol is used to implement secure communication between a digital wallet and the institutional system, e.g., to exchange data used to negotiate and execute a resource transfer.

As described above, the communication protocol supports an "on-ramp" scenario and an "off-ramp" scenario. In the on-ramp scenario, a digital wallet is used to effectuate a resource transfer from one type of resource to another, e.g., fiat currency to cryptographic tokens. In an off-ramp scenario, a digital wallet is also used to effectuate a resource transfer from one type of resource to another, e.g., back from cryptographic tokens to a fiat currency. This is usable, for instance, to perform resource transfers across geographic boundaries without incurring transaction latencies and operational inefficiencies of devices involved in conventional centralized approaches.

In an example on-ramp scenario, a digital wallet generates requests-for-quote for a resource transfer, which are transmitted from the digital wallet for distribution to a plurality of institutional systems. The institutional systems parse a respective request-for-quote using a corresponding schema to identify objects included in the quote, e.g., a resource amount, resource type, and so forth. Based on this, the institutional system decides whether to participate in the resource transfer, and if so, generates a quote for transmission back to the digital wallet. The quote confirms compliance with the parameters in the request-for-quote, a resource amount to perform the transfer, credentials to be used to verify an identity of a user associated with the digital wallet, and other attributes.

The digital wallet then selects one of the quotes, and permission is requested from a user to share credentials specified in the selected quote. Upon receipt of a user input permitting the sharing of the credential, the credentials are transmitted to the selected institutional system, e.g., based on a corresponding decentralized identifier.

The institutional system verifies the credentials, and once verified, transmits a finalized quote for receipt by the digital wallet. A request is output by the digital wallet regarding whether to accept the finalized quote (e.g., via a user interface), and if so, a message is transmitted from the digital wallet to the second institutional system.

The institutional system, upon receipt of acceptance, initiates application execution by a blockchain system, e.g., a smart contract by a distributed state machine of the blockchain system. Application details are communicated from the institutional system to the digital wallet, which are then used to verify execution of the application by the blockchain system. Once verified, the digital wallet initiates a resource transfer, which is verified by the institutional system. Once verified, the application is executed as part of the distributed state machine of the blockchain system and the resource transfer is performed from the blockchain system to the digital wallet.

In an off-ramp scenario, requests-for-quote for a resource transfer are also communicated from the digital wallet (or a different digital wallet) to the institutional systems. Institutional systems that decide to participate in the resource transfer generate and provide quotes back to the digital wallet as before. The digital wallet selects one of the quotes, and permission is requested from a user to share credentials specified in the selected quote. Upon receipt of a user input indicating that sharing of the credential is permitted, the credentials are transmitted to the selected institutional system.

The institutional system verifies the credentials, and once verified, transmits a finalized quote for receipt by the digital wallet. A request is output regarding whether to accept the finalized quote, and once accepted, an acceptance message indicating acceptance of the finalized quote is transmitted from the digital wallet to the institutional system.

In this example, the digital wallet initiates application execution by the blockchain system and funds the resource transfer. Application details are communicated from the digital wallet to the institutional system. The institutional system queries the smart contract to ensure an agreed upon amount of funding is present. Once verified, the institutional system initiates a resource transfer to pull the funds into an associated digital wallet (e.g., node of the institutional system) through execution of the contract. The institutional system, upon receipt of the funds, then initiates a resource transfer to a destination system specified in the request-for-quote.

Thus, the on-ramp scenario is used to effectuate a resource transfer from one type of resource to another, e.g., fiat currency to cryptographic tokens. The off-ramp scenario, on the other hand, is used to effectuate a resource transfer back from one type of resource to another, e.g., back from cryptographic tokens to a fiat currency.

In one or more implementations, machine-learning models are used by entities as part of implementing the communication protocol to facilitate the resource transfer, reduce latency, and improve operational efficiency. The digital wallet, for instance, is configurable to select institutional systems that are to receive the request-for-quote, automatically and without user intervention. To do so, a machine-learning model is utilized that is trained using machine learning to select the institutional system based on a probability of providing a quote (e.g., in response to the request-for-quote), a probability of being accepted by the first digital wallet to perform the resource transfer, and so forth.

In a first example, a multitude of institutional systems are made available via the communication protocol to participate in the resource transfer. In order to improve operational efficiency, the machine-learning model learns from training data generated from previous resource transfers as to which institutional systems are likely to respond to requests-for-quotes based on the parameters included in the requests. As a result, the machine-learning model learns and is "tuned" over time to determine probabilities and select decentralized identifiers of those institutional systems.

In a second example, again a multitude of institutional systems are made available via the communication protocol to participate in the resource transfer. To improve operational efficiency, the machine-learning model learns from training data generated from previous resource transfers as to which institutional systems are likely to be selected by the digital wallet for participation in an actual resource transfer, e.g., based on the parameters included in the semantic message, data describing the institutional system, and so forth. As a result, the machine-learning model learns and again is "tuned" over time to determine probabilities and select decentralized identifiers of those institutional systems, e.g., based on a ranked order of probabilities output by the model. In both examples, this improves operational efficiency of devices that implement the communication protocol.

In another instance, a machine-learning model is utilized by a risk assessment module to assess an amount of risk. This amount of risk is usable by an institutional system to determine whether to provide a quote, an amount of resources to be requested by the institutional system in order to perform the resource transfer, and so forth. The risk assessment module is configurable to address a variety of types of risks involved.

The risk assessment module, for example, is configurable to employ a machine-learning module having a machine-learning model trained to specify a probability as an amount of risk involved in the resource transfer. The machine-learning model, for instance, is trained using training data to quantify an amount of risk, e.g., based on a resource amount and time for settlement. This is usable along with a threshold amount to determine when to make the offer and when not to. Further training of the machine-learning model is usable to specify an amount of float for resource amount (e.g., an amount of funds) in the quote that is likely to be accepted by a particular entity to perform the resource transfer, e.g., the first digital wallet.

In a further instance, a machine-learning model is configured to assist a digital wallet in selecting a quote. The machine-learning model, similar to the functionality described for risk assessment module above, is configurable to assess an amount of risk in accepting a quote, e.g., based on training data. This amount of risk is displayable in the user interface output by the user interface module to assist a user in making the selection, is utilized as a basis to support automated selection, and so forth.

The machine-learning model, for instance, is trained using training data to quantify an amount of risk, e.g., based on a resource amount and time for settlement, to name a few examples. The quantified amount of risk is usable along with a threshold amount to determine when to make the offer and when not to. Further training of the machine-learning model is usable to specify an amount of float for an amount of funds in the quote that is likely to be accepted by a particular entity to perform the resource transfer, e.g., the second digital wallet. A variety of other examples are also contemplated. Further discussion of these and other examples is included in the following sections and shown in corresponding figures.

FIG. 1 is a non-limiting illustration of an example system 100 that is operable to implement blockchain supported resource transfer communication protocol techniques described herein. The illustrated system 100 includes a first edge device 102, a second edge device 104, a blockchain system 106, an identity hub 108, and an institutional system 110 that are communicatively coupled, one to another, via a network 112. The first and second edge devices 102, 104 as implemented are representative of functionality available at an "edge" of the system 100 to respective users, e.g., via respective computing devices.

Computing devices that implement the system 100 are configurable in a variety of ways. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as part of a service provider system.

In accordance with the described techniques, the system 100 implements a communication protocol 114 configured to provide blockchain support for resource transfer. The communication protocol 114 overcomes conventional challenges caused by a lack of access to fiat institutional systems, latencies caused by use of conventional intermediaries, and device operational inefficiencies encountered to address these challenges in conventional systems. The communication protocol 114 also supports liquidity detection techniques and resource transfers and employs social trust as an element in managing the resource transfer as part of the protocol.

The communication protocol 114 incorporates various components, including distributed identifiers, credentials, and schema 148. Examples of the distribution identifiers include a first and second decentralized identifiers 128, 130 as implemented by the first and second digital wallets 120, 122, respectively. Additionally, examples of the credentials include first and second verifiable credentials 132, 134 as implemented by the first and second digital wallets 120, 122, respectively. The schema 148 is employed as part of decentralized networks to support resource transfer, and defines the format in which the data can be shared across identity hubs 108, the first and second digital wallets 120, and institutional systems 110. In on implementation, identity hubs 108 change the schema based on the context of the request and other data, such as PII and distributed identifiers The communication protocol 114 does so in an example by providing a framework for establishing social trust using a decentralized identity and verifiable credentials to establish provenance (e.g., chronology of ownership) of an identity, e.g., users of the first and second edge devices 102, 104, identity of the institutional systems 110, and so forth. The communication protocol 114 is configurable as being operably agnostic with respect to anonymity, thereby supporting participation by respective entities as desired by the entities to negotiate and establish an amount of information that is acceptable to the entities that are part of the resource transfer.

The communication protocol 114 addresses conventional challenges involved in exchange or resources through use of blockchain supported resource transfer. In an implementation, the communication protocol 114 supports an infrastructure involving on-ramps and off-ramps between the first and second edge devices 102, 104, institutional systems 110, and blockchain system 106 without use of centralized intermediaries and trust broker systems. This improves access, reduces resource transfer and operational latency, and improves device operation that implements these techniques.

In the illustrated example, the communication protocol 114 provides a framework for creating and using on-ramps and off-ramps from institutional systems 110 using fiat resources and the blockchain system 106 as implementing cryptocurrencies and other cryptographic assets. Further, this is performable separate from centralized exchanges as involved in conventional techniques (which introduce latency and increased resource utilization) and affords for secure exchange of identity. The communication protocol 114 also supports mechanisms as further described below for compliance with laws and regulations potentially involved in the resource transfer.

As part of this, the communication protocol 114 facilitates the formation of mutual trust between entities involved in a resource transfer that is not centrally controlled. This is performable, for instance, through direct trust negotiation between the parties, use of mutually trusted third-party systems to "vouch" for the parties, and so forth. Further, the communication protocol 114 supports specification of attributes (e.g., fees, operational criteria, etc.) as part of performing the resource transfer that is usable to account for perceived risk and other considerations involved in implementing the resource transfer.

The first and second edge devices 102, 104 include first and second communication systems 116, 118 that are configured to support communication via the network 112, e.g., as browsers, network-enabled applications, hardware functionality, and so forth. The first and second edge devices 102, 104 also include, respectively, first and second digital wallets 120, 122 stored in respective first and second storage devices 124, 126. The first and second digital wallets 120, 122 are configured, respectively, to maintain first and second decentralized identifiers 128, 130 and first and second verifiable credentials 132, 134 used in support of the communication protocol 114.

The communication protocol 114 is configurable in an example to implement trust in a manner that differs from conventional decentralized exchange protocols in that the model is not trustless. This is performed in support of fiat resources by the institutional system 110 that are subject to regulation, have a potential for targeting by malicious parties, and so forth. To do so, the communication protocol 114 is configurable to employ another technique to govern trust and reputation.

The communication protocol 114, for instance, is configurable to employ decentralized trust through a public key infrastructure (PKI) that is usable to secure communication between entities, e.g., the first and second edge devices 102, the institutional system 110, and so forth. The communication protocol 114 is built upon the decentralized identifiers used by the first and second edges devices 102, 104 as well as other entities in the system 100, e.g., the institutional system 110. Decentralized identifiers in this example support verifiable, decentralized digital identity.

As such, decentralized identifiers are configurable to refer to a variety of different entity types (e.g., a user, organization, institution, data model, thing, abstract entity, and so forth) as determined by a controlling entity of the decentralized identifier. This is in contrast to typical federated identifiers, in that decentralized identifiers are decoupled from centralized registries, identity providers, and certificate authorities. For example, while other parties may be used to enable information discovery related to a decentralized identifier, this configuration supports an entity which is associated with a decentralized identifier control over the identity associated with the decentralized identifier without involving permission from another entity.

Decentralized identifiers (DIDs) are configurable as uniform resource identifiers (URIs) that associate a DID subject with a DID document, thereby supporting trustworthy interactions associated with that subject. Examples of the decentralized identifiers include a first decentralized identifier 128 associated with the first digital wallet 120 and a second decentralized identifier 130 associated with the second digital wallet 122. Decentralized identifier (DID) documents, which are linked to the decentralized identifiers, are configurable as a metadata file that includes a variety of data elements, examples of which include cryptographic material and routing endpoints. Cryptographic material is usable by an entity that is associated with the decentralized identifier to provide control, e.g., through use of public keys, digital signatures, and so forth. Routing endpoints specify locations, at which, data with an entity that is associated with the decentralized identifier is exchanged and/or at which the entity is contacted. The routing endpoints, for instance, specify a particular identity hub 108 having associated personal data storage and relay nodes used as part of the resource transfer as implemented by a data store and message relay system 138.

Decentralized identifier techniques are implemented by the communication protocol 114 in a variety of ways. Examples include use of a communication protocol 114 that is open, public, and permissionless, and is tamper resistant. Further, the communication protocol 114 produces a record that is probabilistically finalized and independently, deterministically verifiable, even in the presence of segmentation, state withholding, and collusive node conditions. Further, the communication protocol 114 is not reliant on authorities, trusted third parties, or entities that cannot be displaced through competitive market processes.

Credentials are also used as part of the communication protocol 114, examples of which include the first and second verifiable credentials 132, 134 stored, respectively, as part of the first and second digital wallets 120, 122. These credentials are configured as cryptographically secure, respect privacy, and are machine verifiable. In one implementation, inclusion of a zero-knowledge proof is usable to further advance privacy and safety by preventing an ability to link across disclosures, reduces an amount of data that is discoverable, and reduces raw data value exposure.

The system 100 is also configurable to include a variety of additional entities that are involved as part of the communication protocol 114, examples of which are illustrated as a blockchain system 106 implementing a virtual machine 136, an identity hub 108 implementing the data store and message relay system 138, and an institutional system 110 implementing an ask/quote module 140.

The identity hub 108 provides an interface, through which, to store, discover, and fetch data related to communications involved in a request, e.g., resource transfer, supported by the communication protocol 114. The data store and message relay system 138 of the identity hub 108, for instance, are usable to locate public or permissioned private data related to a particular decentralized identifier, e.g., the first and second decentralized identifiers 128, 130. The identity hub 108 is configurable as having a mesh-like datastore construction that supports an ability of an entity to operate multiple instances that synchronize to a same state across one another. Use of the mesh-like datastore construction provides an entity that is associated with the decentralized identity with an ability to secure, manage, and transact data with other entities without reliance on location or provider-specific infrastructure, interfaces, or routing mechanisms.

The identity hub 108 supports use of a semantic message 142 and respective data interfaces (e.g., as inferential application programming interfaces (APIs)) in accordance with the schema 148 that are accessible without direct knowledge of a semantic type of data that is to be exchanged. A diverse set of interactions and flows are modeled within these interfaces as part of the schema 148 by externally codifying sets of message schemas and processing directives to form respective protocols.

The semantic message 142 employs the schema 148 as supporting a naming convention of the datatypes of objects included in the message. Configuration of the semantic message 142 enables entities that receive the semantic message 142 to readily parse the message using the schema 148, e.g., to determine whether the semantic message 142 is of interest to the entity and process it accordingly. As such, the schema 148 of the semantic message 142 helps support the distributed architecture of the communication protocol 114. For example, the identity hub 108 is configured to identify, through semantics of the message, and process/forward the semantic message 142 to a respective institutional system 110 which can then also process the semantic message 142 based on the schema. In one example, the semantic messages 142 are signed by each entity through the process by the schema 148 as part of a point-to-point messaging protocol 146 as further described below.

Digital wallets (e.g., the first and second digital wallets 120, 122 as well as wallets for the institutional system 110) act as agents for individuals or institutions by facilitating exchanges with the institutional system 110. As such, digital wallets are configurable to support a variety of functionalities. Digital wallets, for instance, support secure encrypted storage for verifiable credentials as illustrated, e.g., the first and second verifiable credentials 132, 134. Digital wallets also support discovery of an institutional system 110 by crawling the identity hub 108, an example of which is further described in relation to FIG. 2. Digital wallets include mechanisms for receiving, offering, and presenting verifiable credentials used as part of the communication protocol 114. Further, digital wallets implement digital signature mechanisms and support an ability to store a transaction history. Digital wallets are configurable to support seamless transfer of credentials between the digital wallets, and as such does not claim "ownership" of verifiable credentials. Additionally, operation of the digital wallets is consent driven by an entity associated with the digital wallet.

As a result, functionality of the digital wallets operates to significantly simplify a user experience to perform a resource transfer, e.g., to move assets between fiat and cryptographic tokens. Entities using the communication protocol 114, for instance, are not involved as in conventional techniques with first onboarding through a separate, centralized exchange to procure cryptograph tokens with fiat payment instruments, before transferring those crypto assets into the digital wallets. The entities (e.g., edges devices, associated users, and institutional systems) are also provided with an ability to leverage the communication protocol 114 to off-ramp a resource, e.g., maintained as cryptograph tokens back into fiat.

The communication protocol 114, through use of the digital wallets, supports a streamlined experience with on-ramps and off-ramps of the institutional system 110 and decentralized blockchain system 106. Use of the decentralized blockchain system 106 enables users of the edge devices to utilize self-custody wallets without loss of convenience in exchange for security or self-hosted options.

In an implementation, the communication protocol 114 does not enforce specific criteria upon digital wallet implementations. Rather, digital wallet developers are supported with functionality to design features and functionality to achieve a desired user experience. For example, a digital wallet is configurable to select the institutional system 110 (e.g., algorithmically based on speed, cost, or track record and/or through use of machine learning) or delegate that choice to the entity associated with the digital wallet. In another example, a digital wallet developer preselects institutional systems 110, chooses to request and verify the credentials of various institutional systems 110 ahead of time by conducting discovery and evaluation prior to a first offer, and so forth. A digital wallet is also configurable to support selection of institutional systems 110 to the entity associated with the digital wallet, e.g., via user inputs.

The institutional system 110 is representative of one of a plurality of institutional systems that offer resource liquidity services as part of the resource transfer implemented using the communication protocol 114. As previously described, the communication protocol 114 is configurable as permissionless. As such, the institutional system 110 is provided with an ability to operate as part of the institutional system 110 (e.g., "run a node") without third-party approval. Each institutional system 110 is identifiable via decentralized identifiers and verifiable credentials, e.g., via functionality implemented via respective digital wallets similar to those illustrated for the first and second edge devices 102, 104.

Institutional systems 110, for instance, provide access to the system 100 implemented by the communication protocol 114 to a variety of different types of entities. Examples of these entities include financial-technology companies, regional banks, institutional banks, or other financial institutions. Consequently, the institutional system 110 is used to provide access to fiat payment systems and the ability to facilitate fiat payments in exchange for tokenized cryptocurrency assets or vice versa. In another example, a first type of tokenized cryptocurrency is convertible into a second type of tokenized cryptocurrency. The institutional system 110 is also configurable to accept or produce cash or checks as a mechanism for effectuating fiat settlement as well as to support resource transfers via online digital payments. In one implementation, the institutional systems 110 can be selected by a user associated with devices 102, 104 or dynamically selected or ranked based on the context of the resource transfer, e.g., physical locations associated with the resource transfer, sender's or recipient's preferences of institutional systems, such as preference for newly discovered institutional systems or institutional systems with the lowest fee or fastest transaction rate, etc.

In an implementation, the institutional system 110 is configured as part of the communication protocol 114 to collect data, such as personally identifiable information (PII) or DIDs, from entities associated with digital wallets to meet regulatory criteria, e.g., to satisfy anti-money laundering (AML) programs, counter terrorist financing, sanctions, and so forth. The communication protocol 114, for instance, does not include personally identifiable information in a request-for-quote message (e.g., "ASK") itself, but rather limits itself to a type of PII that is to be provided should the institutional system 110 choose to accept the "ASK" and the digital wallet commits to providing corresponding information.

The institutional system 110, for instance, upon receipt of a request-for-quote message (e.g., "ASK") from a digital wallet, determines whether to provide a quote (e.g., bid) based on the details of the message. The institutional system 110 is provided with flexibility as part of the communication protocol 114 in support of particular schemas and request-for-quote semantic messages. For example, a particular institutional system 110 is configured to support credit cards while another is not. Consequently, the communication protocol 114 is configurable to include information that enables the institutional system 110 to decide whether to provide a quote, and if so, what verifiable credentials are to be requested from the digital wallet and other attributes to be met by the digital wallet in order to perform the resource transfer.

The communication protocol 114 is also configurable to include regulatory-clearing information (e.g., to conduct anti-money laundering and other checks as described above) before provisioning resources to a digital wallet. To participate using the communication protocol 114 and as part of the system 100, the institutional system 110 operates nodes that facilitate the reception of requests-for-quotes (e.g., "ASKs") and transmission of return quotes, also referred to as "BIDs" in the following discussion. Conceptually, nodes of the institutional system 110 operate in a manner that is similar to digital wallets as described above and leverage the same underlying modules and libraries, and as such, are also referred to as digital wallets in the following discussion.

The communication protocol 114 includes a plurality of communication layers, examples of which include a request-for-quote messaging protocol 144 and a point-to-point messaging protocol 146. The request-for-quote messaging protocol 144 is used by a digital wallet to broadcast an intent to engage in a resource transfer. Intent is expressed, in one example, as a semantic message 142 to seek an institutional system 110 to engage in the resource transfer, e.g., to exchange fiat currency for in-kind cryptographic tokens such as stablecoins or other tokenized assets or vice versa.

The second element of the communication protocol 114 is a point-to-point messaging protocol 146. The point-to-point messaging protocol 146 is used to implement secure communication between a digital wallet and the institutional system 110, e.g., to exchange data used to negotiate and execute a resource transfer.

The semantic messages 142 exchanged between the digital wallets and institutional system 110 (e.g., using the data store and message relay system 138 of the identity hub 108) contains semantically defined objects adherent to a schema. These message objects define paths of a request-for-quote/quote (e.g., "ASK/BID") settlement flow. The message objects also contain data usable by the entities to evaluate requests, verify credentials, and execute value exchanges.

The semantic message 142 is configurable as a JavaScript Object Notation (JSON) object, which is signed by each entity from a sending entity to the receiving entity for each segment of the resource transfer. The semantic message 142 is encrypted in one example and employs programming hooks that enable a message handler service to receive the semantic message 142 in real time at the identity hub 108 and process the messages as part of a data store and message relation system 138 in accordance with the semantics and rule set by the communication protocol 114 and schema 148 that are defined for a given message type. This is usable in the illustrated example as part of a resource transfer between the first digital wallet and the second digital wallet 122 through a blockchain supported intermediary, e.g., a stable coin. In this way, the resource transfer is performable across boundaries (e.g., geographic boundaries, political boundaries, linguistic boundaries, temporal boundaries, etc.), which is not possible in conventional techniques as further described below.

Figure 2:
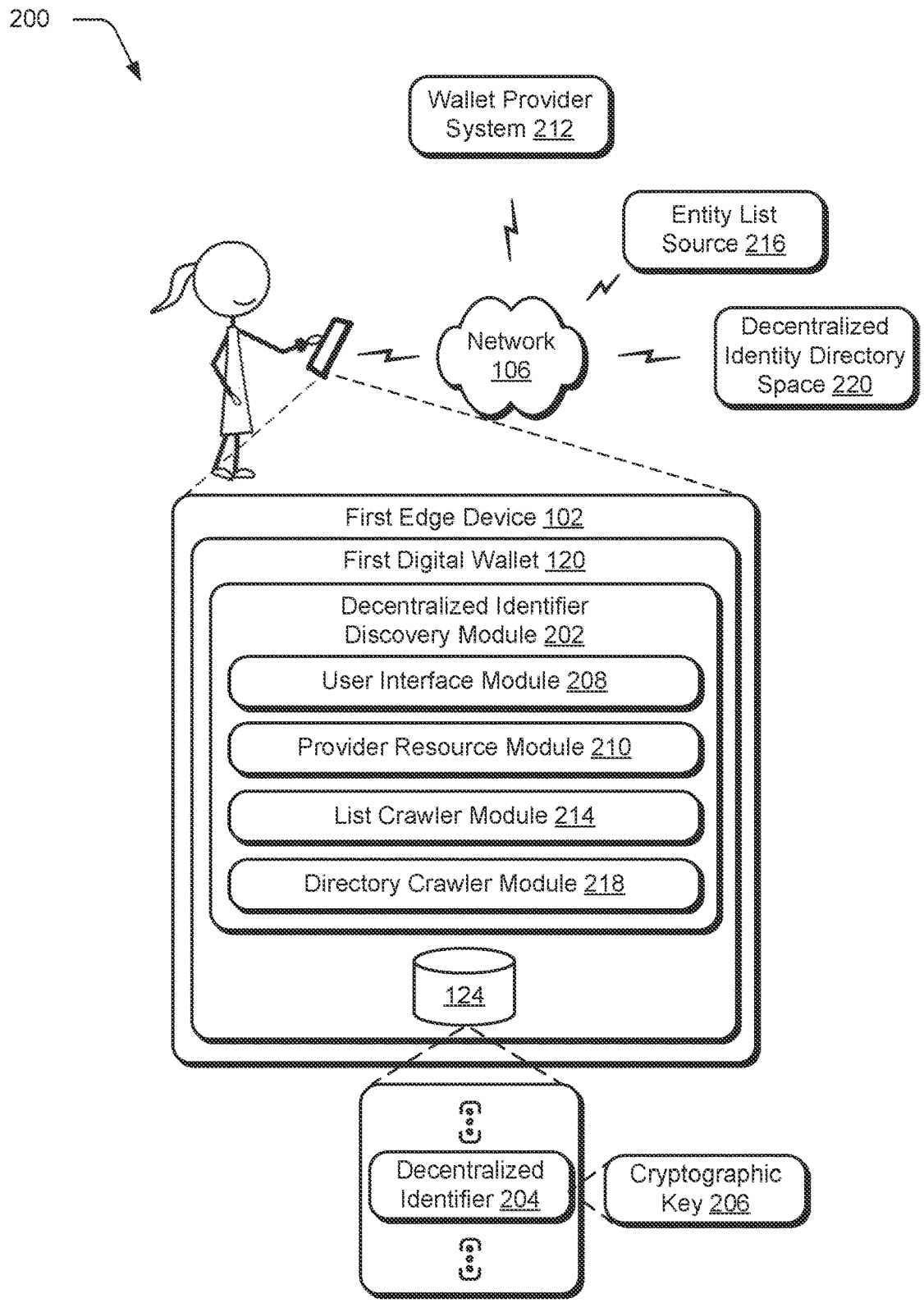
FIG. 2 is a non-limiting illustration of an example system that is operable to implement institutional system discovery as part of the communication protocol techniques described herein, according to an embodiment of the present subject matter.

FIG. 2 is a non-limiting illustration of an example 200 of a system that is operable to implement discovery of institutional system 110 as part of the communication protocol 114 techniques described herein. The first edge device 102 includes a first digital wallet 120 as described in relation to FIG. 1. For the first digital wallet 120 to initiate and transact resource transfers as part of the communication protocol 114, the first digital wallet 120 is exposed to decentralized identifiers of institutional systems 110 that in turn enables the first digital wallet 120 to resolve a current cryptographic key set and identity hub 108 routing endpoints associated with a given decentralized identifier in order to support communication between the entities.

Functionality of the first digital wallet 120 to discover the decentralized identifiers is illustrated in FIG. 2 as a decentralized identifier discovery module 202. The decentralized identifier discovery module 202 is configured to locate decentralized identifiers 204 and associated cryptographic keys 206 to be used by institutional systems 110 as part of the communication protocol 114. The discovery may happen in several ways, as described below.

In a first example, a user interface module 208 is employed to receive user inputs (e.g., from a user associated with the first digital wallet 120) specifying particular decentralized identifiers 204 of a desired institutional system 110. The user inputs, for instance, are used to create an individually curated list that includes these entities (corresponding to the decentralized identifiers) via the user inputs received via a user interface. In some examples, the list may include entities such as financial institutions, merchants, artists, venues, service providers, media content providers, and so forth.

In a second example, a provider resource module 210 is employed to obtain a list of decentralized identifiers 204 from a wallet provider system 212 that provided the first digital wallet 120. The wallet provider system 212, for instance, evaluates decentralized identifiers for inclusion in a respective list based on criteria specified by the provider. Evaluation is performable through use of programmatic, machine learning, and/or user processes, e.g., through inspection of verifiable credentials, use of business-to-business verification processes, and so forth.

In a third example, a list crawler module 214 is employed by the first digital wallet 120 to locate a list of decentralized identifiers from an entity list source 216, and then evaluates the decentralized identifiers included in the list (e.g., through output and subsequent selection in a user interface) for inclusion as part of the decentralized identifiers 204. Once a set of decentralized identifiers is digested, for instance, the list crawler module 214 is configurable to use the decentralized identifiers from that list to crawl a next level of lists made available by those entities for consideration. The list crawler module 214 may locate the list based on parameters such as resource transfer cost, resource transfer time, type of resource, risk level, and so on.

In a fourth example, a directory crawler module 218 is utilized to crawl a decentralized identity direction space 220. The directory crawler module 218, for instance, is configurable to iterate through the decentralized identity direction space 220 and request credentials usable to establish trust, obtain trusted decentralized identifier lists from the identity hub 108 (e.g., as part of the data store and message relay system 138), and so forth. A variety of other examples are also contemplated and in some cases, discovery may be a combination of examples cited above. For example, an overlap of individually curated list and provider assembled lists may be used for DID discovery. The decentralized identifiers 204 are then usable as part of the communication protocol 114 to initiate and perform a resource transfer, an example of which is described in the following discussion and shown in corresponding figures.

FIGS. 3-7 depict non-limiting examples 200, 300, 400, 500, 600, 700 of systems showing operation of the first digital wallet in greater detail as engaging in an on-ramp as part of the communication protocol 114. FIG. 8 depicts a procedure 800 in an example implementation of an on-ramp technique as part of a blockchain supported resource transfer communication protocol. Aspects of each of the procedures described herein are implemented in hardware, firmware, software, or a combination thereof. The procedures are shown as a set of blocks that specify operations performed by one or more devices and are not necessarily limited to the orders shown for performing the operations by the respective blocks. The following discussion of operation of the first digital wallet is described in parallel with operations of the example procedure 800.

Figure 3:
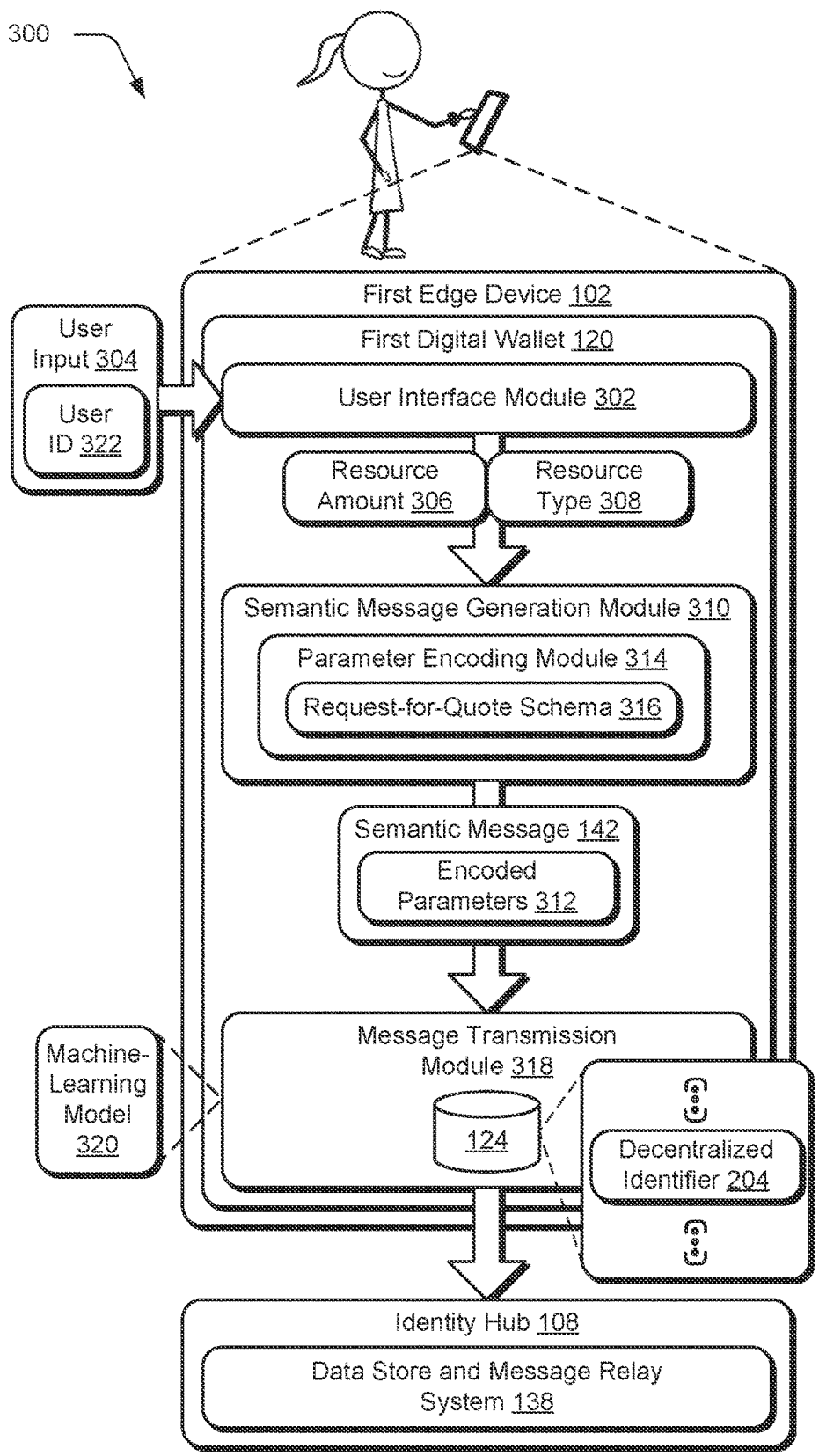
FIG. 3 is a non-limiting example showing operation of a digital wallet as generating and transmitting a request-for-quote as part of the request-for-quote messaging protocol of the communication protocol of FIG. 1 in an "on-ramp" scenario according to an embodiment of the present subject matter.

FIG. 3 is a non-limiting example 300 showing operation of a first digital wallet as generating and transmitting a request-for-quote as part of the request-for-quote messaging protocol 144 of the communication protocol 114 of FIG. 1 in an "on-ramp" scenario. To begin in an example, the first digital wallet 120 of the first edge device 102 includes decentralized identifiers 204 maintained a storage device 124 as previously described in relation to FIG. 2.

A user interface module 302 is employed as part of the first digital wallet 120 to output a user interface. The user interface is configured to receive a user input 304 to initiate a communication connection, e.g., to perform the resource transfer. The user input 304 includes parameters to be implemented as part of a resource transfer to a digital wallet (block 802). The user input 304, for instance, specifies a resource amount 306 and a resource type 308, e.g., a type of cryptographic tokens from a particular blockchain system 106 such as stablecoins or other tokenized assets. The user input 304 may further include a user ID 322 that identifies an end recipient of the resource transfer. The user ID 322, for instance, is configurable to identify a second digital wallet 122 of the second edge device 104 that is to receive the resource included in the resource transfer from the off-ramp process described below.

The resource amount 306 and resource type 308 are received as an input by a semantic message generation module 310. The semantic message generation module 310 is configured to generate a semantic message 142 having encoded parameters 312, e.g., the resource amount and resource type 308. The semantic message 142 in this example is representative of a request-for-quote (e.g., "ASK") that is configured to invite quotes (e.g., "BIDs") from institutional systems to perform a resource transfer based on the encoded parameters 312.

To generate the semantic message 142, the semantic message generation module 310 employs a parameter encoding module 314 that follows a request-for-quote schema 316. The semantic message 142, configured as a request-for-quote, is configured for transmission and distribution to a plurality of institutional systems 110. The semantic message 142 includes information usable by these systems to evaluate the nature of the request in order to determine whether or not to participate in the resource transfer.

The schema supports a naming convention of the datatypes of objects included in the message which enables entities that receive the semantic message 142 to readily parse the message using the schema, e.g., to determine whether the semantic message 142 is of interest to the entity and process it accordingly. Use of the schema helps support the distributed architecture of the communication protocol 114 and corresponding operational advantages described above. For example, the identity hub 108 is configured to identify, through semantics of the message 142, and process/forward the semantic message 142 to a respective institutional system 110 which can then also process the semantic message 142 based on the schema. To do so, the semantic messages are signed in one example by each entity through the process as part of a point-to-point messaging protocol 146 as further described below.

Accordingly, the semantic message 142 and encoded parameters 312 are usable to evaluate a nature of the request-for-quote (e.g., the "ASK") by leveraging the request-for-quote schema 316. The encoded parameters 312, for instance, include a decentralized identifier usable as part of the communication protocol 114 that is associated with an entity that corresponds with the digital wallet, e.g., whether an individual (e.g., a first user associated with the first edge device 102), an institution, and so forth. The encoded parameters 312 also specify a "desired resource type," e.g., a type of cryptographic token, fiat currency, and so forth. Examples of resource types 308 include Bitcoin (BTC), Moneta Digital (MMXN), a tokenized US dollar (USDC), a fiat US dollar, fiat Euro, and so forth. The encoded parameters 312 also include a resource amount 306, e.g., an amount of the resource type 308.

The encoded parameters 312 are also configurable to specify a "desired settlement scheme" to be used to perform the resource transfer. Specification of a particular scheme permits the first digital wallet 120 to specify a particular blockchain system that is to be used to effectuate settlement. For instance, stablecoins are available via a plurality of different blockchains, and bitcoin is configurable for settlement using a variety of solutions, such as Lightning (LBTC). For fiat currencies, settlement protocols include mechanisms such as single Euro payments area (SEPA), automated clearing house (ACH), payment cards, society for worldwide interbank financial telecommunication (SWIFT), or others.

An "offered resource type" is included as part of the encoded parameters 312 that specifies a type of the asset that is proposed for payment. As such, these parameters are configurable similar to the "desired resource type" parameters above. Likewise, an "offered settlement scheme" is also includable in the encoded parameters 312 to specify a settlement scheme desired for use for the offered resource type, and is configurable to include parameters similar to the "desired settlement scheme" above. An "offered resource amount" is also includable as part of the encoded parameters 312 in an instance in which an amount of a desired resource is offered. The "offered resource amount" parameter is left empty in scenarios in which a proposed amount from an institutional system 110 is desired in response to the request-for-quote.

The semantic message 142 and encoded parameters 312 are output from the semantic message generation module 310 to a message transmission module 318. The message transmission module 318 is configured to transmit the semantic message 142 for distribution to a plurality of institutional systems (block 804). Transmission of the message is based on the decentralized identifiers 204 maintained in a first storage device 124 as described in relation to FIG. 2. Transmission of the semantic message 142 is performable in a variety of ways, including directly to institutional systems 110 specified in the semantic message 142, indirectly through use of a data store and message relay system 138 of the identity hub 108, and so forth.

In an implementation, the message transmission module 318 is configurable to select the institutional systems 110 that are to receive the semantic message 142, automatically and without user intervention. To do so, the message transmission module 318 is configurable to employ a machine-learning model 320 trained using machine learning to select an institutional system 110 based on a probability of providing a quote (e.g., in response to the request-for-quote), a probability of being accepted by the first digital wallet 120 to perform the resource transfer, and so forth.

A machine-learning model refers to a computer representation that can be tuned (e.g., trained, retrained, etc.) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

In a first example, for instance, a multitude of institutional systems 110 are made available via the communication protocol 114 to participate in the resource transfer. In order to improve operational efficiency, the machine-learning model 320 learns from training data generated from resource transfers performed by the first and second edge devices 102 as to which institutional systems 110 are likely to respond to requests-for-quotes based on the parameters 312 included in the semantic message 142. As a result, the machine-learning model 320 learns and is "tuned" over time (e.g., retrained) to determine probabilities and select decentralized identifiers 204 of those institutional systems 110.

In a second example, again a multitude of institutional systems 110 are made available via the communication protocol 114 to participate in the resource transfer. In order to improve operational efficiency, the machine-learning model 320 learns from training data generated from resource transfers performed by the first edge device 102. In an example, the machine-learning model is trained to learn which institutional systems 110 are likely to be selected by the digital wallet, itself, for participation in an actual resource transfer. Training is based on the parameters 312 included in the semantic message 142, data describing the institutional system 110, and so forth.

As a result, the machine-learning model 320 learns and is "tuned" over time (e.g., retrained) to determine probabilities and select decentralized identifiers 204 of those institutional systems 110, e.g., based on a ranked order of probabilities output by the model. In both examples, operational efficiency is improved of the first edge device 102 as well as other devices involved in implementing the communication protocol 114 by optimizing message transfer in the system 100.

Figure 4:
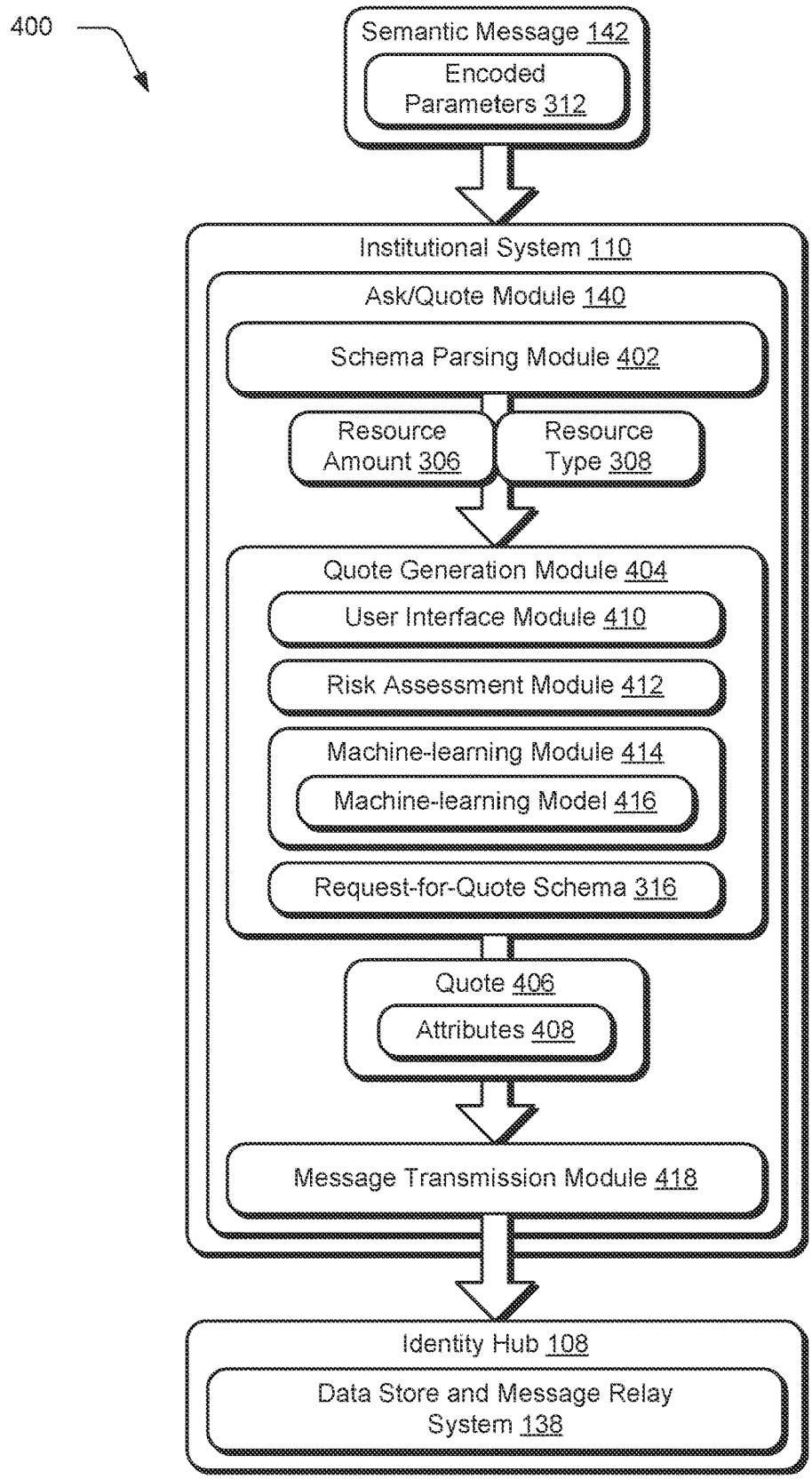
FIG. 4 is a non-limiting example showing operation of an institutional system as generating a quote, according to an embodiment of the present subject matter.

FIG. 4 is a non-limiting example 400 showing operation of an institutional system as generating and transmitting a quote in response to the semantic message configured as a request-for-quote of FIG. 3 as part of the request-for-quote messaging protocol 144 of the communication protocol 114 of FIG. 1. To begin, the semantic message 142 having the encoded parameters 312 is received by an institutional system 110, e.g., directly from the first digital wallet 120, indirectly via the identity hub 108, and so forth.

A schema parsing module 402 is first utilized to determine objects included as part of the semantic message 142 based on the request-for-quote schema 316. In the illustrated example, this determination is usable to determine the resource amount 306 and the resource type 308. Other parameters are also determinable based on the request-for-quote schema 316, examples of which include a desired settlement scheme, offered resource type, offered settlement scheme, and so forth.

The parameters parsed from the schema parsing module 402 are then passed as an input to a quote generation module 404. The quote generation module 404 is representative of functionality of the ask/quote module 140 to first determine whether to generate a quote to perform the resource transfer, and then if so, attributes 408 that are proposed to perform the resource transfer. Generation of the quote 406 is performable in a variety of ways.

In a first example, a user interface module 410 is employed to receive user inputs, via a user interface, that specify the attributes 408, e.g., from a user associated with the institutional system 110. In a second example, a risk assessment module 412 is utilized to assess an amount of risk, which is usable to determine whether to provide a quote 406, an amount of resources requested to perform the resource transfer, and so forth. The risk assessment module 412 is configurable to address a variety of types of risks involved.

The risk assessment module 412, for instance, is configurable to determine a risk level associated with the resource transfer, and based on the risk level, float an amount of resources based on the risk. In a low-risk scenario, for example, the risk assessment module 412 determines there is a low level of risk in a scenario that is likely to take a significant amount of time (e.g., one day, one week, two weeks, etc.). In such an example, the risk assessment module 412 is configured to include attributes 408 in the quote 406 indicating the institutional system 110 is willing to "float" those resources (i.e., provide before settlement) for a specified amount of time. In an example of a high-risk scenario, the risk assessment module 412 may determine that there is a high level of risk in a resource transfer based on a short amount of time (e.g., one minute, one hour, one day, etc.). In such an example, the risk assessment module 412 may be configured to request additional verifiable credentials from the first edge device 102 that may increase the trust between the parties to execute the resource transfer.

To do so, the risk assessment module 412 is configurable to employ a machine-learning module 414. The machine-learning module 414 is configured to train and retrain a machine-learning model 416 to specify an indication of an amount of risk or probability of risk involved in the resource transfer. Examples of machine-learning models 416 include neural networks, convolutional neural networks (CNNs), long short-term memory (LSTM) neural networks, decision trees, supervised models, unsupervised learning models, and so forth. The machine-learning model 416, for instance, is trained using training data to quantify an amount of risk, e.g., based on a resource amount, time for settlement, number of nodes that will be implemented to execute a resource transfer (and in some cases, individual and/or aggregated risks such individual nodes), and so forth. The quantification of the amount of risk is usable along with a threshold amount to determine when to make the offer and when not to. In examples, the threshold may be set by the institutional system 110 based on an amount of risk that the institutional system 110 is willing to accept, and thus may be different from institutional system to institutional system. Further training of the machine-learning model 416 is usable to specify an amount of float for a particular resource amount (e.g., an amount of funds) in the quote 406 that is likely to be accepted by a particular entity to perform the resource transfer, e.g., the first digital wallet 120.

The quote generation module 404 also employs the request-for-quote schema 316 to encode the attributes 408 as part of the quote 406. The quote 406, as encoded, is configured to include a decentralized identifier of the institutional system 110. The quote 406 is also configurable to specify a proposed cost for the resource transfer in an offered asset type specified by the request-for-quote. A proposed settlement amount is also encodable as part of the attributes 408 that indicates a proposed amount of settlement the resource transfer denominated in a directed asset type in the request-for-quote.

A settlement time is specified in one or more examples indicative of a maximum amount of time (e.g., from a time at which the quote 406 is accepted) that settlement of the resource transfer is to be effectuated. After the settlement time has passed, a settlement default is presumed to have occurred. An expiration time is also configurable as a "quote expiration" in the encoded attributes 408 that specifies a time, at which, the quote 406 is considered stale and no longer applicable (e.g., "honored") by the institutional system 110. Lastly, a signature of the institutional system 110 is used to encode the attributes 408 (e.g., using a private cryptographic key) to protect integrity of the quote 406.

The quote 406, once generated and encoded, is then output to a message transmission module 418. The message transmission module 418 is configured to distribute the quote 406 (as a semantic message 142 in compliance with the request-for-quote messaging protocol 144 of the communication protocol 114) back to the first digital wallet 120. As before, communication is performable directly via the network 112 to the first edge device 102, indirectly through use of the data store and message relay system 138 of the identity hub 108, and so forth.

Figure 5:
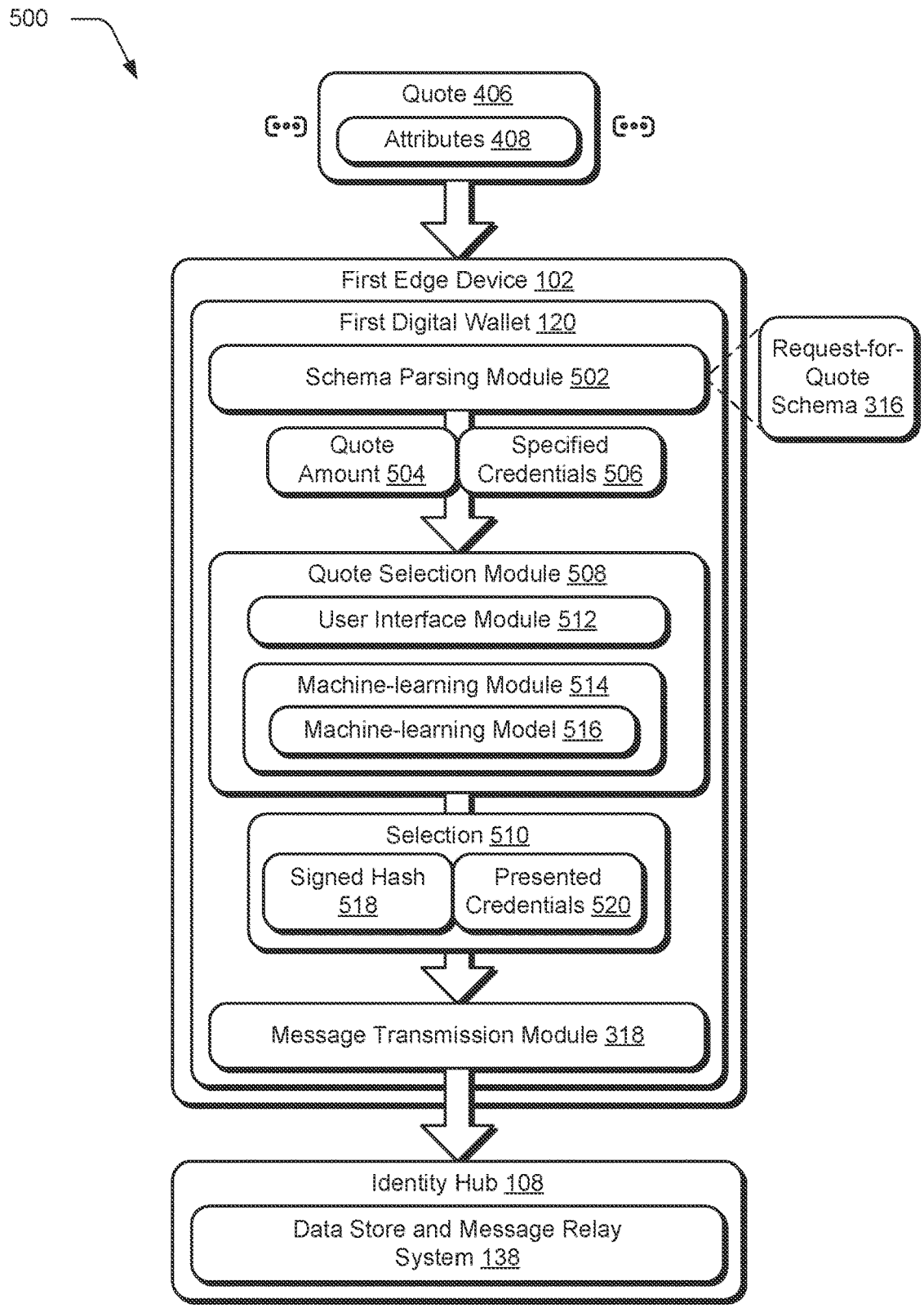
FIG. 5 is a non-limiting example showing operation of a first edge device as selecting a quote from a plurality of quotes received responsive to the request-for-quote of FIG. 4 according to an embodiment of the present subject matter.

FIG. 5 is a non-limiting example 500 showing operation of the first edge device as selecting a quote from a plurality of quotes received responsive to the request-for-quote of FIG. 3 as part of the request-for-quote messaging protocol 144 of the communication protocol 114 of FIG. 1. The first digital wallet 120 of the first edge device 102 receives a plurality of quotes specifying proposed parameters as part of implementing communication connections to perform the resource transfer by the institutional systems in compliance with the parameters specified by the semantic message (block 806). In the illustrated example, selection of the quotes is represented as including a quote 406 and attributes 408 as generated with respect to FIG. 4.

A determination is then made by the first digital wallet 120 as whether to accept one of the quotes (decision block 808). If not ("no" from decision block 808) the procedure returns to block 802 and if so ("yes" from decision block 808) the procedure 800 continues.

A schema parsing module 502 is first employed by the first digital wallet 120 to parse objects using a request-for-quote schema 316 from the quote 406, examples of which include a quote amount 504 and specified credentials 506 that are acceptable by the institutional system 110 to perform the resource transfer. Additional parameters are also parsed from the quote 406, e.g., an offer to float resources, risk assessment, and so forth.

A quote selection module 508 is then employed as part of the first digital wallet 120 as representative of functionality to make a selection 510 from the plurality of quotes that is to be used to perform the resource transfer. Quote selection is performable in a variety of ways. In a first example, a user interface module 512 is employed to output a user interface. The user interface displays the quotes 406 and attributes 408 associated with the quotes 406. The quotes 406 are user selectable via the interface, which causes output of the selection 510 to the message transmission module 318 (e.g., as a semantic message 142) automatically and without user intervention back to the institutional system 110 that is selected. Additional messages are also configurable, e.g., to indicate to other participating institutional systems that respective quotes have not been accepted.

In an implementation, the quote selection module 508 leverages a machine-learning module 514 employing a machine-learning model 516. The machine-learning model 516 is configurable in a variety of ways to assist in generating the selection 510. The machine-learning model 516, similar to the risk assessment module 412 of FIG. 4, is configurable to assess an amount of risk in accepting a quote 406, e.g., based on training data generated by the first edge device 102, across a plurality of edge devices in the system 100 of FIG. 1, and so forth. The amount of risk is displayable in the user interface output by the user interface module 512 to assist a user in making the selection 510. A variety of other examples are also contemplated.

The selection 510, once made, causes generation by the quote selection module 508 of a signed hash 518 of the quote 406 along with presented credentials 520 of the first digital wallet 120 as specified by the quote 406. The selection 510 is then transmitted as an acceptance message (e.g., configured as a semantic message 142) of the respective quote of the plurality of quotes by the message transmission module 318 for distribution over the network 112 back to the institutional system 110 corresponding to the quote 406. The selection 510, as part of the acceptance message (e.g., configured as a semantic message 142) includes the presented credentials 520 of the first digital wallet 120 (block 810).

Figure 6:
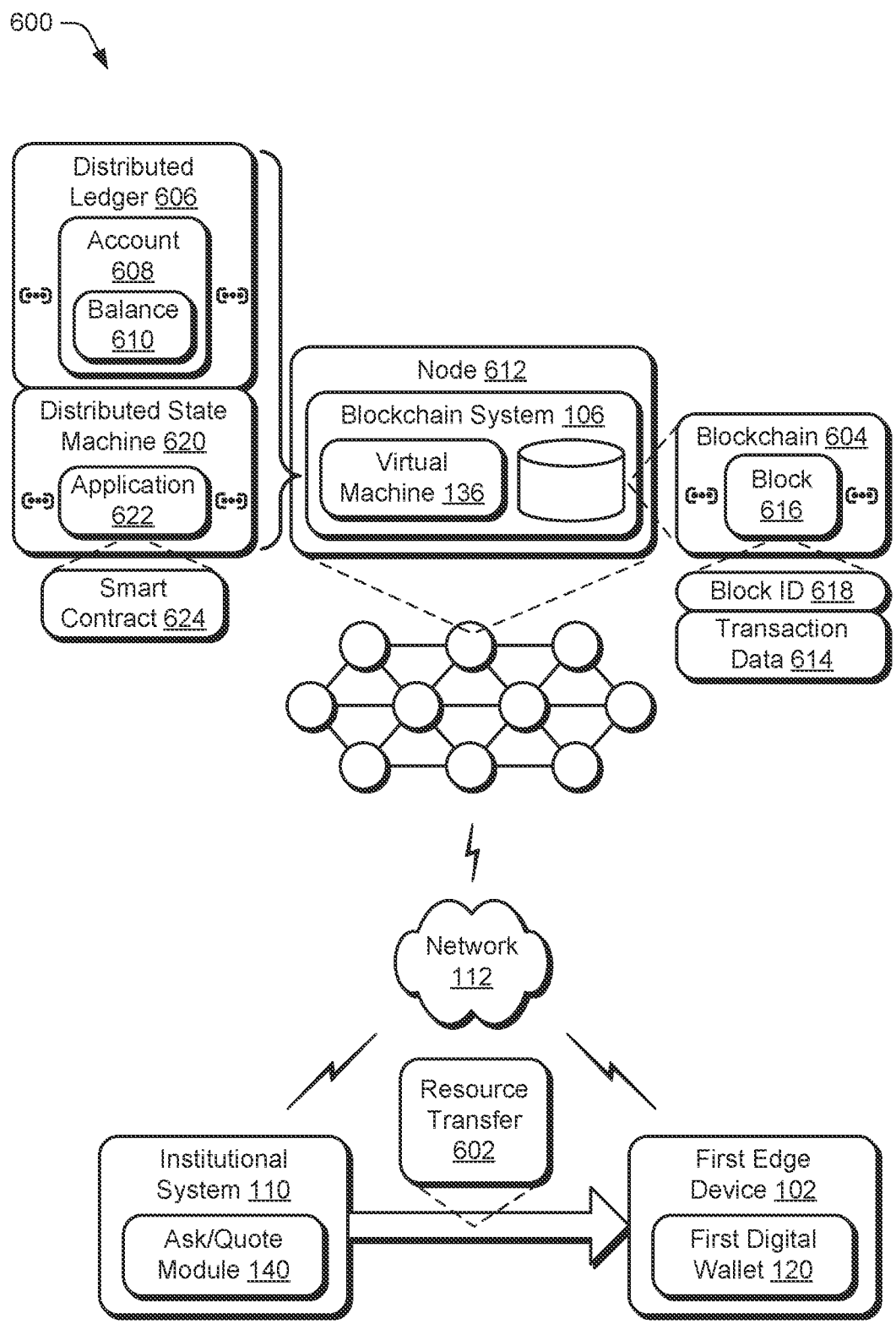
FIG. 6 is a non-limiting example showing operation of the blockchain system along with the institutional system selected in FIG. 5 and the first edge device as implementing a resource transfer according to an embodiment of the present subject matter.

FIG. 6 is a non-limiting example 600 showing operation of the blockchain system 106 along with the institutional system 110 selected in FIG. 5 and the first edge device 102 as implementing a resource transfer as part of the communication protocol 114 of FIG. 1. The institutional system 110 in this example receives the selection 510 of FIG. 5 as a semantic message 142. The selection 510 is verified by the institutional system 110 using the ask/quote module 140, including verification of credentials within the semantic message 142 as complying with the credentials specified in the attributes 408. Once verified, a finalized quote is communicated back to the first edge device 102 via the network 112, and is accepted by signing it (e.g., using a digital signature) and sent back to the institutional system 110.

The institutional system 110 then initiates creation of a smart contract to perform the resource transfer as supported by the blockchain system 106. The blockchain system 106 implements a virtual machine 136 that is representative of a diverse range of functionality made possible by leveraging a blockchain 604. In a first such example, the virtual machine 136 implements a distributed ledger 606 of accounts 608 and associated balances 610 of those accounts 608. Distributed ledgers 606 support secure transfer of digital assets (e.g., tokens or coins of cryptocurrencies) between accounts 608. The secure transfer is performable without management by a central authority through storage (illustrated using a storage device) by nodes 612 of the blockchain system 106 as part of transaction data 614. The transaction data 614 is maintained as part of blocks 616 (and associated block IDs 618) of the blockchain 604.

Through synchronized and distributed access supported by the blockchain 604, changes to balances 610 (e.g., a number of tokens) are visible to any entity with access to the blockchain 604. Techniques are also implemented to support management of the balances 610 across the accounts 608, e.g., to enforce rules that a respective account 608 does not transfer more tokens than are available based on a balance 610 specified for that account 608.

In another example, the virtual machine 136 implements a distributed state machine 620 that supports execution of an application 622. The distributed state machine 620 is implemented along with the transaction data 614 within the blocks 616 of the blockchain 604 such that the blocks 616 describe accounts and balances as described above for the distributed ledger 606. The transaction data 614 also supports a machine state, which can change from block to block of the blockchain 604. In one example, the application 622 is executable as part of a "Turing-complete" decentralized virtual machine that is distributed across the nodes 612 of the blockchain system 106. As Turning-complete, the application 622 is computationally universal to perform computing device operations, e.g., logic or computing functions. Thus, the application 622 is executable by a processing system as software that is storable in a computer-readable storage media of the nodes 612 to perform a variety of operations.

An example of an application 622 that is executable as part of the distributed state machine 620 is a smart contract 624. A smart contract 624 is executable automatically and without user intervention (or with partial human interaction wherein desired) by the nodes 612 of the distributed state machine 620. Execution of the smart contract 624 includes obtaining data from a specified data source (e.g., devices, APIs, and so forth that are accessible via the network 112), and based on the data, initiating one or more operations based on conditions described in the smart contract 624. In one example, the smart contract 624 is a type of account 608 that includes a balance 610 and initiates transactions based on conditions specified by the smart contract 624. A variety of other examples are also contemplated that support implementation of any executable operation by a computing device using software.

Accordingly, in this example, the institutional system 110 initiates generation of the smart contract 624 by the blockchain system 106 and allocates the amount of resources to be transferred and communicates a transaction address of the smart contract 624 to the first digital wallet 120. Generation of the application (e.g., the smart contract 624) as executable as part of a blockchain 604 is confirmed by the first digital wallet 120 as complying with the parameters of the resource transfer and the attributes 408 of the respective quote 406 (block 812).

Once confirmed, a communication connection is initiated by the first digital wallet 120 of the first edge device 102 to implement the resource transfer to the respective institutional system 110 (block 814). To do so, the first digital wallet 120 obtains a resource amount that is to be transferred and converted from a first resource type (e.g., fiat currency) to a second resource type, e.g., cryptographic tokens. The user interface module 302 is configurable to select a mechanism to transfer the resource amount through an associated service.

The institutional system 110, upon receiving an indication of resource transfer from the first digital wallet 120, causes execution of the smart contract 624, which releases a corresponding resource amount in the second type of resource (e.g., cryptographic tokens) and completes the resource transfer 602. The first digital wallet 120 of the first edge device 102 then receives an indication of success of the resource transfer through execution of the application (e.g., the smart contract 624) as part of the blockchain (block 816).

Figure 7:
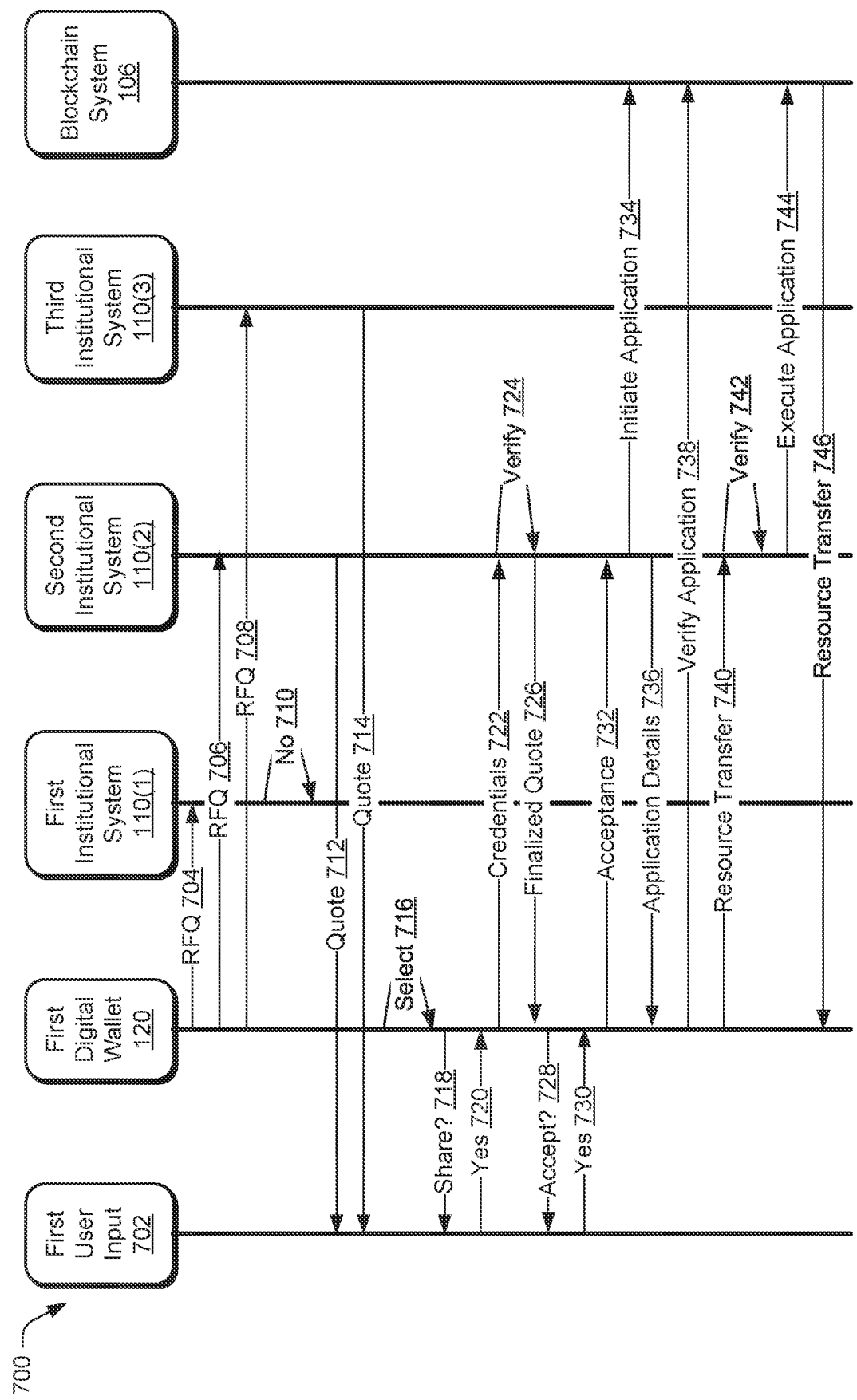
FIG. 7 is a non-limiting example of a state diagram showing operation of the first digital wallet and blockchain system through interaction with a plurality of institutional systems as part of a request-for-quote/quote technique supported by the communication protocol according to an embodiment of the present subject matter.
Figure 8:
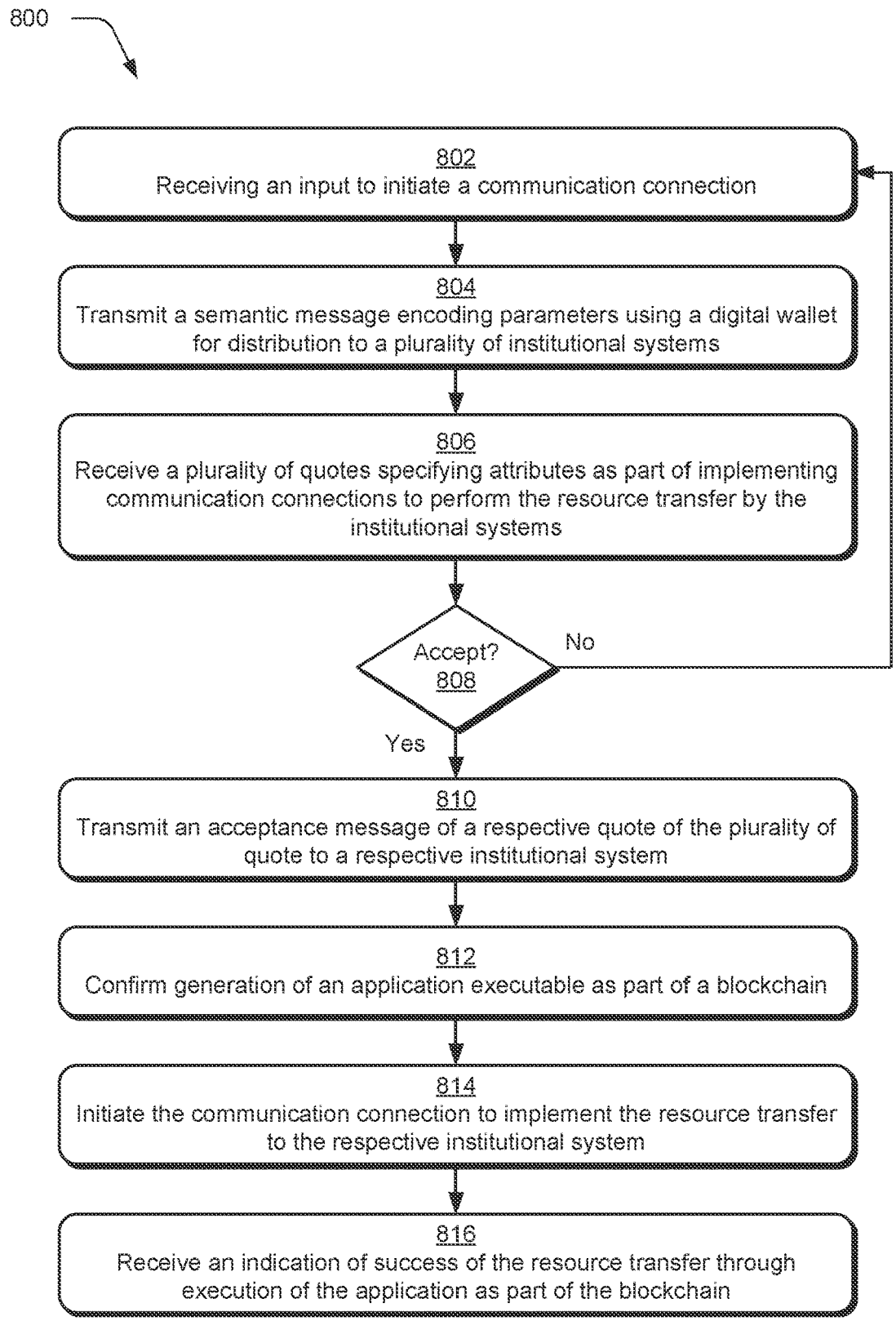
FIG. 8 is a non-limiting example of a flow diagram depicting a procedure in an example implementation of an on-ramp technique as part of a blockchain supported resource transfer communication protocol according to an embodiment of the present subject matter.

FIG. 7 is a non-limiting example 700 of a state diagram showing operation of the first digital wallet 120 and blockchain system 106 through interaction with a plurality of institutional systems as part of a request-for-quote/quote technique supported by the communication protocol 114. This example includes a representation of a first user input 702, first digital wallet 120, first institutional system 110(1), second institutional system 110(2), third institutional system 110(3), and blockchain system 106.

To begin, requests-for-quote 704, 706, 708 for a resource transfer are communicated from the first digital wallet to the first, second, and third institutional systems 110(1)-110(3). The first institutional system 110(1) declines to provide a quote (e.g., "no" 710) for the resource transfer. However, the second and third institutional systems 110(2), 110(3) do provide respective quotes 712, 714.

The first digital wallet 120 is used to select 716 one of the quotes, and permission is requested to share 718 credentials specified in the selected quote. Upon receipt of a user input indicating "yes" 720 that sharing of the credentials is permitted, the credentials 722 are transmitted to the second institutional system 110(2) that is selected, i.e., that corresponds to the selected quote.

The second institutional system 110(2) verifies 724 the credentials, and once verified, transmits a finalized quote 726 for distribution to the first digital wallet 120. A request is output regarding whether to accept 728 the finalized quote 726, and once accepted (e.g., "yes" 730), a message is transmitted from the first digital wallet 120 to the second institutional system 110(2) indicating acceptance 732.

The second institutional system 110(2) upon receipt of acceptance, initiates application 734 execution by the blockchain system 106. Application details 736 are communicated from the second institutional system 110(2) to the first digital wallet 120, which are then used to verify execution of the application 738 by the blockchain system 106. Once verified, the first digital wallet 120 initiates a resource transfer 740, which is verified 742 by the second institutional system 110(2). Once verified, the application 744 is executed and the resource transfer 746 is performed from the blockchain system 106 to the first digital wallet 120. Thus, in the above example an "on-ramp" scenario is described in which a resource transfer is performed to obtain a resource type. In the following examples, an "off-ramp" scenario is described that leverages these resources as part of blockchain support for resource transfer to the second edge device 104.

Figure 9:
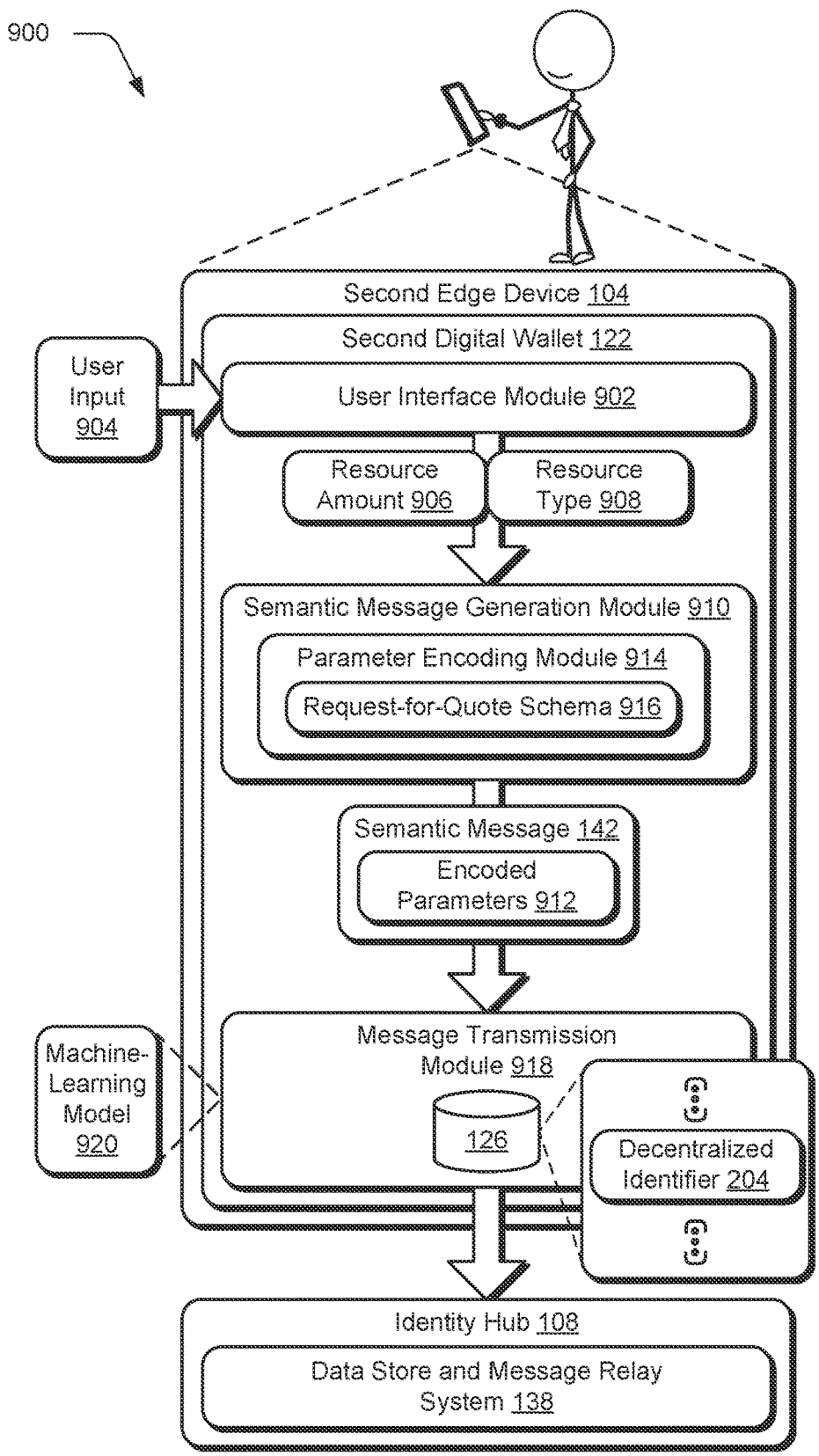
FIG. 9 is a non-limiting example showing operation of a digital wallet as generating and transmitting a request-for-quote as part of the request-for-quote messaging protocol of the communication protocol of FIG. 1 in an "off-ramp" scenario according to an embodiment of the present subject matter.
Figure 14:
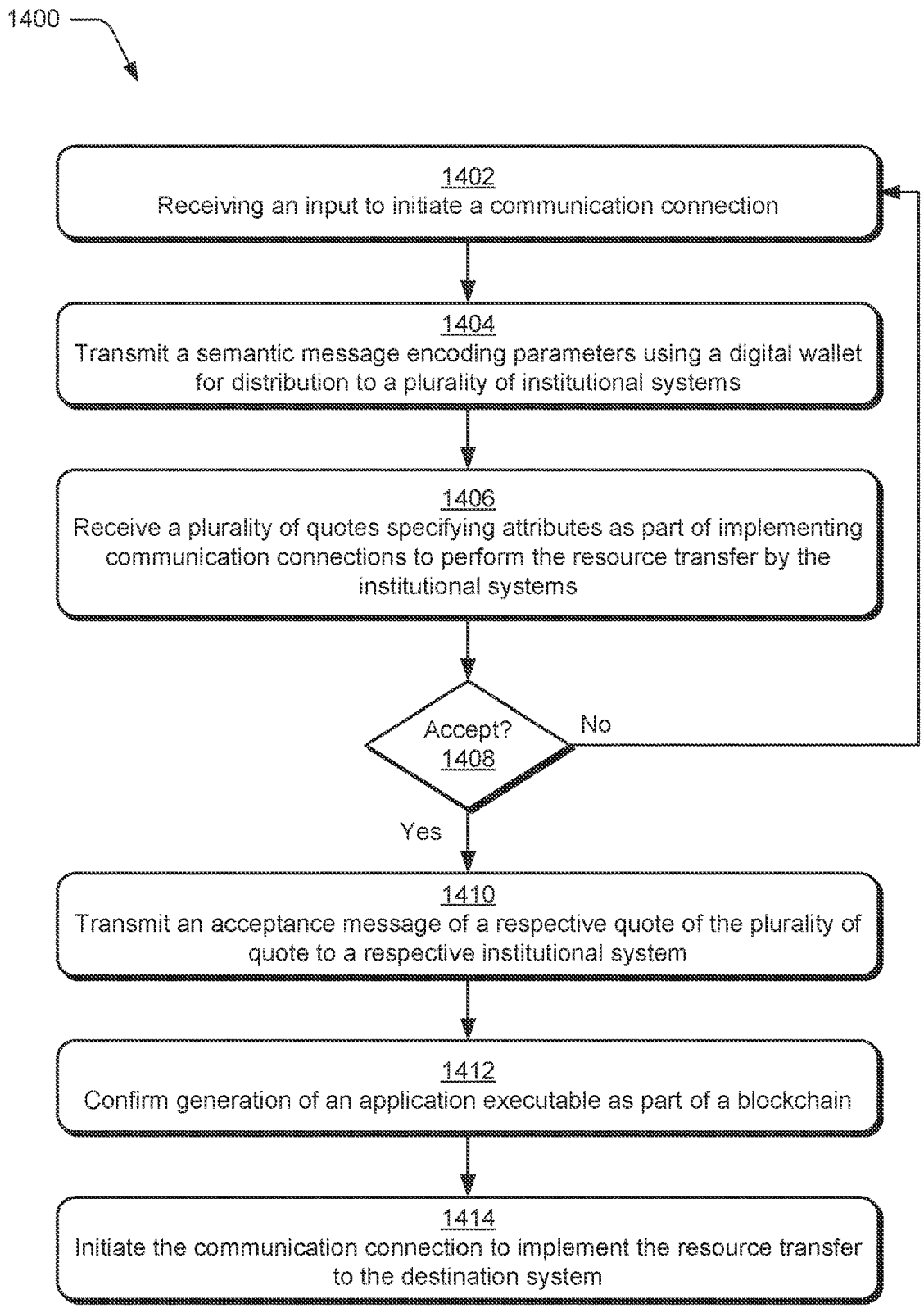
FIG. 14 is a flow diagram depicting a procedure in an example implementation of an off-ramp technique as part of a blockchain supported resource transfer communication protocol according to an embodiment of the present subject matter.

FIG. 9 is a non-limiting example 900 showing operation of a second digital wallet as generating and transmitting a request-for-quote as part of an "off-ramp" scenario. This discussion is made in parallel with a procedure 1400 of FIG. 14.

In an example, the second digital wallet 122 of the second edge device 104 is configured to obtain the resources transferred as described in FIGS. 2-8 into cryptographic tokens and convert these resources into another resource type, e.g., a different fiat currency. As such, these techniques are usable to implement an overall resource transfer from the first digital wallet 120 to the second digital wallet 122 as part of the communication protocol 114 without use of a centralized authority. The second digital wallet 122 also includes decentralized identifiers 204 maintained a storage device 126 using techniques similar to those as described previously in relation to FIG. 2.

A user interface module 902 is employed as part of the second digital wallet 122 to output a user interface. A user input 904 is received that includes parameters to be implemented as part of a resource transfer from a digital wallet (block 1402), e.g., to a destination system. To do so, the user input 904 specifies a resource amount 906 and a resource type 908, e.g., a type of fiat currency.

The resource amount 906 and resource type 908 are then used by a semantic message generation module 910 to generate a semantic message 142 having encoded parameters 912 (e.g., the resource amount and resource type 908). The semantic message 142 in this example is also representative of a request-for-quote (e.g., "ASK") that is configured to invite quotes (e.g., "BIDs") to perform a resource transfer based on the encoded parameters 912.

To generate the semantic message 142, the semantic message generation module 910 employs a parameter encoding module 914 that follows the request-for-quote schema 916. The semantic message 142, configured as a request-for-quote, is configured for transmission to a plurality of institutional systems 110. The semantic message 142 includes information usable by these systems to evaluate the request to determine whether or not to participate in the resource transfer and parameters of a quote specifying criteria in order to perform the resource transfer.

The encoded parameters 912, for instance, include a decentralized identifier usable as part of the communication protocol 114 that is associated with an entity that corresponds with the digital wallet, e.g., whether an individual (e.g., a second user associated with the second edge device 104), an institution, and so forth. The encoded parameters 912 also specify a "desired resource type," e.g., a type of cryptographic token, fiat currency, and so forth. Examples of resource types 908 include Bitcoin (BTC), Moneta Digital (MMXN), a tokenized US dollar (USDC), a fiat US dollar, fiat Euro, and so forth. The encoded parameters 912 also include a resource amount 906, e.g., an amount of the resource type 908.

The encoded parameters 912 are also configurable to specify a "desired settlement scheme" to be used to perform the resource transfer. Specification of the schema 148 permits the second digital wallet 122 to specify particular blockchain support that is to be used to settle the resource transfer. Stablecoins, for instance, are available via a plurality of different blockchains, and bitcoin is configurable for settlement using a variety of solutions, such as Lightning (LBTC). Settlement protocols for fiat currencies include mechanisms such as single Euro payments area (SEPA), automated clearing house (ACH), payment cards, society for worldwide interbank financial telecommunication (SWIFT), or others.

An "offered resource type" is included as part of the encoded parameters 912 that specifies a type of the asset that is proposed for payment. As such, these parameters are configurable much like the "desired resource type" parameters above. In another example, an "offered settlement scheme" is used as part of the encoded parameters 912 to specify a settlement scheme desired for use for the offered resource type and is configurable to include parameters similar to the "desired settlement scheme" above. An "offered resource amount" is also includable as part of the encoded parameters 912 in an instance in which an amount of a desired resource is offered. The offered resource amount parameter is left empty in scenarios in which a proposed amount from an institutional system 110 is desired in response to the request-for-quote.

The semantic message 142 and encoded parameters 912 are output to a message transmission module 918. The message transmission module 918 is configured to transmit the semantic message 142 for distribution to a plurality of institutional systems (block 1404), e.g., over the network 112. Transmission is based on the decentralized identifiers 204 maintained in a second storage device 126 as previously described. Transmission of the semantic message 142 is performable in a variety of ways, including directly to institutional systems 110 specified in the semantic message 142, indirectly through use of a data store and message relay system 138 of the identity hub 108, and so forth.

In an implementation, the message transmission module 918 is configurable to select the institutional systems 110 that are to receive the semantic message 142, automatically and without user intervention. To do so, the message transmission module 918 is configurable to employ a machine-learning model 920 trained using machine learning to select an institutional system 110 based on a likelihood of providing a quote (e.g., in response to the request-for-quote), a likelihood of being accepted by the second digital wallet 122 to perform the resource transfer, and so forth.

In a first scenario, in order to improve operational efficiency the machine-learning model 920 learns from training data generated from resource transfers performed by the second edge device 102. Training of the machine-learning model 920 is performed to train the model to identify which institutional systems 110 are likely to respond to requests-for-quotes based on the parameters 912 included in the semantic message 142. As a result, the machine-learning model 920 learns and is "tuned" over time (e.g., retrained) to determine probabilities and select decentralized identifiers 204 of those institutional systems 110.

In a second scenario, the machine-learning model 920 learns from training data generated from resource transfers performed by the second edge device 104 as to which institutional systems 110 are likely to be selected by the second digital wallet for participation in an actual resource transfer, e.g., based on the parameters 912 included in the semantic message 142, data describing the institutional system 110, and so forth. As a result, the machine-learning model 920 learns and is "tuned" over time (e.g., retrained) to determine probabilities and select decentralized identifiers 204 of those institutional systems 110 that are likely to be successful in performing the resource transfer, e.g., based on a ranked order of probabilities output by the model. In both examples, operational efficiency is improved of the second edge device 104 as well as other devices involved in implementing the communication protocol 114 by optimizing message transfer in the system 100.

Figure 10:
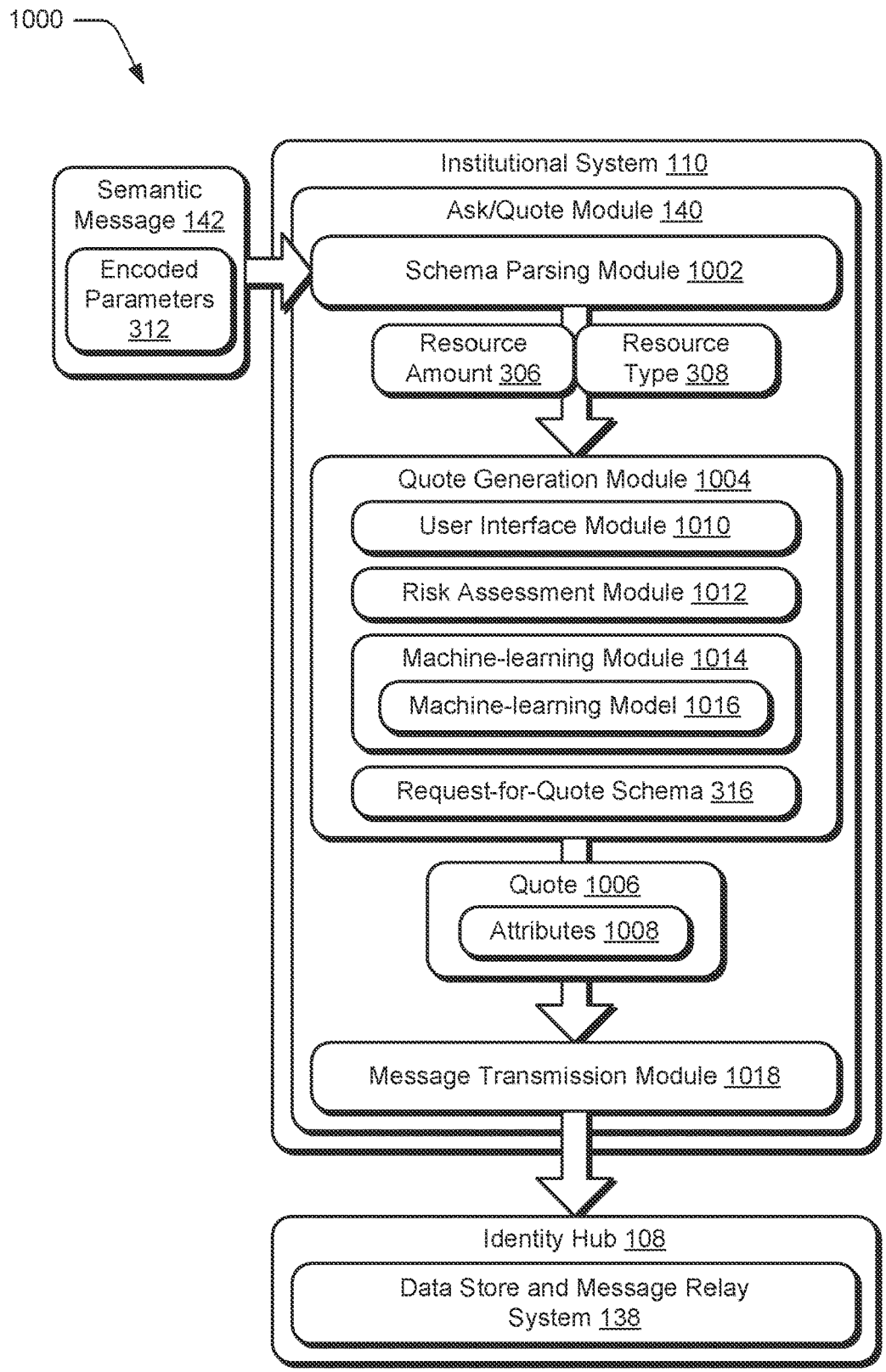
FIG. 10 is a non-limiting example showing operation of an institutional system as generating a quote according to an embodiment of the present subject matter.

FIG. 10 is a non-limiting example 1000 showing operation of an institutional system as generating a quote. This example continues from FIG. 9, in which, the semantic message 142 having the encoded parameters 912 is received by an institutional system 110, e.g., directly from the second digital wallet 122, indirectly via the identity hub 108, and so forth.

A schema parsing module 1002 is first utilized to determine objects included as part of the semantic message 142 based on the request-for-quote schema 316. The object determination is performed to determine the resource amount 906 and the resource type 908. In an example, other parameters are also determined based on the request-for-quote schema 316, examples of which include a desired settlement scheme, offered resource type, offered settlement scheme, and so forth as previously described.

The quote generation module 1004 is then employed to determine whether to generate a quote to perform the resource transfer. If so, the quote generation module 1004 generates attributes 1008 that are proposed by the institutional system 110 for performing the resource transfer.

Generation of the quote 1006 is performable in a variety of ways. In a first example, a user interface module 1010 is employed to receive user inputs, via a user interface, that specify the attributes 1008, e.g., from a user associated with the institutional system 110. In a second example, a risk assessment module 1012 is utilized to assess an amount of risk, which is usable to determine whether to provide a quote 1006, an amount of resources requested to perform the resource transfer, and so forth.

The risk assessment module 1012 is configurable to address a variety of types of risks involved. The risk assessment module 1012, for instance, is configurable to determine a risk level associated with the resource transfer, and based on the risk level, float an amount of resources based on the risk. In a low-risk scenario, the risk assessment module 1012 determines there is a low level of risk in a situation that is likely to involve a significant amount of time. In such a scenario, the risk assessment module 1012 is configured to include attributes 1008 in the quote 1006 indicating the institutional system 110 is willing to "float" those resources (i.e., provide before settlement) for a specified amount of time.

To do so, the risk assessment module 1012 is configurable to employ a machine-learning module 1014 having a machine-learning model 1016 trained to specify a probability as an amount of risk involved in the resource transfer. The machine-learning model 1016, for instance, is trained using training data to quantify an amount of risk, e.g., based on a resource amount and time for settlement. The quantification of risk is usable along with a threshold amount to determine when to make the offer and when not to. Further training of the machine-learning model 1016 is usable to specify an amount of float for an amount of funds in the quote 1006 that is likely to be accepted by a particular entity to perform the resource transfer, e.g., the second digital wallet 122.

The quote generation module 1004 also employs the request-for-quote schema 316 to encode the attributes 1008 as part of the quote 1006. The quote 1006, as encoded, is configured to include a decentralized identifier of the institutional system 110. The quote 1006 is also configurable to specify a proposed cost for the resource transfer in an offered asset type specified by the request-for-quote. A proposed settlement amount is also encodable as part of the attributes 1008 that indicates a cost of settlement to be collected by the institutional system 110.

A settlement time is specified in one or more examples indicative of a maximum amount of time (e.g., from a time at which the quote 1006 is accepted) that settlement of the resource transfer is to be effectuated. An expiration time is also configurable as a "quote expiration" in the encoded attributes 1008 that specifies a time, at which, the quote 1006 is considered stale and no longer applicable (e.g., "honored") by the institutional system 110. Lastly, a signature of the institutional system 110 is used to encode the attributes 1008 (e.g., using a private cryptographic key) to protect integrity of the quote 1006.

The quote 1006, once generated and encoded, is then output to a message transmission module 1018. The message transmission module 1018 is configured to distribute the quote 1006 (as a semantic message 142 in compliance with the request-for-quote messaging protocol 144 of the communication protocol 114) back to the second digital wallet 122. As before, communication is performable directly via the network 112 to the second edge device 104, indirectly through use of the data store and message relay system 138 of the identity hub 108, and so forth.

Figure 11:
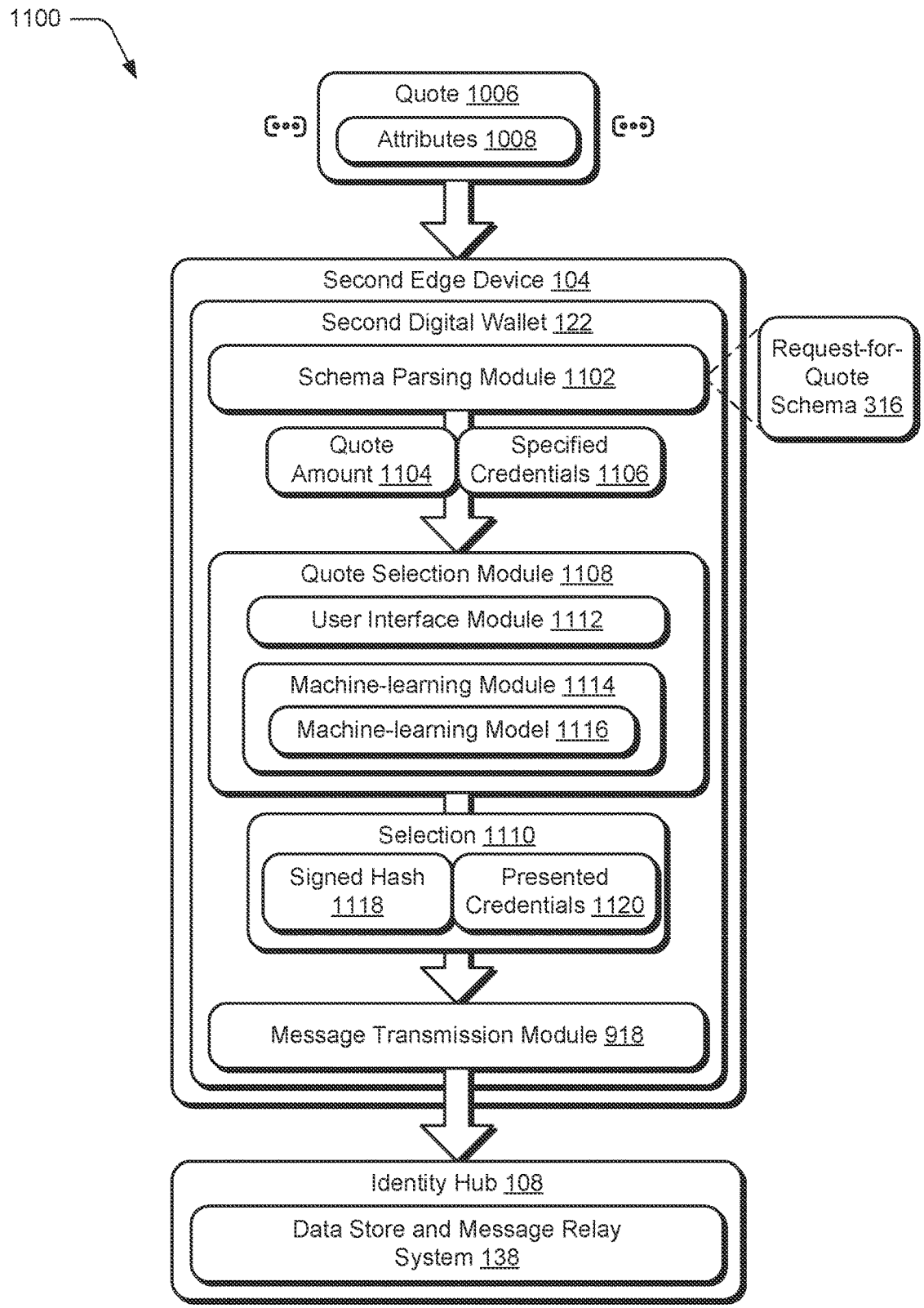
FIG. 11 is a non-limiting example showing operation of the second edge device as selecting a quote from a plurality of quotes received responsive to the request-for-quote of FIG. 9 according to an embodiment of the present subject matter.

FIG. 11 is a non-limiting example 1100 showing operation of the second edge device as selecting a quote from a plurality of quotes received responsive to the request-for-quote of FIG. 9. The second digital wallet 122 of the second edge device 104 receives a plurality of quotes specifying proposed parameters as part of implementing communication connections to perform the resource transfer by the institutional systems in compliance with the parameters specified by the semantic message (block 1406), e.g., the quote 1006 and attributes 1008 as generated with respect to FIG. 10.

A schema parsing module 1102 is utilized by the second digital wallet 122 to parse objects using a request-for-quote schema 316 from the quote 1006, examples of which include a quote amount 1104 and specified credentials 1106 that are acceptable by the institutional system 110 to perform the resource transfer. Additional parameters are also parsed from the quote 1006, e.g., an offer to float resources, risk assessment, and so forth.

A determination is then made by the second digital wallet 122 as whether to accept one of the quotes (decision block 1408). If not ("no" from decision block 1408) the procedure returns to block 1402 and if so ("yes" from decision block 1408) the procedure 1400 continues.

A quote selection module 1108 is then employed to make a selection 1110 from the plurality of quotes as to which quote is to be used as a basis to perform the resource transfer. In a first example, a user interface module 1112 is employed to output a user interface. The user interface displays the quotes 1006 and associated attributes 1008. The quotes 1006 are user selectable via the interface, which causes output of a selection 1110 to the message transmission module 918 (e.g., as a semantic message 142) automatically and without user intervention back to the institutional system 110 that is selected. Additional messages are also configurable, e.g., to indicate to other participating institutional systems that respective quotes have not been accepted.

The quote selection module 1108 is also configurable to leverage a machine-learning module 1114 implementing a machine-learning model 1116. The machine-learning model 1116 is configured to assist in generating the selection 1110. The machine-learning model 1116, similar to the risk assessment module 1012 of FIG. 10, is configurable to assess an amount of risk in accepting a quote 1006, e.g., based on training data generated by the second edge device 104, across a plurality of edge devices in the system 100 of FIG. 1, and so forth. An amount of risk is displayable in the user interface output by the user interface module 1112 to assist a user in making the selection 510. A variety of other examples are also contemplated.

The selection 1110, once made, causes generation of a signed hash 1118 of the quote 1006 along with presented credentials 1120 of the second digital wallet 122 as specified by the quote 1006. The selection 1110 is then transmitted as an acceptance message of the respective quote of the plurality of quotes by the message transmission module 918 back to the institutional system 110 corresponding to the quote 1006. The selection 1110, as part of the acceptance message (e.g., configured as a semantic message 142) includes the presented credentials 1120 of the second digital wallet 122 (block 1410).

Figure 12:
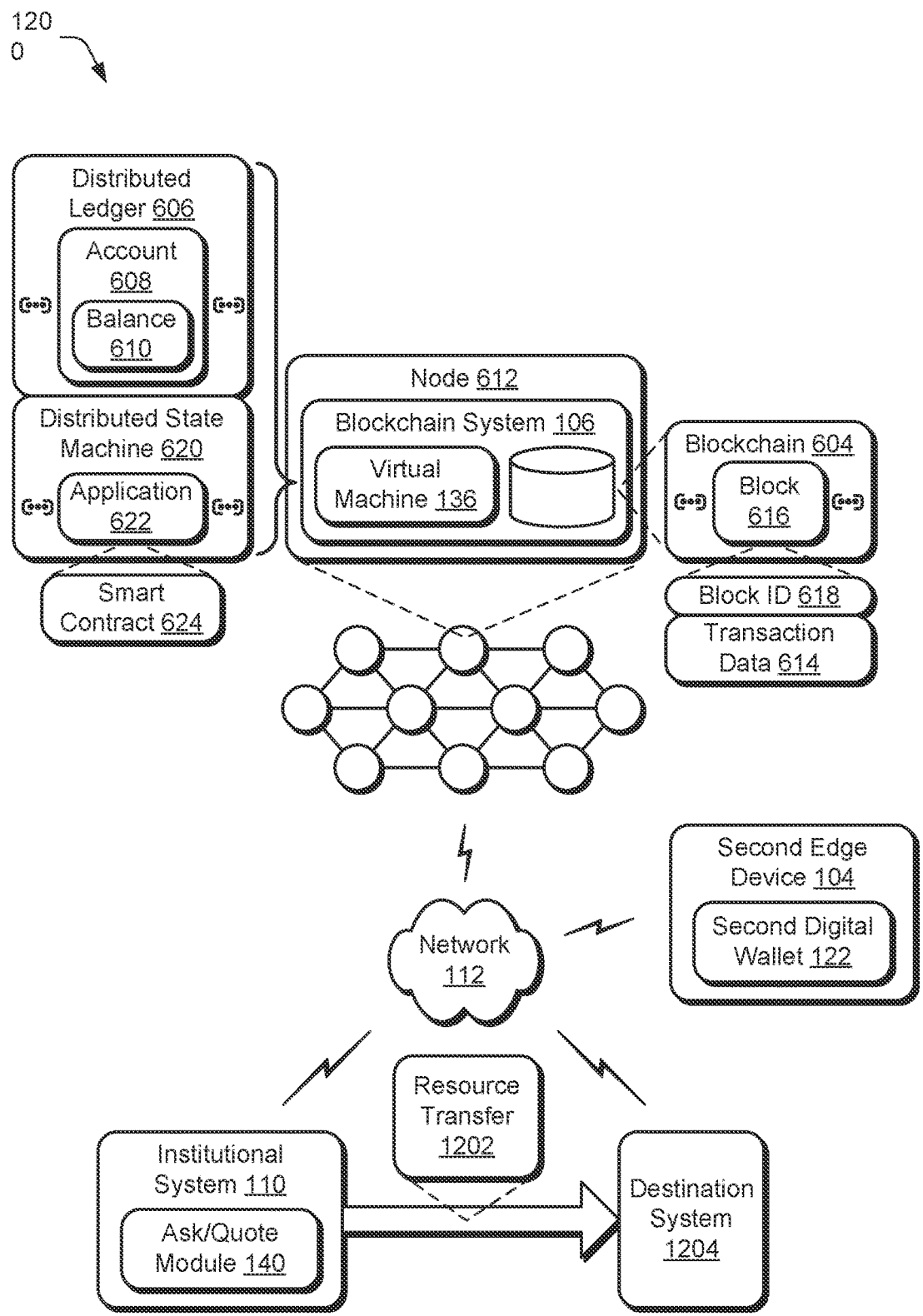
FIG. 12 is a non-limiting example showing operation of the blockchain system along with the institutional system selected in FIG. 11 and the second edge device as implementing a resource transfer according to an embodiment of the present subject matter.

FIG. 12 is a non-limiting example 1200 showing operation of the blockchain system 106 along with the institutional system 110 selected in FIG. 11 and the second edge device 104 as implementing a resource transfer. The institutional system 110 as illustrated receives the selection 1110 of FIG. 11 as a semantic message 142. The selection 1110 is verified by the institutional system 110 using the ask/quote module 140, including verification of credentials within the semantic message 142 as complying with the credentials specified in the attributes 1008. Once verified, a finalized quote is communicated back to the second edge device 104 via the network 112, and is accepted by signing it (e.g., using a digital signature) and sent back to the institutional system 110.

The second digital wallet 122 as illustrated then initiates creation of a smart contract 624 to perform the resource transfer as supported by the blockchain system 106. As previously described, a virtual machine 136 of the blockchain system 106 implements a distributed state machine 620 that supports execution of an application 622. An example of an application 622 that is executable as part of the distributed state machine 620 is a smart contract 624. A smart contract 624 is executable automatically and without user intervention (or with partial human interaction wherein desired) by the nodes 612 of the distributed state machine 620. Execution of the smart contract 624 includes obtaining data from a specified data source (e.g., devices, APIs, and so forth that are accessible via the network 112), and based on the data, initiating one or more operations based on conditions described in the smart contract 624.

Accordingly, the second digital wallet 122 initiates generation of the smart contract 624 by the blockchain system 106, allocates the amount of resources to be transferred, and communicates a transaction address of the smart contract 624 to the institutional system 110. Generation of the application (e.g., the smart contract 624) as executable as part of a blockchain 604 is confirmed by the institutional system 110 as complying with the parameters of the resource transfer and the attributes 1008 of the respective quote 1006 (block 1412).

Once confirmed, a communication connection is initiated by the institutional system 110 to implement the resource transfer 1202 to a destination system 1204 specified by the semantic message 142 (block 1414), i.e., the request-for-quote. To do so, the institutional system 110 obtains a resource amount that is to be transferred and converted from the second resource type (e.g., cryptographic tokens currency) to a first resource type, e.g., fiat currency.

The second digital wallet 122, upon receiving an indication of resource transfer from the institutional system 110 to the destination system 1204, causes execution of the smart contract 624, which releases a corresponding resource amount in the first type of resource (e.g., fiat currency) and completes the resource transfer 1202.

Figure 13:
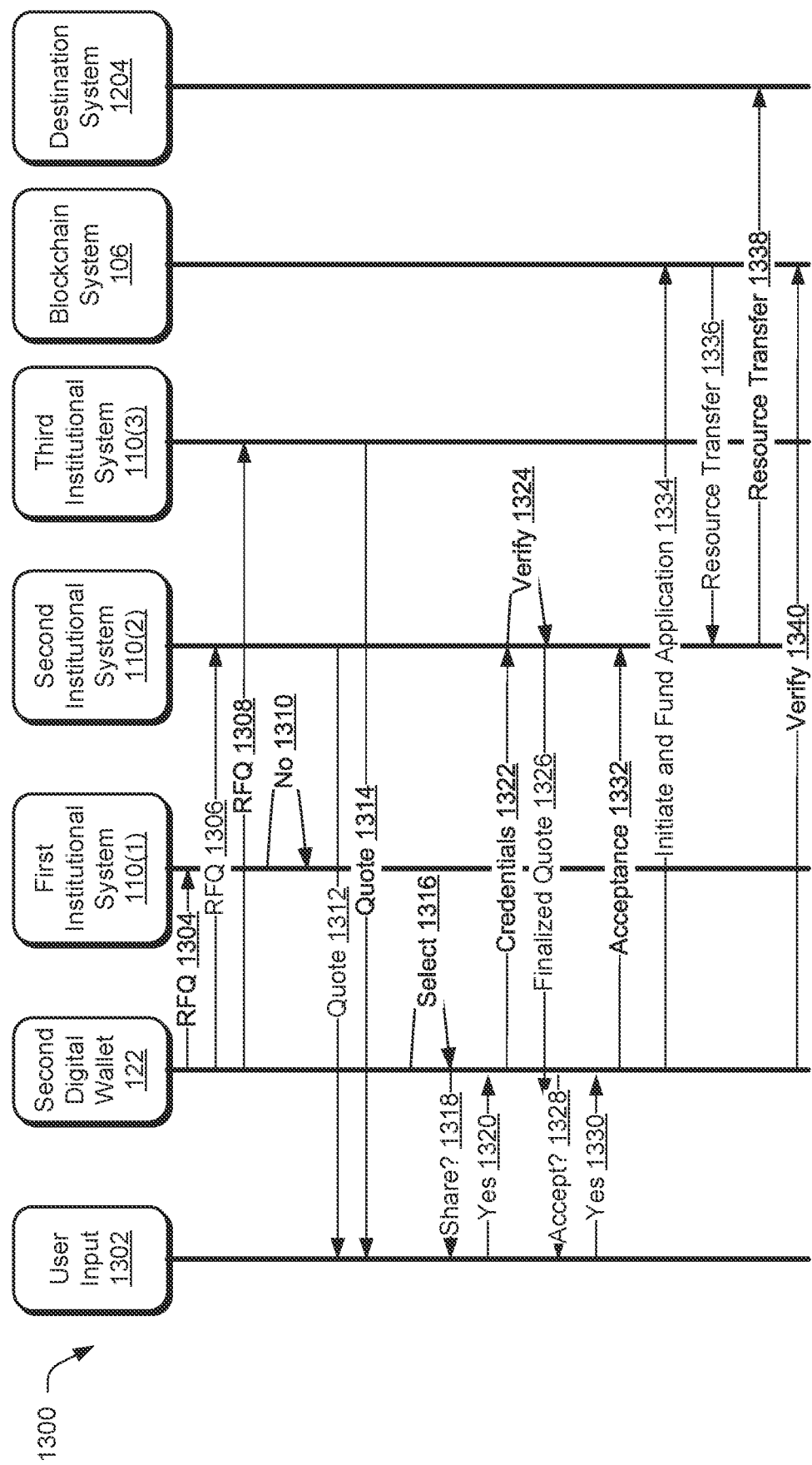
FIG. 13 is a non-limiting example of a state diagram showing operation of the second digital wallet and blockchain system through interaction with a plurality of institutional systems as part of a request-for-quote/quote technique supported by the communication protocol according to an embodiment of the present subject matter.

FIG. 13 is a non-limiting example 1300 of a state diagram showing operation of the second digital wallet 122 and blockchain system 106 through interaction with a plurality of institutional systems as part of a request-for-quote/quote technique supported by the communication protocol 114. This example includes a representation of a user input 1302, the second digital wallet 122, first institutional system 110(1), second institutional system 110(2), third institutional system 110(3), blockchain system 106, and destination system 1204.

To begin, requests-for-quote 1304, 1306, 1308 for a resource transfer are communicated from the second digital wallet 122 to the first, second, and third institutional systems 110(1)-110(3). The first institutional system 110(1) declines to provide a quote (e.g., "no" 1310) for the resource transfer. However, the second and third institutional systems 110(2), 110(3) do provide respective quotes 1312, 1314.

The second digital wallet 122 is used to select 1316 one of the quotes, and permission is requested from a user to share 1318 credentials specified in the selected quote. Upon receipt of a user input indicating "yes" 1320 that sharing of the credential is permitted, the credentials 1322 are transmitted to the second institutional system 110(2) that is selected.

The second institutional system 110(2) verifies 1324 the credentials, and once verified, transmits a finalized quote 1326 for receipt by the second digital wallet 122. A request is output regarding whether to accept 1328 the finalized quote 1326, and once accepted (e.g., "yes" 1330) a message indicating acceptance 1332 is transmitted from the second digital wallet 122 to the second institutional system 110(2).

The second digital wallet 122 also initiates application execution 1334 by the blockchain system 106 and funds the resource transfer. Application details are communicated from the second digital wallet 122 to the second institutional system 110(2). The second institutional system 110(2) queries the smart contract to ensure an agreed upon amount is present and then initiates a resource transfer 1336 to pull the funds into an associated digital wallet through execution of the contract. The second institutional system 110(2), upon receipt of the funds, then initiates a resource transfer 1338 to a destination system 1204 specified in the request-for-quote, which is then verified 1340 by the second digital wallet 122. Thus, in the above example an "off-ramp" scenario is described in which a resource transfer is performed to complete a resource transfer between the first and second edge devices 102, 104.

FIGS. 15-19 describe an "end-to-end" resource transfer between the first and second edge devices 102, 104 of FIG. 1, which are referred to as a "sender edge device" and a "recipient edge device" having respective digital wallets. In this example, the resource transfer is performed across a boundary (in this example, a geographic boundary is illustrated, although other boundary types are considered) in which a stable coin depicted as "Usdc" is leveraged to support transfer from U.S. Dollars "USD" to Mexican pesos "MXN" in the illustrated examples. The illustrated scenario in FIGS. 15-19 represents one example, and other examples of resource transfers are considered as well, such as other fiat currency types (e.g., Euro, British pound, Indian rupee, Philippine peso, and so forth), and other digital asset types (Bitcoin, Ethereum, Tether, and so on).

Figure 15:
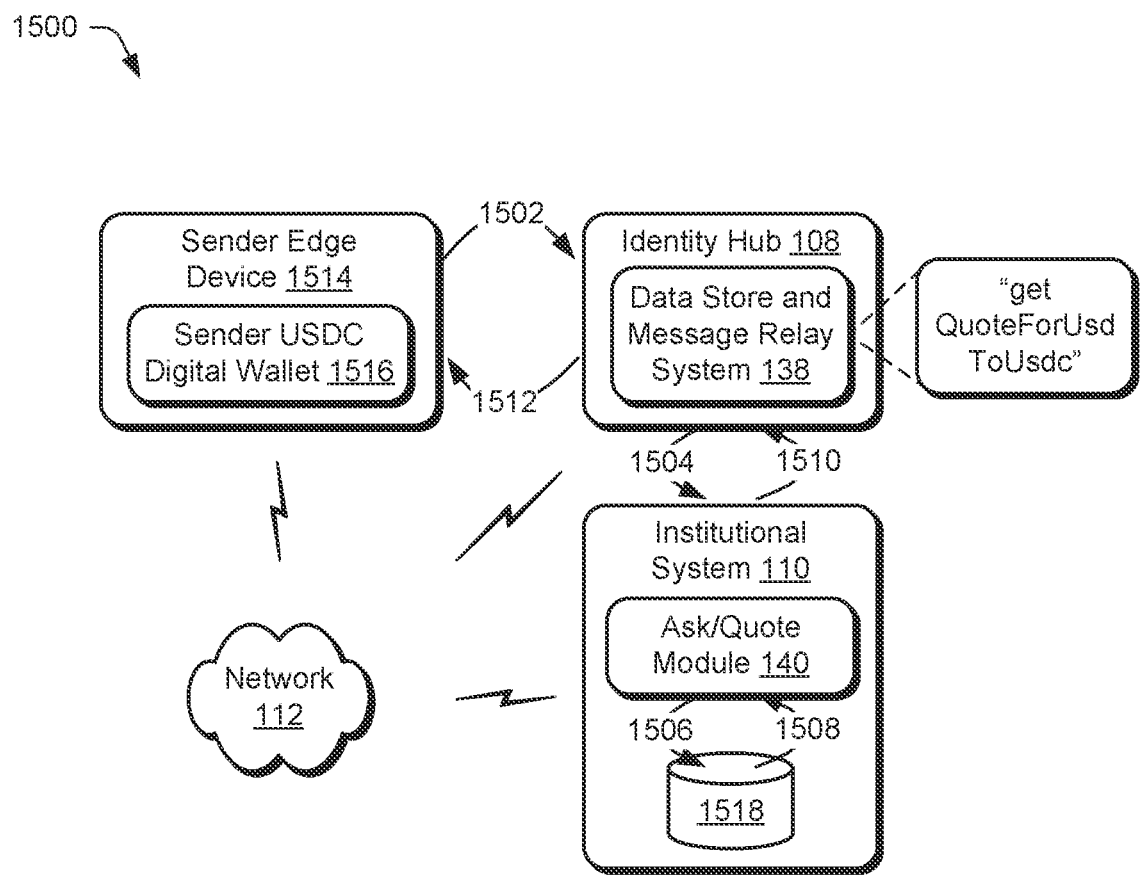
FIG. 15 is a block diagram depicting a non-limiting example system showing execution by a first edge device of FIG. 1 configured as a sender edge device to initiate a request-for-quote operation and receive quotes for a resource transfer of an "on-ramp" scenario according to an embodiment of the present subject matter.

FIG. 15 is a block diagram depicting a non-limiting example system 1500 showing execution by a first edge device of FIG. 1 configured as a sender edge device to initiate a request-for-quote operation and receive quotes for a resource transfer of an "on-ramp" scenario. Examples of instruction communication and data flow are depicted in this example using arrows 1502-1512.

The first edge device 102 is represented as a sender edge device 1514 having tokenized U.S. Dollar stable coin digital wallet depicted as "sender USDC digital wallet" 1516. The sender USDC digital wallet 1516 transmits a request (arrow 1502) to a data store and message relay system 138 of the identity hub 108 to transmit a request-for-quotes to institutional systems, e.g., via "getQuoteForUsdToUsdc" API. These request-for-quotes including parameters involved in a resource transfer from the sender edge device 1514 to a specified recipient edge device.

The data store and message relay system 138 is utilized to transmit the request-for-quote to participating institutional systems (arrow 1504), an example of which is represented as institutional system 110. An ask/quote module 140 of the institutional system 110, in response, queries a database 1518 of quotes based on parameters included in the request-for-quote. A search result (arrow 1508) including a selected quote is transmitted by the quote module 140 (arrow 1510) via the data store and message relay system 138 and back to the sender USDC digital wallet 1516 (arrow 1512). In this way, the sender edge device 1514 receives a plurality of quotes, e.g., quotes 712, 714 in FIG. 7, based on parameters specified in the request-for-quote (RFQ).

Figure 16:
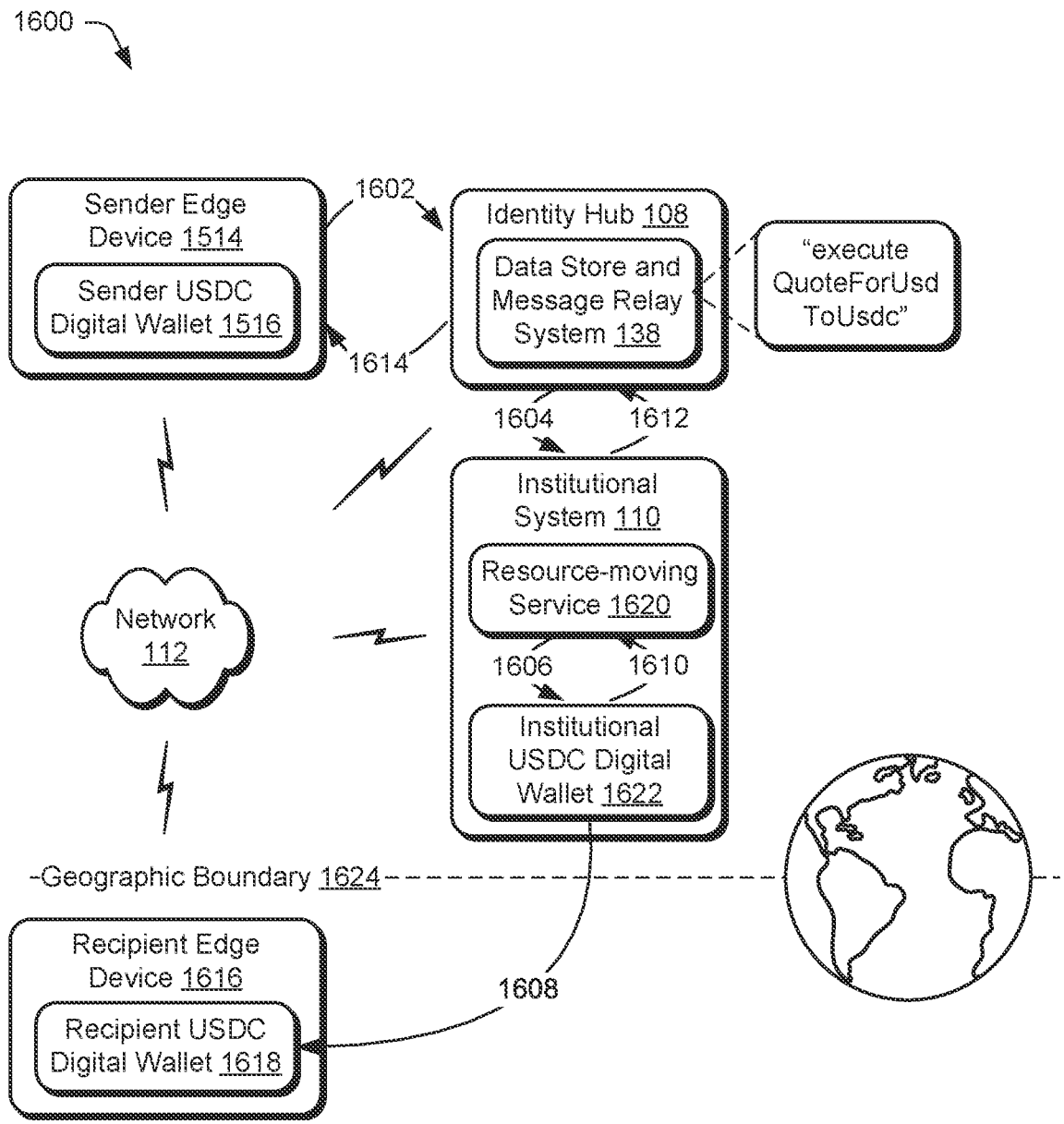
FIG. 16 is a block diagram depicting a non-limiting example system showing execution of a quote as part of an on-ramp scenario of a resource transfer from a sender edge device to a recipient edge device according to an embodiment of the present subject matter.

FIG. 16 is a block diagram depicting a non-limiting example system 1600 showing execution of a quote as part of an on-ramp scenario of a resource transfer from a sender edge device to a recipient edge device. Examples of instruction communication and data flow are depicted in this example using arrows 1602-1614. Continuing with the previous example, the sender edge device 1514 initiates a resource transfer to a recipient edge device 1616 and associated recipient USDC digital wallet 1618.

To do so, a quote is selected by the sender edge device 1514 from quotes received in FIG. 15. The sender edge device 1514 then transmits an indication of this acceptance (arrow 1602) to the identity hub 108 to a respective API to "executeQuoteforUsdtoUsdc." In response, the data store and message relay system 138 of the identity hub 108 transmits the acceptance to a resource-moving service 1620 of an institutional system 110 to move funds from the sender edge device 1514 as indicated in the accepted quote. This is performable in a variety of ways, such as through a card charging service, bank transfer, and so on.

Once completed, the resource-moving service 1620 calls an application programming interface of an institutional USDC digital wallet 1622 (arrow 1608) to initiate a corresponding resource transfer of USDC to the recipient USDC digital wallet 1618 of the recipient edge device 1616 across a geographic boundary 1624. Acknowledgement (arrow 1610) of completion of the transfer is communicated back to the resource-moving service (arrow 1610), and through the identity hub 108 (arrow 612) to the sender USDC digital wallet 1516 (arrow 1614). Thus, in this example a resource transfer has been performed to "on ramp" cryptographic resources from fiat resources (e.g., USD) using the sender USDC digital wallet 1516 to the recipient USDC digital wallet 1618 by using a stable coin as an intermediary, e.g., USDC. In the following discussion, techniques to "off ramp" these resources from the stable coin as an intermediary into another fiat currency (Mexican pesos "MXN") are described.

Figure 17:
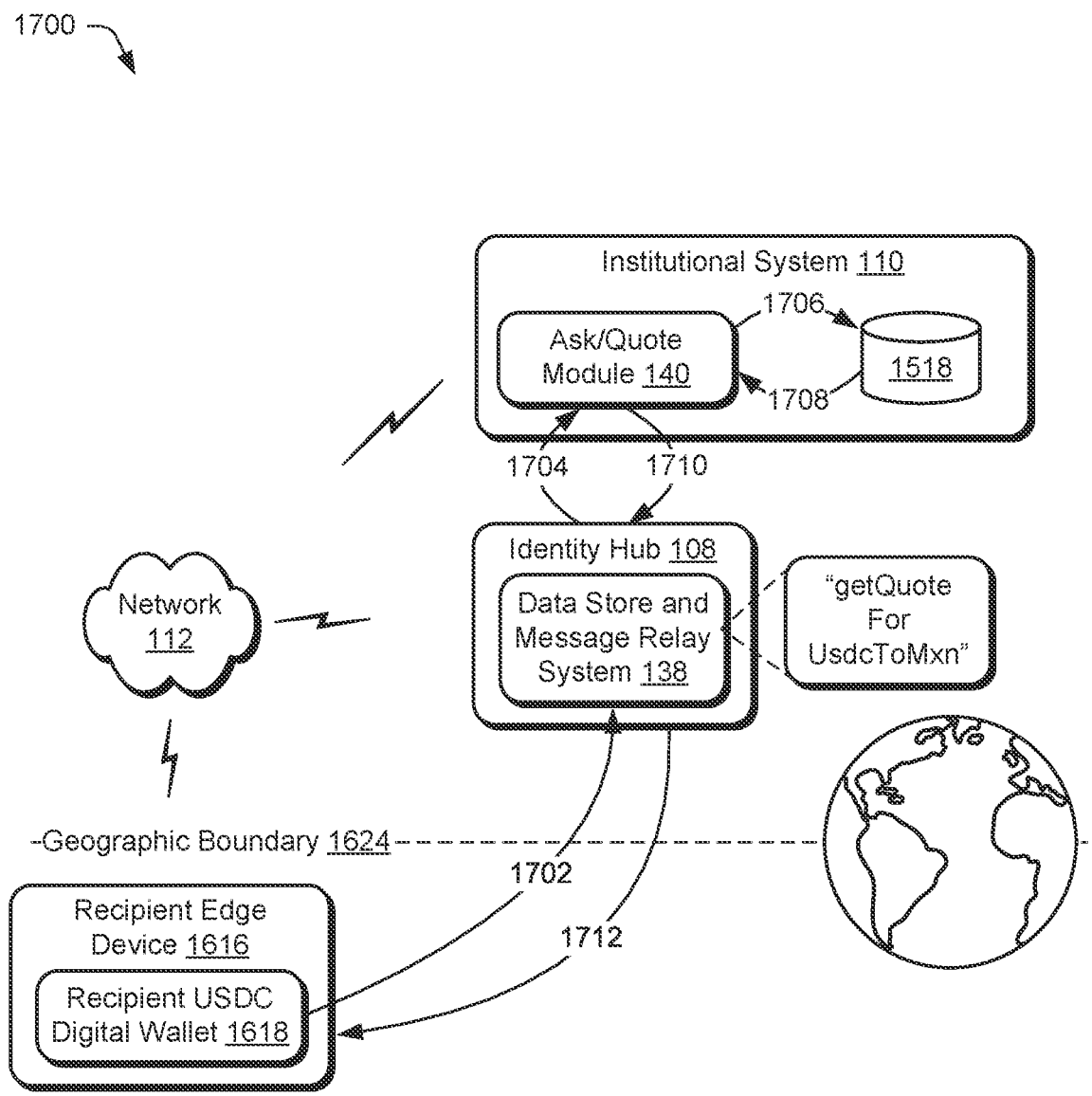
FIG. 17 is a block diagram depicting a non-limiting example system showing execution of a quote as part of an on-ramp scenario of a resource transfer from a sender edge device to a recipient edge device according to an embodiment of the present subject matter.

FIG. 17 is a block diagram depicting a non-limiting example system 1700 showing execution of a quote as part of an on-ramp scenario of a resource transfer from a sender edge device to a recipient edge device. Examples of instruction communication and data flow are depicted in this example using arrows 1702-1712.

Initiation and collection of quotes in order of "off ramp" resources is similar to a process to "on ramp" those resources as described in relation to FIG. 15. The parameters in this example specify a conversion from a stable coin intermediary (e.g., USDC) to a fiat currency, Mexican pesos represented as "Mxn" in the figure, across a geographic boundary 1624 and thus overcome challenges of conventional centralized systems as described above.

The second edge device 104 is represented as the recipient edge device 1616 having tokenized U.S. Dollar stable coin digital wallet depicted as "recipient USDC digital wallet" 1618. The recipient USDC digital wallet 1618 transmits a request (arrow 1702) to a data store and message relay system 138 of the identity hub 108 to transmit a request-for-quotes to institutional systems, e.g., via "getQuoteForUsdToUsdc" API. These request-for-quotes include parameters involved in a resource transfer from the stable coins (USDC) to the fiat currency "Mxn."

The data store and message relay system 138 is utilized to transmit the request-for-quote to participating institutional systems (arrow 1704), an example of which is represented as institutional system 110. An ask/quote module 140 of the institutional system 110, in response, queries a database 1518 of quotes based on parameters included in the request-for-quote. A search result (arrow 1708) including a selected quote is transmitted by the quote module 140 (arrow 1710) via the data store and message relay system 138 and back to the recipient USDC digital wallet 1618 (arrow 1712). In this way, the sender edge device 1514 receives a plurality of quotes (e.g., quotes 1312, 1314 in FIG. 13) based on parameters specified in the request-for-quote (RFQ) as part of an "off-ramp" of the funds.

Figure 18:
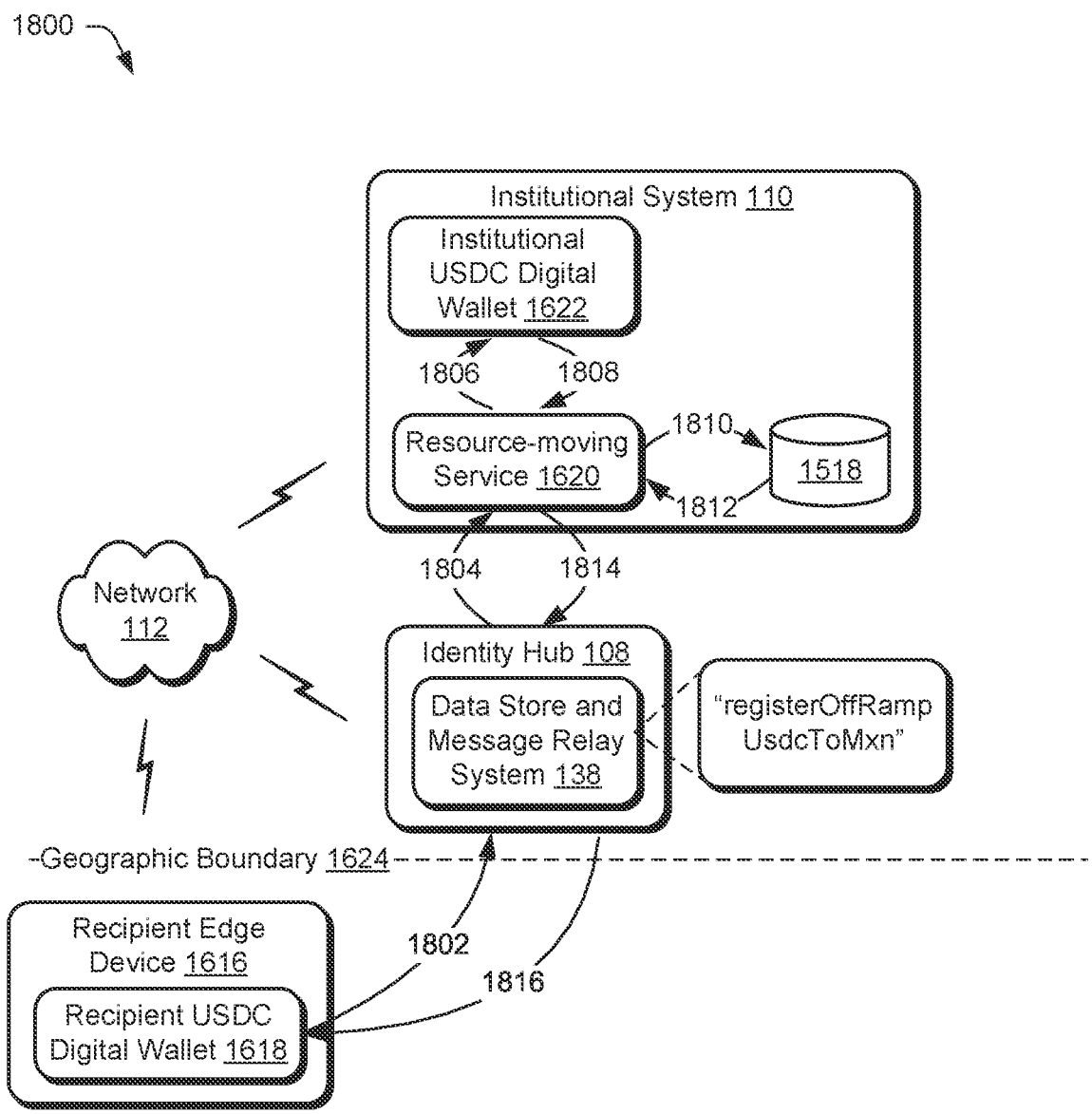
FIG. 18 is a block diagram depicting a non-limiting example system showing execution by a recipient edge device to register for a resource transfer in an "off-ramp" scenario according to an embodiment of the present subject matter.

FIG. 18 is a block diagram depicting a non-limiting example system 1800 showing execution by a recipient edge device to register for a resource transfer in an "off-ramp" scenario. Examples of instruction communication and data flow are depicted in this example using arrows 1802-1816. In this example, the recipient edge device 1616 registers a destination (e.g., destination system 1204 of FIG. 12) that is to receive the resources are part of the off-ramp scenario.

To do so, the recipient USDC digital wallet 1618 access an API (arrow 1802) of the data store and message relay system 138 to "registerOffRampUsdctoMxn," which includes parameters to specify the location to receive the funds, how this transfer is to be performed, and so on. This communication is forwarded to a resource-moving service 1620 (arrow 1804) of the institutional system 110. The resource-moving service 1620 notifies (arrow 1806) and receives an acknowledgement (arrow 1808) from the institutional USDC digital wallet 1622. The resource-moving service 1620 also queries (arrow 1810) the database 1518 to determine "how" to register this transfer. Acknowledgment (arrow 1812) is communicated back through the data store and message relay system 138 of the identity hub 108 and across the geographic boundary 1614 to the recipient USDC digital wallet 1618.

Figure 19:
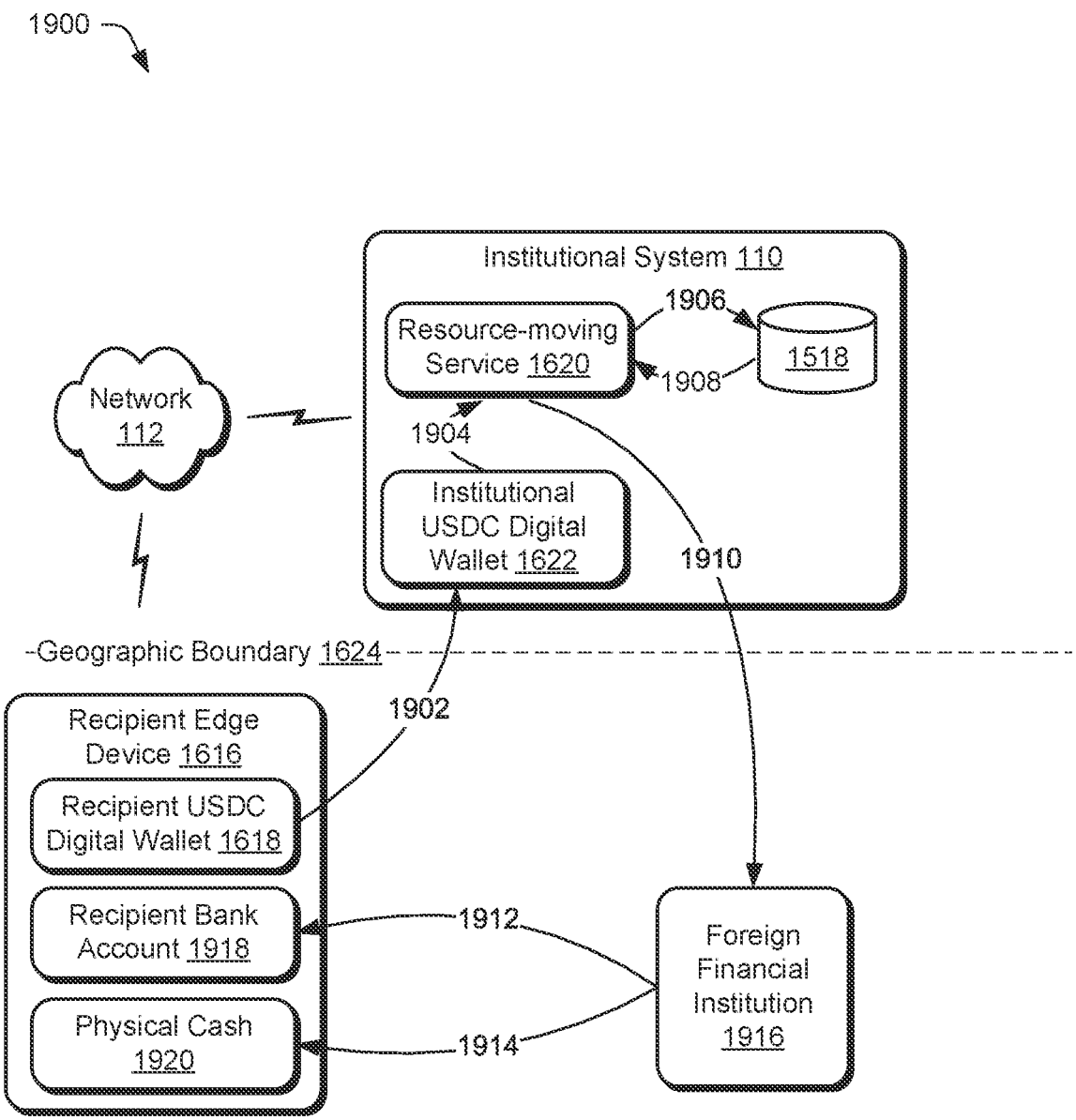
FIG. 19 is a block diagram depicting a non-limiting example system showing execution of a quote as part of an off-ramp scenario of a resource transfer from a sender edge device to a recipient edge device according to an embodiment of the present subject matter.

FIG. 19 is a block diagram depicting a non-limiting example system 1900 showing execution of a quote as part of an off-ramp scenario of a resource transfer from a sender edge device to a recipient edge device. Examples of instruction communication and data flow are depicted in this example using arrows 1902-1914. Continuing with the previous example, the recipient edge device 1616 initiates a resource transfer from the recipient USDC digital wallet 1618.

To do so, a quote is selected by the recipient edge device 1616 from quotes received in FIG. 17. The recipient edge device 1616 then transmits an indication of this acceptance (arrow 1902) to the institutional USDC digital wallet 1622. The institutional USDC digital wallet 1622 communicates (via API call shown using arrow 1904) with a resource-moving service 1620. The resource-moving service 1620 locates data associated with an identified quote from the database 1518 (via a databased read shown using arrow 1906), a result of which (arrow 1908) is used to communicate funds to a foreign financial institution 1916 located as part of the read to the database 1518.

The foreign financial institution then provides the funds as directed, e.g., to a recipient bank account 1918 (arrow 1912), as physical cash (arrow 1920), and so on. In this way, the techniques described herein support an end-to-end resource transfer using cryptographic tokens as an intermediary to cross geographic boundaries 1624 and as such overcomes limitations of conventional centralized systems.

Example System and Device

Figure 20:
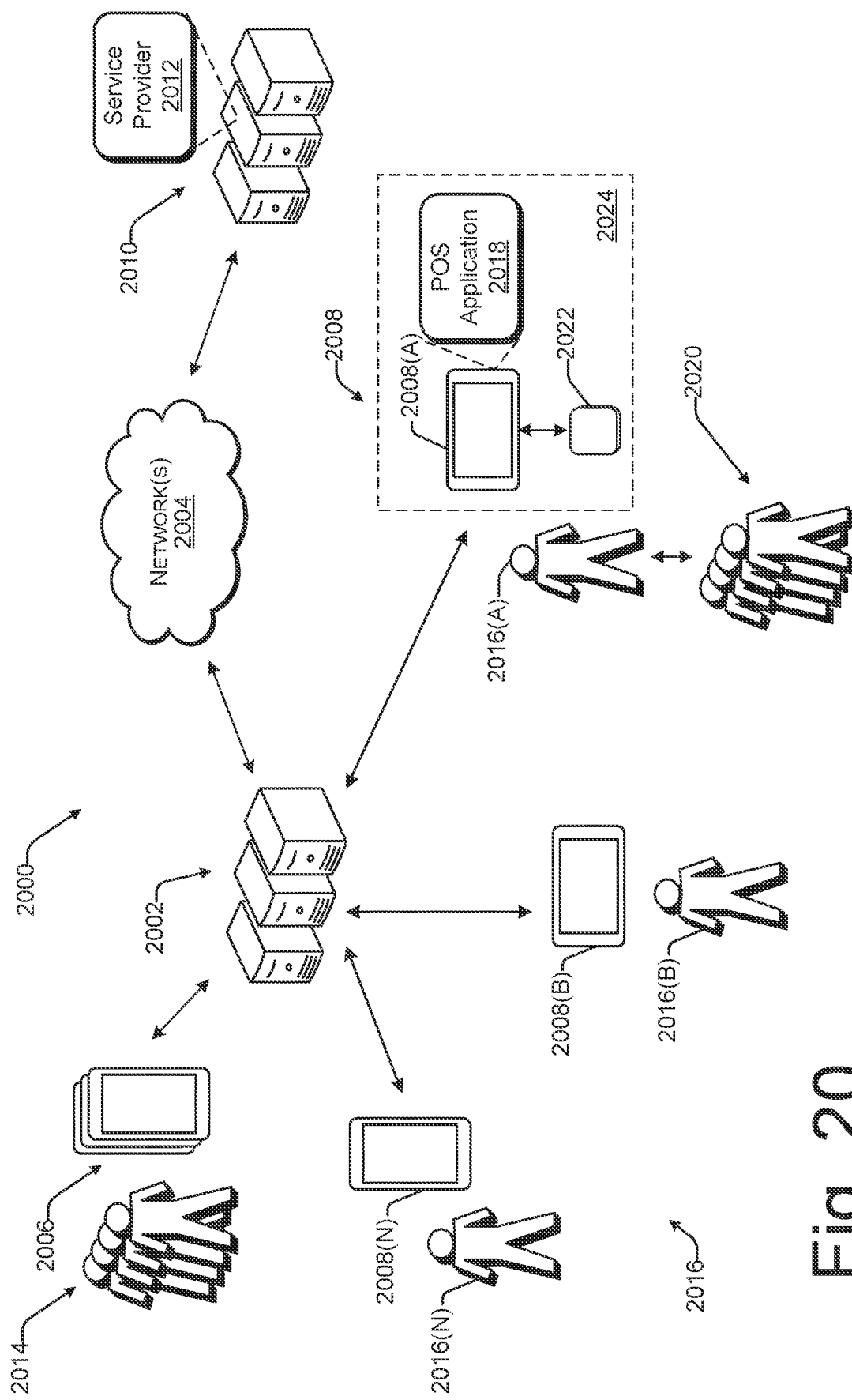
FIG. 20 illustrates an example environment that is usable to implement the blockchain supported resource transfer communication protocol techniques described herein according to an embodiment of the present subject matter.

FIG. 20 illustrates an example environment 2000. The environment 2000 includes server(s) 2002 that can communicate over a network 2004 with user devices 2006 (which, in some examples can be merchant devices 2008 (individually, 2008(A)-2008(N))) and/or server(s) 2010 associated with third-party service provider(s). The server(s) 2002 can be associated with a service provider that can provide one or more services for the benefit of users 2014, as described below. Actions attributed to the service provider 2021 can be performed by the server(s) 2002. The servers 2002, for instance, are configurable to implement the identity hub 108, institutional system 110, the resource moving service 1620, and so forth.

The environment 2000 can include a plurality of user devices 2006, as described above. Each one of the plurality of user devices 2006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 2014, e.g., artists and/or venue operations. The users 2014 can be referred to as customers, buyers, merchants, sellers, artists, borrowers, employees, employers, payors, payees, couriers, venue operators, and so on. The users 2014 can interact with the user devices 2006 via user interfaces presented via the user devices 2006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 2006 can have an instance or versioned instance of an application, which can be downloaded from an application store, for example, which can present the user interface(s) described herein. In at least one example, a user 2014 can interact with the user interface via touch input, spoken input, or any other type of input.

As described above, in at least one example, the users 2014 can include merchants 2016 (individually, 2016(A)-2016(N)). In an example, the merchants 2016 can operate respective merchant devices 2008, which can be user devices 2006 configured for use by merchants 2016. For the purpose of this discussion, a "merchant" can be any entity that offers items (e.g., goods or services) for purchase or other means of acquisition (e.g., rent, borrow, barter, etc.). The merchants 2016 can offer items for purchase or other means of acquisition via brick-and-mortar stores, mobile stores (e.g., pop-up shops, food trucks, etc.), online stores, combinations of the foregoing, and so forth. In some examples, at least some of the merchants 2016 can be associated with a same entity but can have different merchant locations and/or can have franchise/franchisee relationships. In additional or alternative examples, the merchants 2016 can be different merchants. That is, in at least one example, the merchant 2016(A) is a different merchant than the merchant 2016(B) and/or the merchant 2016(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 2008 can have an instance of a POS application 2018 stored thereon. The POS application 2018 can configure the merchant device 2008 as a POS terminal, which enables the merchant 2016(A) to interact with one or more customers 2020. As described above, the users 2014 can include customers, such as the customers 2020 shown as interacting with the merchant 2016(A). For the purpose of this discussion, a "customer" can be any entity that acquires items from merchants. While only two customers 2020 are illustrated in FIG. 20, any number of customers 2020 can interact with the merchants 2016. Further, while FIG. 20 illustrates the customers 2020 interacting with the merchant 2016(A), the customers 2020 can interact with any of the merchants 2016.

In at least one example, interactions between the customers 2020 and the merchants 2016 that involve the exchange of funds (from the customers 2020) for items (from the merchants 2016) can be referred to as "transactions." In at least one example, the POS application 2018 can determine transaction data associated with the POS transactions. Transaction data can include payment information, which can be obtained from a reader device 2022 associated with the merchant device 2008(A), user authentication data, purchase amount information, point-of-purchase information (e.g., item(s) purchased, date of purchase, time of purchase, etc.), etc. The POS application 2018 can send transaction data to the server(s) 2002 such that the server(s) 2002 can track transactions of the customers 2020, merchants 2016, and/or any of the users 2014 over time. Furthermore, the POS application 2018 can present a UI to enable the merchant 2016(A) to interact with the POS application 2018 and/or the service provider via the POS application 2018.

In at least one example, the merchant device 2008(A) can be a special-purpose computing device configured as a POS terminal (via the execution of the POS application 2018). In at least one example, the POS terminal may be connected to a reader device 2022, which is capable of accepting a variety of payment instruments, such as credit cards, debit cards, gift cards, short-range communication based payment instruments, and the like, as described below. In at least one example, the reader device 2022 can plug in to a port in the merchant device 2008(A), such as a microphone port, a headphone port, an audio-jack, a data port, or other suitable port. In additional or alternative examples, the reader device 2022 can be coupled to the merchant device 2008(A) via another wired or wireless connection, such as via a Bluetooth®, BLE, and so on. Additional details are described below with reference to FIG. 22. In some examples, the reader device 2022 can read information from alternative payment instruments including, but not limited to, wristbands and the like.

In some examples, the reader device 2022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 2022, and communicate with the server(s) 2002, which can provide, among other services, a payment processing service. The server(s) 2002 associated with the service provider can communicate with server(s) 2010, as described below. In this manner, the POS terminal and reader device 2022 may collectively process transaction(s) between the merchants 2016 and customers 2020. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 2022 of the POS system 2024 are shown as separate devices, in additional or alternative examples, the POS terminal and the reader device 2022 can be part of a single device. In some examples, the reader device 2022 can have a display integrated therein for presenting information to the customers 2020. In additional or alternative examples, the POS terminal can have a display integrated therein for presenting information to the customers 2020. POS systems, such as the POS system 2024, may be mobile, such that POS terminals and reader devices may process transactions in disparate locations across the world. POS systems can be used for processing card-present transactions and card-not-present (CNP) transactions, as described below.

A card-present transaction is a transaction where both a customer 2020 and his or her payment instrument are physically present at the time of the transaction. Card-present transactions may be processed by swipes, dips, taps, or any other interaction between a physical payment instrument (e.g., a card), or otherwise present payment instrument, and a reader device 2022 whereby the reader device 2022 is able to obtain payment data from the payment instrument. A swipe is a card-present transaction where a customer 2020 slides a card, or other payment instrument, having a magnetic strip through a reader device 2022 that captures payment data contained in the magnetic strip. A dip is a card-present transaction where a customer 2020 inserts a payment instrument having an embedded microchip (i.e., chip) into a reader device 2022 first. The dipped payment instrument remains in the payment reader until the reader device 2022 prompts the customer 2020 to remove the card, or other payment instrument. While the payment instrument is in the reader device 2022, the microchip can create a one-time code which is sent from the POS system 2024 to the server(s) 2010 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 2020 may tap or hover his or her payment instrument (e.g., card, electronic device such as a smart phone running a payment application, etc.) over a reader device 2022 to complete a transaction via short-range communication (e.g., NFC, RFID, Bluetooth®, BLE, etc.). Short-range communication enables the payment instrument to exchange information with the reader device 2022. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 2024, the server(s) 2002, and/or the server(s) 2010 may exchange payment information and transaction data to determine whether transactions are authorized. For example, the POS system 2024 may provide encrypted payment data, user authentication data, purchase amount information, point-of-purchase information, etc. (collectively, transaction data) to server(s) 2002 over the network(s) 2004. The server(s) 2002 may send the transaction data to the server(s) 2010. As described above, in at least one example, the server(s) 2010 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 2010 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 2010 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 2010 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 2010 associated therewith), and a payment authorization message is communicated from the issuer to the POS device via a path opposite of that described above, or via an alternate path.

As described above, the server(s) 2010, which can be associated with payment service provider(s), may determine whether the transaction is authorized based on the transaction data, as well as information relating to parties to the transaction (e.g., the customer 2020 and/or the merchant 2016(A)). The server(s) 2010 may send an authorization notification over the network(s) 2004 to the server(s) 2002, which may send the authorization notification to the POS system 2024 over the network(s) 2004 to indicate whether the transaction is authorized. The server(s) 2002 may also transmit additional information such as transaction identifiers to the POS system 2024. In one example, the server(s) 2002 may include a merchant application and/or other functional components for communicating with the POS system 2024 and/or the server(s) 2010 to authorize or decline transactions.

Based on the authentication notification that is received by the POS system 2024 from server(s) 2002, the merchant 2016(A) may indicate to the customer 2020 whether the transaction has been approved. In some examples, approval may be indicated at the POS system 2024, for example, at a display of the POS system 2024. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 2014 can access all of the services of the service provider. In other examples, the users 2014 can have gradated access to the services, which can be based on risk tolerance, IDV outputs, subscriptions, and so on. In at least one example, access to such services can be availed to the merchants 2016 via the POS application 2018. In additional or alternative examples, each service can be associated with its own access point (e.g., application, web browser, etc.).

The service provider can offer payment processing services for processing payments on behalf of the merchants 2016, as described above. For example, the service provider can provision payment processing software, payment processing hardware and/or payment processing services to merchants 2016, as described above, to enable the merchants 2016 to receive payments from the customers 2020 when conducting POS transactions with the customers 2020. For instance, the service provider can enable the merchants 2016 to receive cash payments, payment card payments, and/or electronic payments from customers 2020 for POS transactions and the service provider can process transactions on behalf of the merchants 2016.

As the service provider processes transactions on behalf of the merchants 2016, the service provider can maintain accounts or balances for the merchants 2016 in one or more ledgers. For example, the service provider can analyze transaction data received for a transaction to determine an amount of funds owed to a merchant 2016(A) for the transaction. In at least one example, such an amount can be a total purchase price less fees charged by the service provider for providing the payment processing services. Based on determining the amount of funds owed to the merchant 2016(A), the service provider can deposit funds into an account of the merchant 2016(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 2016(A) to a bank account of the merchant 2016(A) that is held at a bank or other financial institution (e.g., associated with the server(s) 2010). Scheduled deposits can occur at a prearranged time after a POS transaction is funded, which can be a business day after the POS transaction occurred, or sooner or later. In some examples, the merchant 2016(A) can access funds prior to a scheduled deposit. For instance, the merchant 2016(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 2016(A) can have a payment instrument that is linked to the stored balance that enables the merchant to access the funds without first transferring the funds from the account managed by the service provider to the bank account of the merchant 2016(A).

In at least one example, the service provider may provide inventory management services. That is, the service provider may provide inventory tracking and reporting. Inventory management services may enable the merchant 2016(A) to access and manage a database storing data associated with a quantity of each item that the merchant 2016(A) has available (i.e., an inventory). Furthermore, in at least one example, the service provider can provide catalog management services to enable the merchant 2016(A) to maintain a catalog, which can be a database storing data associated with items that the merchant 2016(A) has available for acquisition (i.e., catalog management services). In at least one example, the catalog may include a plurality of data items and a data item of the plurality of data items may represent an item that the merchant 2016(A) has available for acquisition. The service provider can offer recommendations related to pricing of the items, placement of items on the catalog, and multi-party fulfillment of the inventory.

In at least one example, the service provider can provide business banking services, which allow the merchant 2016(A) to track deposits (from payment processing and/or other sources of funds) into an account of the merchant 2016(A), payroll payments from the account (e.g., payments to employees of the merchant 2016(A)), payments to other merchants (e.g., business-to-business) directly from the account or from a linked debit card, withdrawals made via scheduled deposit and/or instant deposit, etc. Furthermore, the business banking services can enable the merchant 2016(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 2016 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 2016. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 2012 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 2014 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page).

Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 2016. In at least one example, the service provider can recommend and/or generate content items to supplement omni-channel presences of the merchants 2016. That is, if a merchant of the merchants 2016 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 2014 to set schedules for scheduling appointments and/or users 2014 to schedule appointments.

In some examples, the service provider can provide restaurant management services to enable users 2014 to make and/or manage reservations, to monitor front-of-house and/or back-of-house operations, and so on. In such examples, the merchant device(s) 2008 and/or server(s) 2002 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 2014 who can travel between locations to perform services for a requesting user 2014 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 2006.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 2014, voice inputs into a virtual assistant or the like, to determine intents of user(s) 2014. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 2014 may be new to the service provider such that the user 2014 that has not registered (e.g., subscribed to receive access to one or more services offered by the service provider) with the service provider. The service provider can offer onboarding services for registering a potential user 2014 with the service provider. In some examples, onboarding can involve presenting various questions, prompts, and the like to a potential user 2014 to obtain information that can be used to generate a profile for the potential user 2014. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 2014 providing all necessary information, the potential user 2014 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 2010). That is, the service provider can offer IDV services to verify the identity of users 2014 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 2014 accurately identifies the customer (or potential customer), i.e., "Is the customer who they say they are?"

The service provider is capable of providing additional or alternative services and the services described above are offered as a sampling of services. In at least one example, the service provider can exchange data with the server(s) 2010 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 2002) and/or the server(s) 2010 via the network(s) 2004. In some examples, the merchant device(s) 2008 are not capable of connecting with the service provider (e.g., the server(s) 2002) and/or the server(s) 2010, due to a network connectivity issue, for example. In additional or alternative examples, the server(s) 2002 are not capable of communicating with the server(s) 2010 due to network connectivity issue, for example. In such examples, devices may operate in "offline" mode where at least some payment data is stored (e.g., on the merchant device(s) 2008) and/or the server(s) 2002 until connectivity is restored and the payment data can be transmitted to the server(s) 2002 and/or the server(s) 2010 for processing.

In at least one example, the service provider can be associated with a hub, such as an order hub, an inventory hub, a fulfillment hub and so on, which can enable integration with one or more additional service providers (e.g., associated with the additional server(s) 2010). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 2006 that are in communication with server(s) 2002 of the service provider. That is, techniques described herein are directed to a specific implementation—or, a practical application—of utilizing a distributed system of user devices 2006 that are in communication with server(s) 2002 of the service provider to perform a variety of services, as described above. The unconventional configuration of the distributed system described herein enables the server(s) 2002 that are remotely-located from end-users (e.g., users 2014) to intelligently offer services based on aggregated data associated with the end-users, such as the users 2014 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 2014 and user devices 2006. Furthermore, such features are changed dynamically based on the profiles of the users involved interacting with the GUIs. As such, techniques described herein are directed to improvements to computing systems.

Figure 21:
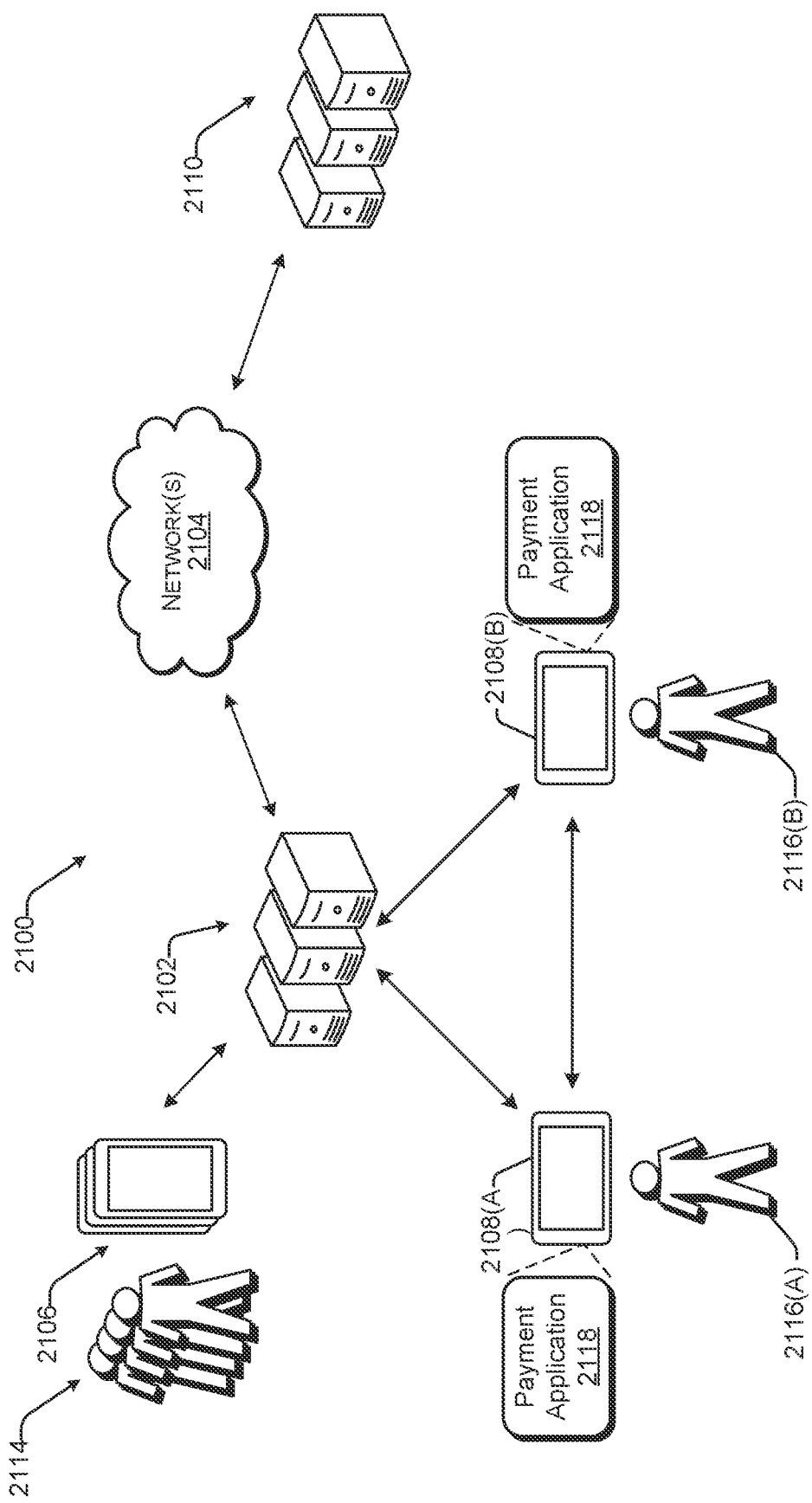
FIG. 21 illustrates an example environment that includes server(s) that can communicate over a network with user devices using payment applications and a ledger system.

FIG. 21 illustrates an example environment 2100. The environment 2100 includes server(s) 2102 that can communicate over a network 2104 with user devices 2106 (which, in some examples can be user devices 2108 (individually, 2108(A), 2108(B)) and/or server(s) 2110 associated with third-party service provider(s). The server(s) 2102 can be associated with a service provider that can provide one or more services for the benefit of users 2114, as described below. Actions attributed to the service provider can be performed by the server(s) 2102. In some examples, the service provider referenced in FIG. 20 can be the same or different than the service provider referenced in FIG. 21.

The environment 2100 can include a plurality of user devices 2106, as described above. The user devices 2106, for instance, correspond to edge devices of FIG. 1 as operating respective communication systems, e.g., applications. Each one of the plurality of user devices 2106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 2114. The users 2114 can be referred to as customers, buyers, merchants, sellers, borrowers, employees, employers, payors, payees, couriers and so on. The users 2114 can interact with the user devices 2106 via user interfaces presented via the user devices 2106. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 2106 can have an instance or versioned instance of an application, which can be downloaded from an application store, for example, which can present the user interface(s) described herein. In at least one example, a user 2114 can interact with the user interface via touch input, spoken input, or any other type of input.

In at least one example, the service provider can provide a peer-to-peer payment service that enables peer-to-peer payments between two or more users 2114. Two users, user 2116(A) and user 2116(B) are illustrated in FIG. 21 as "peers" in a peer-to-peer payment. In at least one example, the service provider can communicate with instances of a payment application 2118 (or other access point) installed on devices 2106 configured for operation by users 2114. In an example, an instance of the payment application 2118 executing on a first device 2108(A) operated by a payor (e.g., user 2116(A)) can send a request to the service provider to transfer an asset (e.g., fiat currency, non-fiat currency, digital assets, cryptocurrency, securities, gift cards, and/or related assets) from the payor to a payee (e.g., user 2116(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 22:
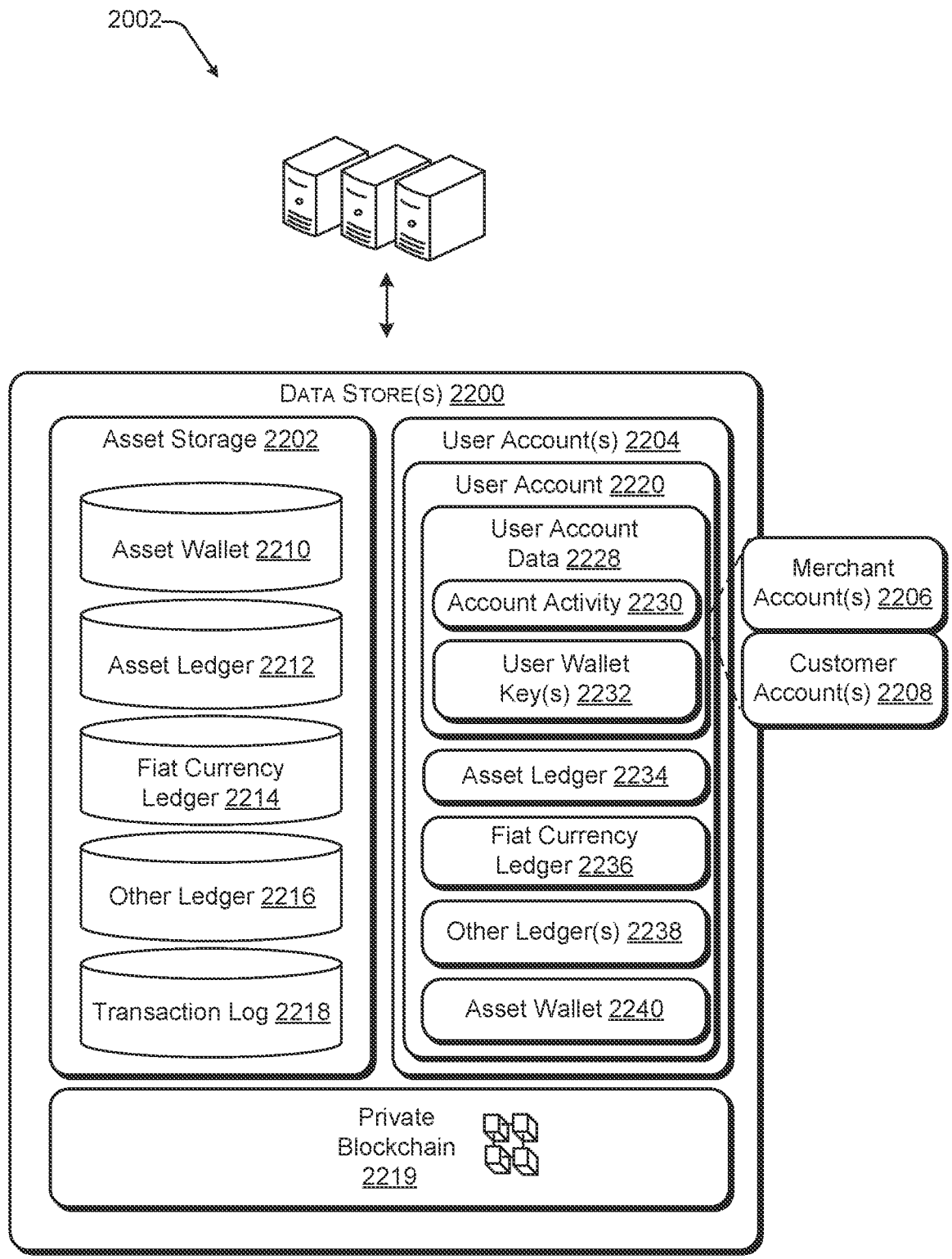
FIG. 22 is an environment associated with a ledger system with which techniques described herein can be implemented, according to an embodiment described herein.

In some examples, the service provider can utilize a ledger system to track transfers of assets between users 2114. FIG. 22, below, provides additional details associated with such a ledger system. The ledger system can enable users 2114 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 2118 executing on user device(s) of payee(s). As an example, the service provider can transfer assets from an account of user 2116(A) to an account of the user 2116(B) and can send a notification to the user device 2108(B) of the user 2116(B) for presentation via a user interface. The notification can indicate that a transfer is in process, a transfer is complete, or the like. In some examples, the service provider can send additional or alternative information to the instances of the payment application 2118 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 2102 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 2118 executing on the user devices 2106. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 21 or a third-party service provider associated with the server(s) 2110. In examples where the content provider is a third-party service provider, the server(s) 2110 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 21. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 2106 (e.g., mobile device or conventional personal computer (PC)) based on instructions transmitted to and from the server(s) 2102 (which, in such an example can be called a "messaging server"). In some instances, the messaging application can include a payment application with messaging capability that enables users of the payment application to communicate with one another. In such instances, the payment application can be executed on a user device 2106 based on instructions transmitted to and from the server(s) 2102 (e.g., the payment service discussed in this description or another payment service that supports payment transactions). In some examples, the messaging application can be provided by a third-party service provider associated with the server(s) 2110. In examples where the messaging application is a third-party service provider, the server(s) 2110 can be accessible via one or more APIs or other integrations.

As described above, the service provider can facilitate peer-to-peer transactions, which can enable users 2114 to transfer fiat currency, non-fiat currency, cryptocurrency, securities, or other assets, or portions thereof, to other users 2114. In at least one example, individual users can be associated with user accounts. Additional details associated with user accounts and the transfer of assets between users 2114 are described below with reference to FIG. 22.

Furthermore, the service provider of FIG. 21 can enable users 2114 to perform banking transactions via instances of the payment application 2118. For example, users can configure direct deposits or other deposits for adding assets to their various ledgers/balances. Further, users 2114 can configure bill pay, recurring payments, and/or the like using assets associated with their accounts. In addition to sending and/or receiving assets via peer-to-peer transactions, users 2114 buy and/or sell assets via asset networks such as cryptocurrency networks, securities networks, and/or the like.

FIG. 22 illustrates example data store(s) 2200 that can be associated with the server(s) 2102.

In at least one example, the data store(s) 2200 can store assets in an asset storage 2202, as well as data in user account(s) 2204. In some examples, user account(s) 2204 can include merchant account(s) 2206, and/or customer account(s) 2208, e.g., maintained at the institutional system 110. In at least one example, the asset storage 2202 can be used to store assets managed by the service provider of FIG. 21. In at least one example, the asset storage 2202 can be used to record whether individual of the assets are registered to users. For example, the asset storage 2202 can include an asset wallet 2210 for storing records of assets owned by the service provider of FIG. 21, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 2110 can be associated therewith. In some examples, the asset wallet 2210 can communicate with the asset network via one or more components associated with the server(s) 2102.

The asset wallet 2210 can be associated with one or more addresses and can vary addresses used to acquire assets (e.g., from the asset network(s)) so that its holdings are represented under a variety of addresses on the asset network. In examples where the service provider of FIG. 21 has its own holdings of cryptocurrency (e.g., in the asset wallet 2210), a user can acquire cryptocurrency directly from the service provider of FIG. 21. In some examples, the service provider of FIG. 21 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 2202 may contain ledgers that store records of assignments of assets to users 2114. Specifically, the asset storage 2202 may include asset ledger 2210, fiat currency ledger 2214, and other ledger(s) 2216, which can be used to record transfers of assets between users 2114 of the service provider and/or one or more third-parties (e.g., merchant network(s), payment card network(s), ACH network(s), equities network(s), the asset network, securities networks, etc.). In doing so, the asset storage 2202 can maintain a running balance of assets managed by the service provider of FIG. 21. The ledger(s) of the asset storage 2202 can further indicate some of the running balance for each of the ledger(s) stored in the asset storage 2202 is assigned or registered to one or more user account(s) 2204.

In at least one example, the asset storage 2202 can include transaction logs 2218, which can include records of past transactions involving the service provider of FIG. 21. In at least one example, transaction data, as described herein, can be stored in association with the transaction logs 2218.

In some examples, the data store(s) 2200 can store a private blockchain 2219, e.g., as implementing the blockchain system 106. A private blockchain 2219 can function to record sender addresses, recipient addresses, public keys, values of cryptocurrency transferred, and/or can be used to verify ownership of cryptocurrency tokens to be transferred. In some examples, the service provider of FIG. 21 can record transactions taking place within the service provider of FIG. 21 involving cryptocurrency until the number of transactions has exceeded a determined limit (e.g., number of transactions, storage space allocation, etc.). Based at least in part on determining that the limit has been reached, the service provider of FIG. 21 can publish the transactions in the private blockchain 2219 to a public blockchain (e.g., associated with the asset network), where miners can verify the transactions and record the transactions to blocks on the public blockchain. In at least one example, the service provider of FIG. 21 can participate as miner(s) at least for its transactions to be posted to the public blockchain.

In at least one example, the data store(s) 2200 can store and/or manage accounts, such as user account(s) 2204, merchant account(s) 2206, and/or customer account(s) 2208. In at least one example, the user account(s) 2204 may store records of user accounts associated with the users 2114. In at least one example, the user account(s) 2204 can include a user account 2220, which can be associated with a user (of the users 2114). Other user accounts of the user account(s) 2204 can be similarly structured to the user account 2220, according to some examples. In other examples, other user accounts may include more or less data and/or account information than that provided by the user account 2220. In at least one example, the user account 2220 can include user account data 2228, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 2228 can include account activity 2210 and user wallet key(s) 2212. The account activity 2210 may include a transaction log for recording transactions associated with the user account 2220. In some examples, the user wallet key(s) 2212 can include a public-private key-pair and a respective address associated with the asset network or other asset networks. In some examples, the user wallet key(s) 2212 may include one or more key pairs, which can be unique to the asset network or other asset networks.

In addition to the user account data 2228, the user account 2220 can include ledger(s) for account(s) managed by the service provider of FIG. 21, for the user. For example, the user account 2220 may include an asset ledger 2214, a fiat currency ledger 2216, and/or one or more other ledgers 2218. The ledger(s) can indicate that a corresponding user utilizes the service provider of FIG. 21 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 21.

In some examples, the asset ledger 2214 can store a balance for each of one or more cryptocurrencies (e.g., Bitcoin, Ethereum, Litecoin, etc.) registered to the user account 2220. In at least one example, the asset ledger 2214 can further record transactions of cryptocurrency assets associated with the user account 2220. For example, the user account 2220 can receive cryptocurrency from the asset network using the user wallet key(s) 2212. In some examples, the user wallet key(s) 2212 may be generated for the user upon request. User wallet key(s) 2212 can be requested by the user in order to send, exchange, or otherwise control the balance of cryptocurrency held by the service provider of FIG. 21 (e.g., in the asset wallet 2210) and registered to the user. In some examples, the user wallet key(s) 2212 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 21 and the value is credited as a balance in asset ledger 2214), by purchasing currency in the form associated with the account using currency in a different form (e.g., buying a value of cryptocurrency from the service provider of FIG. 21 using a value of fiat currency reflected in fiat currency ledger 2216, and crediting the value of cryptocurrency in asset ledger 2214), or by conducting a transaction with another user (customer or merchant) of the service provider of FIG. 21 wherein the account receives incoming currency (which can be in the form associated with the account or a different form, in which the incoming currency may be converted to the form associated with the account). In some examples, the user account data 2228 can include preferences for maintaining balances of individual of the ledgers. For example, the service provider of FIG. 21 can automatically debit the fiat currency ledger 2216 to increase the asset ledger 2214, or another account associated with the user whenever the cryptocurrency balance (e.g., of the asset ledger 2214) falls below a stated level (e.g., a threshold). Conversely, in some embodiments, the service provider of FIG. 21 can automatically credit the fiat currency ledger 2216 to decrease the asset ledger 2214 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 21 (i.e., an external account). In at least one example, the user can transfer all or a portion of a balance of the cryptocurrency stored in the third-party cryptocurrency wallet to the service provider of FIG. 21. Such a transaction can require the user to transfer an amount of the cryptocurrency in a message signed by user's private key to an address provided by the service provider of FIG. 21. In at least one example, the transaction can be sent to miners to bundle the transaction into a block of transactions and to verify the authenticity of the transactions in the block. Once a miner has verified the block, the block is written to a public, distributed blockchain where the service provider of FIG. 21 can then verify that the transaction has been confirmed and can credit the user's asset ledger 2214 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 21. As described above, in some examples, the service provider of FIG. 21 can acquire cryptocurrency from a third-party source. In such examples, the asset wallet 2210 can be associated with different addresses and can vary addresses used to acquire cryptocurrency so that its holdings are represented under a variety of addresses on a blockchain. When the service provider of FIG. 21 has their own holdings of cryptocurrency, users can acquire cryptocurrency directly from the service provider of FIG. 21. In some examples, the service provider of FIG. 21 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 21 has its own cryptocurrency assets, cryptocurrency transferred in a transaction (e.g., data with address provided for receipt of transaction and a balance of cryptocurrency transferred in the transaction) can be stored in the asset wallet 2210. In at least one example, the service provider of FIG. 21 can credit the asset ledger 2214 of the user. Additionally, while the service provider of FIG. 21 recognizes that the user retains the value of the transferred cryptocurrency through crediting the asset ledger 2214, any person that inspects the blockchain will see the cryptocurrency as having been transferred to the service provider of FIG. 21. In some examples, the asset wallet 2210 can be associated with many different addresses. In such examples, any person that inspects the blockchain may not easily associate all cryptocurrency stored in asset wallet 2210 as belonging to the same entity. It is this presence of a private ledger that is used for real-time transactions and maintained by the service provider of FIG. 21, combined with updates to the public ledger at other times, that allows for extremely fast transactions using cryptocurrency to be achieved. In some examples, the "private ledger" can refer to the asset ledger 2210, which in some examples, can utilize the private blockchain 2219, as described herein. The "public ledger" can correspond to a public blockchain associated with the asset network.

In at least one example, a user's asset ledger 2214, fiat currency ledger 2216, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 2214. In some examples, a user can receive fiat currency or another currency in the form of payment for a transaction with another user. In at least one example, at least a portion of such funds can be converted into cryptocurrency by the service provider of FIG. 21 and used to fund the asset ledger 2214 of the user.

As addressed above, in some examples, users can also have other accounts maintained by the service provider of FIG. 21. For example, a user can also have an account in U.S. dollars, which can be tracked, for example, via the fiat currency ledger 2216. Such an account can be funded by transferring money from a bank account at a third-party bank to an account maintained by the service provider of FIG. 21 as is conventionally known. In some examples, a user can receive fiat currency in the form of payment for a transaction with another user. In such examples, at least a portion of such funds can be used to fund the fiat currency ledger 2216.

In some examples, a user can have one or more internal payment cards registered with the service provider of FIG. 21. Internal payment cards can be linked to one or more of the accounts associated with the user account 2220. In some embodiments, options with respect to internal payment cards can be adjusted and managed using an application (e.g., the payment application 2118).

In at least one example, as described above, each ledger can correspond to an account of the user that is managed by the service provider of FIG. 21. In at least one example, individual of the accounts can be associated with a wallet or a stored balance for use in payment transactions, peer-to-peer transactions, payroll payments, etc.

In at least one example, the user account 2220 can be associated with an asset wallet 2240. The asset wallet 2240 of the user can be associated with account information that can be stored in the user account data 2228 and, in some examples, can be associated with the user wallet key(s) 2212. In at least one example, the asset wallet 2240 can store data indicating an address provided for receipt of a cryptocurrency transaction. In at least one example, the balance of the asset wallet 2240 can be based at least in part on a balance of the asset ledger 2214. In at least one example, funds availed via the asset wallet 2240 can be stored in the asset wallet 2240 or the asset wallet 2210. Funds availed via the asset wallet 2210 can be tracked via the asset ledger 2214. The asset wallet 2240, however, can be associated with additional cryptocurrency funds.

In at least one example, when the service provider of FIG. 21 includes a private blockchain 2219 for recording and validating cryptocurrency transactions, the asset wallet 2240 can be used instead of, or in addition to, the asset ledger 2214. For example, at least one example, a merchant can provide the address of the asset wallet 2240 for receiving payments. In an example where a customer is paying in cryptocurrency and the customer has their own cryptocurrency wallet account associated with the service provider of FIG. 21, the customer can send a message signed by its private key including its wallet address (i.e., of the customer) and identifying the cryptocurrency and value to be transferred to the merchant's asset wallet 2240. The service provider of FIG. 21 can complete the transaction by reducing the cryptocurrency balance in the customer's cryptocurrency wallet and increasing the cryptocurrency balance in the merchant's asset wallet 2240. In addition to recording the transaction in the respective cryptocurrency wallets, the transaction can be recorded in the private blockchain 2219 and the transaction can be confirmed. A user can perform a similar transaction with cryptocurrency in a peer-to-peer transaction as described above. In at least one example, the cryptocurrency wallet account 2210 can be funded by a balance transfer from a third-party cryptocurrency wallet, as described above. Such a transaction can involve transfer by a user of an amount of cryptocurrency in a message signed by the user's private key to an address of the cryptocurrency wallet account 2210. The transferred amount of cryptocurrency can then be within the cryptocurrency wallet account 2210 for use in later transactions.

While the asset ledger 2214 and/or asset wallet 2240 are each described above with reference to cryptocurrency, the asset ledger 2214 and/or asset wallet 2240 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 21 is an aspect of the technology disclosed that enables technical advantages of increased processing speed and improved security.

Figure 23:
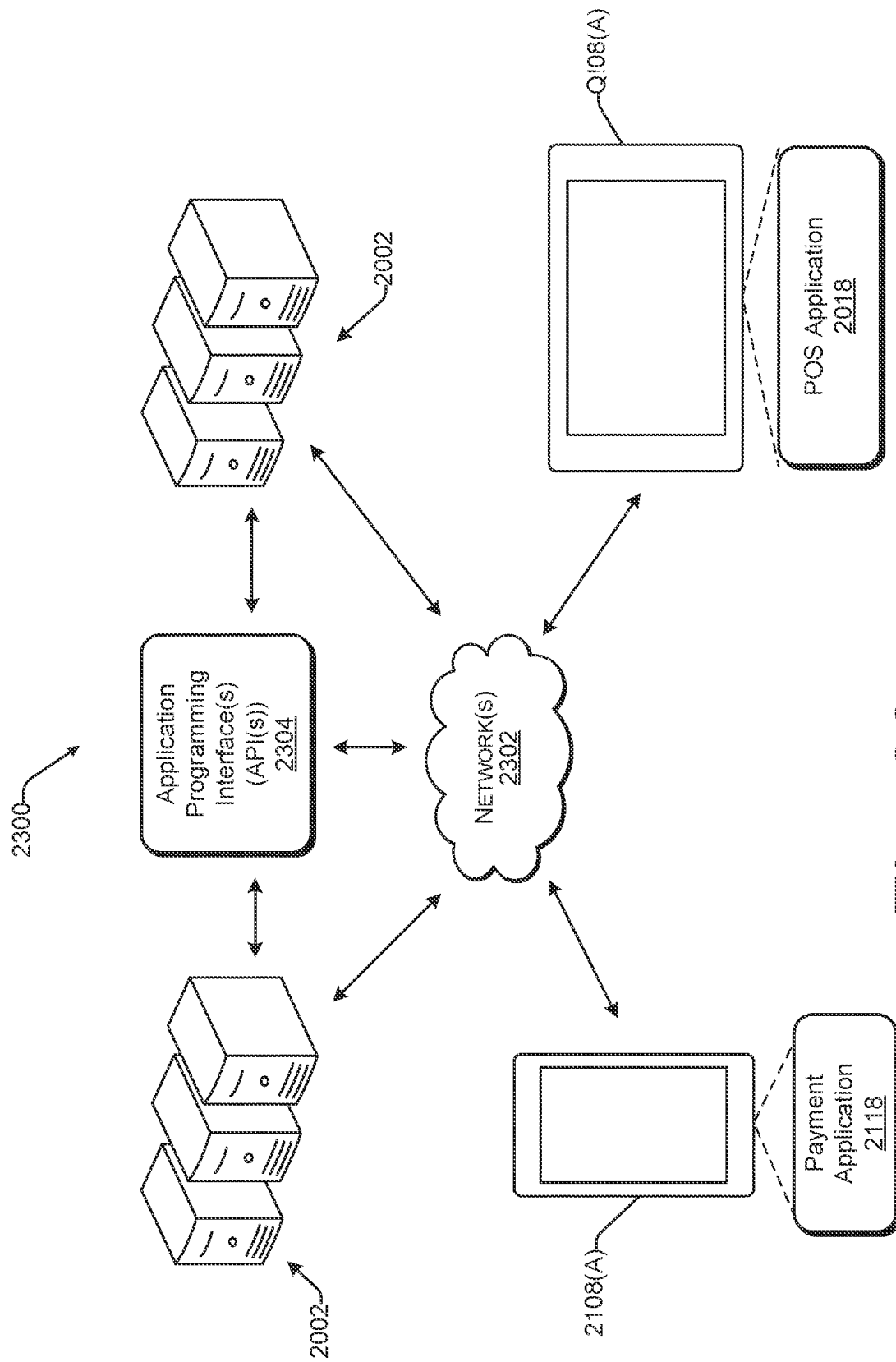
FIG. 23 illustrates an example environment wherein the environment of FIG. 20 and the environment of FIG. 21 can be integrated to enable payments at the point-of-sale using assets associated with user accounts in the peer-to-peer environment of FIG. 22.

FIG. 23 illustrates an example environment 2200 wherein the environment 2000 and the environment 2100 can be integrated to enable payments at the point-of-sale using assets associated with user accounts in the peer-to-peer environment of FIG. 21. As illustrated, each of the components can communicate with one another via one or more networks 2302. In some examples, one or more APIs 2304 or other functional components can be used to facilitate such communication.

In at least one example, the example environment 2200 can enable contactless payments, via integration of peer-to-peer payment, or other payment making, platform(s) and payment processing platform(s), are described herein. For the purpose of FIG. 22, the environment 2000 can refer to a payment processing platform and the environment 2100 can refer to a peer-to-peer payment, or payment making, platform. In an example, such an integration can enable a customer to participate in a transaction via their own computing device instead of interacting with a merchant device of a merchant, such as the merchant device 2008(A). In such an example, the POS application 2018, associated with a payment processing platform and executable by the merchant device 2008(A) of the merchant, can present a Quick Response (QR) code, or other code that can be used to identify a transaction (e.g., a transaction code), in association with a transaction between the customer and the merchant. The QR code, or other transaction code, can be provided to the POS application 2018 via an API associated with the peer-to-peer payment platform. In an example, the customer can utilize their own computing device, such as the user device 2108(A), to capture the QR code, or the other transaction code, and to provide an indication of the captured QR code, or other transaction code, to server(s) 2002 and/or server(s) 2102.

Based at least in part on the integration of the peer-to-peer payment platform and the payment processing platform (e.g., via the API), the server(s) 2002 and/or 2102 associated with each can exchange communications with each other— and with a payment application 2118 associated with the peer-to-peer payment platform and/or the POS application 2018—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 2108(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 2108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 2018 and the payment application 2118, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 2108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 2018, associated with a payment processing platform, on the merchant device 2008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 2008(A) can present a QR code, or other transaction code, that can be associated with a peer-to-peer payment platform. The customer can use a camera associated with the user device 2108(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 2018, associated with a payment processing platform, on the merchant device 2008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 2018 can cause a text message with a resource locator (e.g., uniform resource locator (URL)) that can be associated with a peer-to-peer payment platform to be sent to the user device 2108(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 2108(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 2018 of a merchant device 2008(A) at a brick-and-mortar store of a merchant to a payment application 2118 of a user device 2108(A) of a customer to enable the customer to participate in a transaction via their own computing device. For instance, in a "scan to pay" example as described above, based at least in part on capturing the QR code, or other transaction code, via the user device 2108(A), the payment processing platform can provide transaction data to the peer-to-peer payment platform for presentation via the payment application 2118 on the user device 2108(A). In some examples, the customer can watch items being added to their cart (e.g., via a user interface presented via the payment application). As an item is added to a virtual cart by the merchant—via the POS application 2018 on the merchant device 2008(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 2118 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 2108(A) during or after payment of the transaction.

In some examples, based at least in part on capturing the QR code, or other transaction code, the payment processing platform can provide transaction data to the peer-to-peer payment platform for presentation via the payment application 2118 on the computing device of the customer, such as the user device 2108(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 2118 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 2018, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 2118 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 24:
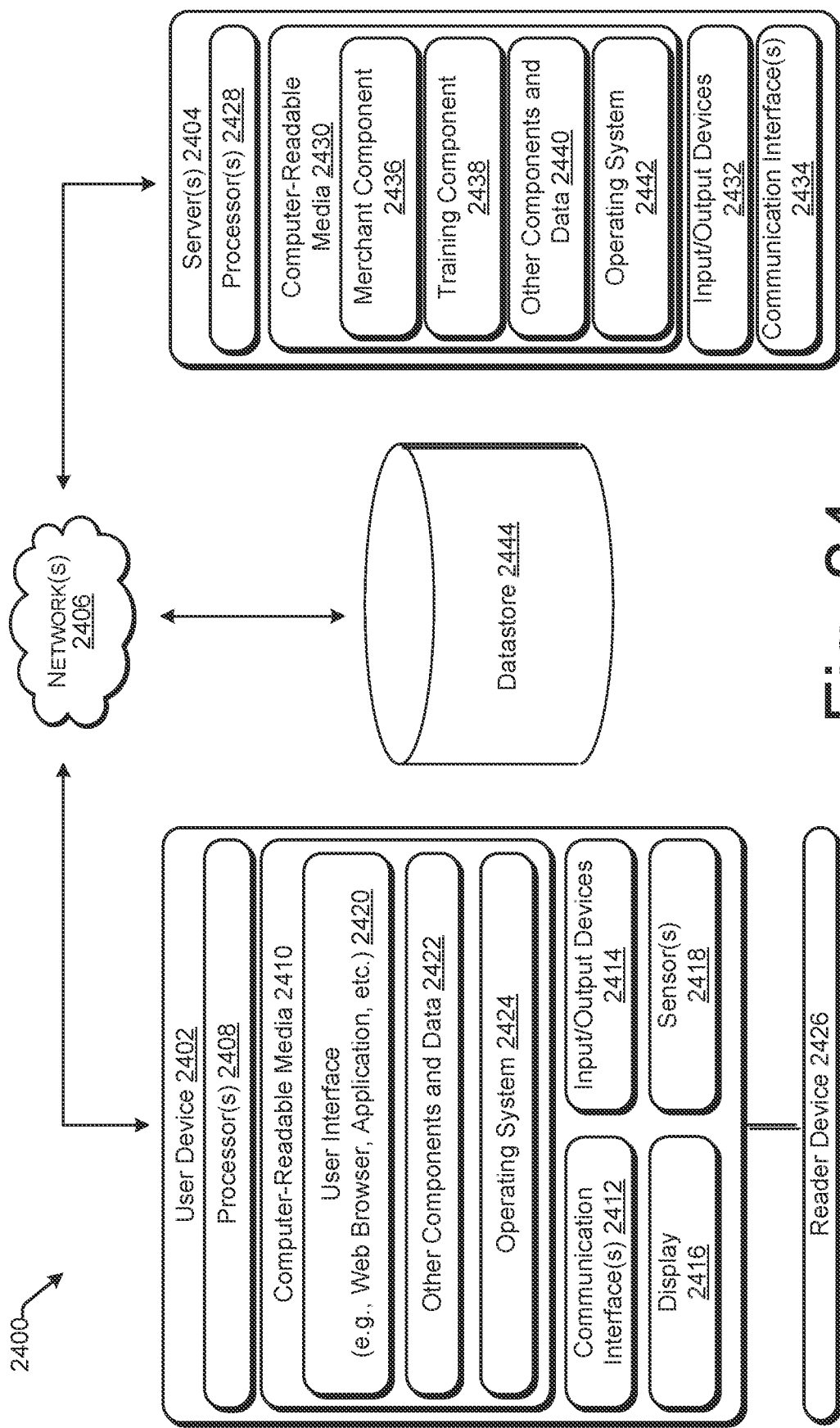
FIG. 24 depicts an illustrative block diagram illustrating a system for performing techniques described herein.

FIG. 24 depicts an illustrative block diagram illustrating a system 2400 for performing techniques described herein. The system 2400 includes a user device 2402, that communicates with server computing device(s) (e.g., server(s) 2404) via network(s) 2406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 2402 is illustrated, in additional or alternate examples, the system 2400 can have multiple user devices. These devices are configurable to implement the first and second edge devices 102, 104 as well as computing functionality of the blockchain system 106, identity hub 108, and/or institutional system 110.

In at least one example, the user device 2402 can be any suitable type of computing device, e.g., portable, semi-portable, semi-stationary, or stationary. Some examples of the user device 2402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 2402 can be any computing device capable of sending communications and performing the functions according to the techniques described herein. The user device 2402 can include devices, e.g., payment card readers, or components capable of accepting payments, as described below.

In the illustrated example, the user device 2402 includes one or more processors 2408, one or more computer-readable media 2410, one or more communication interface(s) 2412, one or more input/output (I/O) devices 2414, a display 2416, and sensor(s) 2418.

In at least one example, each processor 2408 can itself comprise one or more processors or processing cores. For example, the processor(s) 2408 can be implemented as one or more microprocessors, microcomputers, microcontrollers, digital signal processors, central processing units, state machines, logic circuitries, and/or any devices that manipulate signals based on operational instructions. In some examples, the processor(s) 2408 can be one or more hardware processors and/or logic circuits of any suitable type specifically programmed or configured to execute the algorithms and processes described herein. The processor(s) 2408 can be configured to fetch and execute computer-readable processor-executable instructions stored in the computer-readable media 2410.

Depending on the configuration of the user device 2402, the computer-readable media 2410 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 2410 can include, but is not limited to, RAM, ROM, EEPROM, flash memory, solid-state storage, magnetic disk storage, optical storage, and/or other computer-readable media technology. Further, in some examples, the user device 2402 can access external storage, such as RAID storage systems, storage arrays, network attached storage, storage area networks, cloud storage, or any other medium that can be used to store information and that can be accessed by the processor(s) 2408 directly or through another computing device or network. Accordingly, the computer-readable media 2410 can be computer storage media able to store instructions, components or components that can be executed by the processor(s) 2408. Further, when mentioned, non-transitory computer-readable media exclude media such as energy, carrier signals, electromagnetic waves, and signals per se.

The computer-readable media 2410 can be used to store and maintain any number of functional components that are executable by the processor(s) 2408. In some implementations, these functional components comprise instructions or programs that are executable by the processor(s) 2408 and that, when executed, implement operational logic for performing the actions and services attributed above to the user device 2402. Functional components stored in the computer-readable media 2410 can include a user interface 2420 to enable users to interact with the user device 2402, and thus the server(s) 2404 and/or other networked devices. In at least one example, the user interface 2420 can be presented via a web browser, or the like. In other examples, the user interface 2420 can be presented via an application, such as a mobile application or desktop application, which can be provided by a service provider associated with the server(s) 2404, or which can be an otherwise dedicated application. In some examples, the user interface 2420 can include user interfaces of output by the first and second edge devices 102, 104. In at least one example, a user can interact with the user interface via touch input, spoken input, gesture, or any other type of input. The word "input" is also used to describe "contextual" input that may not be directly provided by the user via the user interface 2420. For example, user's interactions with the user interface 2420 are analyzed using, e.g., natural language processing techniques, to determine context or intent of the user, which may be treated in a manner similar to "direct" user input.

Depending on the type of the user device 2402, the computer-readable media 2410 can also optionally include other functional components and data, such as other components and data 2422, which can include programs, drivers, etc., and the data used or generated by the functional components. In addition, the computer-readable media 2410 can also store data, data structures and the like, that are used by the functional components. Further, the user device 2402 can include many other logical, programmatic and physical components, of which those described are merely examples that are related to the discussion herein.

In at least one example, the computer-readable media 2410 can include additional functional components, such as an operating system 2424 for controlling and managing various functions of the user device 2402 and for enabling basic user interactions.

The communication interface(s) 2412 can include one or more interfaces and hardware components for enabling communication with various other devices, such as over the network(s) 2406 or directly. For example, communication interface(s) 2412 can enable communication through one or more network(s) 2406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 2406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 2402 can further include one or more input/output (I/O) devices 2414. The I/O devices 2414 can include speakers, a microphone, a camera, and various user controls (e.g., buttons, a joystick, a keyboard, a keypad, etc.), a haptic output device, and so forth. The I/O devices 2414 can also include attachments that leverage the accessories (audio-jack, USB-C, Bluetooth, etc.) to connect with the user device 2402.

In at least one example, user device 2402 can include a display 2416. Depending on the type of computing device(s) used as the user device 2402, the display 2416 can employ any suitable display technology. For example, the display 2416 can be a liquid crystal display, a plasma display, a light emitting diode display, an OLED (organic light-emitting diode) display, an electronic paper display, or any other suitable type of display able to present digital content thereon. In at least one example, the display 2416 can be an augmented reality display, a virtual reality display, or any other display able to present and/or project digital content. In some examples, the display 2416 can have a touch sensor associated with the display 2416 to provide a touchscreen display configured to receive touch inputs for enabling interaction with a graphic interface presented on the display 2416. Accordingly, implementations herein are not limited to any particular display technology. Alternatively, in some examples, the user device 2402 may not include the display 2416, and information can be presented by other means, such as aurally, haptically, etc.

In addition, the user device 2402 can include sensor(s) 2418. The sensor(s) 2418 can include a GPS device able to indicate location information. Further, the sensor(s) 2418 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users enter a brick-and-mortar store of a merchant. Location can be used in additional or alternative ways as well.

Additionally, the user device 2402 can include various other components that are not shown, examples of which include removable storage, a power source, such as a battery and power control unit, a barcode scanner, a printer, a cash drawer, and so forth.

In addition, in some examples, the user device 2402 can include, be connectable to, or otherwise be coupled to a reader device 2426, for reading payment instruments and/or identifiers associated with payment objects. In some examples, as described above, the reader device 2426 can plug in to a port in the user device 2402, such as a microphone port, a headphone port, an audio-jack, a data port, or other suitable port. In additional or alternative examples, the reader device 2426 can be coupled to the user device 2402 via another wired or wireless connection, such as via a Bluetooth®, BLE, and so on. The reader device 2426 can include a read head for reading a magnetic strip of a payment card, and further can include encryption technology for encrypting the information read from the magnetic strip. Additionally or alternatively, the reader device 2426 can be an EMV payment reader, which in some examples, can be embedded in the user device 2402. Moreover, numerous other types of readers can be employed with the user device 2402 herein, depending on the type and configuration of the user device 2402.

The reader device 2426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 2426 may include hardware implementation, such as slots, magnetic tracks, and rails with one or more sensors or electrical contacts to facilitate detection and acceptance of a payment instrument. That is, the reader device 2426 may include hardware implementations to enable the reader device 2426 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 2426 may also include a biometric sensor to receive and process biometric characteristics and process them as payment instruments, given that such biometric characteristics are registered with the payment service and connected to a financial account with a bank server.

The reader device 2426 may include processing unit(s), computer-readable media, a reader chip, a transaction chip, a timer, a clock, a network interface, a power supply, and so on. The processing unit(s) of the reader device 2426 may execute one or more components and/or processes to cause the reader device 2426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 2426, the computer-readable media may include volatile memory (such as RAM), non-volatile memory (such as ROM, flash memory, miniature hard drive, memory card, or the like), or some combination thereof. In at least one example, the computer-readable media of the reader device 2426 may include at least one component for performing various functions as described herein.

The reader chip may perform functionalities to control the operations and processing of the reader device 2426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 2406, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 2426. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 2402, which can be a POS terminal, and the reader device 2426 are shown as separate devices, in additional or alternative examples, the user device 2402 and the reader device 2426 can be part of a single device, which may be a battery-operated device. In such an example, components of both the user device 2402 and the reader device 2426 may be associated with the single device. In some examples, the reader device 2426 can have a display integrated therewith, which can be in addition to (or as an alternative of) the display 2416 associated with the user device 2402.

The server(s) 2404 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 2404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 2404 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 2404 can include one or more processors 2428, one or more computer-readable media 2430, one or more I/O devices 2432, and one or more communication interfaces 2434. Each processor 2428 can be a single processing unit or a number of processing units, and can include single or multiple computing units or multiple processing cores. The processor(s) 2428 can be implemented as one or more microprocessors, microcomputers, microcontrollers, digital signal processors, central processing units, state machines, logic circuitries, and/or any devices that manipulate signals based on operational instructions. For example, the processor(s) 2428 can be one or more hardware processors and/or logic circuits of any suitable type specifically programmed or configured to execute the algorithms and processes described herein. The processor(s) 2428 can be configured to fetch and execute computer-readable instructions stored in the computer-readable media 2430, which can program the processor(s) 2428 to perform the functions described herein.

The computer-readable media 2430 can include volatile and nonvolatile memory and/or removable and non-removable media implemented in any type of technology for storage of information, such as computer-readable instructions, data structures, program components, or other data. Such computer-readable media 2430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 2404, the computer-readable media 2430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 2430 can be used to store any number of functional components that are executable by the processor(s) 2428. In many implementations, these functional components comprise instructions or programs that are executable by the processors 2428 and that, when executed, specifically configure the one or more processors 2428 to perform the actions attributed above to the service provider and/or payment processing service. Functional components stored in the computer-readable media 2430 can optionally include the first and second communication system 116, 118, first and second digital wallets 120, 122, and functionality of the identity hub 108 and institutional system 140.

The merchant component 2436 can be configured to receive transaction data from POS systems. The merchant component 2436 can transmit requests (e.g., authorization, capture, settlement, etc.) to payment service server computing device(s) to facilitate POS transactions between merchants and customers. The merchant component 2436 can communicate the successes or failures of the POS transactions to the POS systems.

The training component 2438 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 2402 and/or the server(s) 2404 for use at a time after the data models have been trained (e.g., at runtime).

The one or more other components and data 2440 can implement the communication protocol 114 and schema 148, the functionality of which is described, at least partially, above. Further, the one or more other components and data 2440 can include programs, drivers, etc., and the data used or generated by the functional components. Further, the server(s) 2404 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that the modules generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 2430 can additionally include an operating system 2442 for controlling and managing various functions of the server(s) 2404.

The communication interface(s) 2434 can include one or more interfaces and hardware components for enabling communication with various other devices, such as over the network(s) 2406 or directly. For example, communication interface(s) 2434 can enable communication through one or more network(s) 2406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof.

Accordingly, network(s) 2406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 2404 can further be equipped with various I/O devices 2432. Such I/O devices 2432 can include a display, various user interface controls (e.g., buttons, joystick, keyboard, mouse, touch screen, biometric or sensory input devices, etc.), audio speakers, connection ports and so forth.

In at least one example, the system 2400 can include a datastore 2444 that can be configured to store data that is accessible, manageable, and updatable. In some examples, the datastore 2444 can be integrated with the user device 2402 and/or the server(s) 2404. In other examples, as shown in FIG. 24, the datastore 2444 can be located remotely from the server(s) 2404 and can be accessible to the server(s) 2404. The datastore 2444 can comprise multiple databases and/or servers connected locally and/or remotely via the network(s) 2406.

In at least one example, the datastore 2444 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 2444 can store inventory database(s) and/or catalog database(s). As described above, an inventory can store data associated with a quantity of each item that a merchant has available to the merchant. Furthermore, a catalog can store data associated with items that a merchant has available for acquisition. The datastore 2444 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   generating a network of decentralized web nodes individually configured to store, receive, and transmit data based at least in part on rules associated with the decentralized web nodes;

receiving, by a first edge device, an input to initiate a communication connection implemented at least in part using the decentralized web nodes, the input including parameters to be implemented as part of a resource transfer involving a first digital wallet associated with the first edge device for receipt by a digital wallet associated with a second edge device;

transmitting, by the first edge device via the network, a semantic message including a request-for-quote using the first digital wallet for access by a plurality of institutional systems;

receiving, by the first edge device via the network, a plurality of quotes from the plurality of institutional systems specifying attributes as part of implementing communication connection to perform the resource transfer by the plurality of institutional systems in compliance with the parameters specified by the semantic message;

transmitting, by the first edge device via the network, an acceptance message of a respective quote of the plurality of quotes to a respective said institutional system;

confirming, by the first edge device, generation of an application executable as part of a blockchain as complying with the parameters and the attributes, the application is executable as part of a distributed state machine implemented by the blockchain as a smart contract;

initiating, by the first edge device, the communication connection via the network to implement the resource transfer from the first digital wallet to the second digital wallet via the respective said institutional system; and receiving, by the first edge device, an indication of success of the resource transfer through execution of the application as part of the blockchain.

2. The method of claim 1, wherein the transmitting the semantic message includes selecting the plurality of institutional systems based at least in part on a machine-learning model.

3. The method of claim 2, wherein the machine-learning model is trained to indicate:
a probability of acceptance, respectively, of the plurality of quotes by the digital wallet; or
a probability of the plurality of institutional systems as providing a respective said quote.

4. The method of claim 1, wherein the acceptance message includes credentials of the first digital wallet and a signed hash of the quote.

5. The method of claim 1, further comprising selecting the respective quote of the plurality of quotes based at least in part on a machine-learning model.

6. The method of claim 5, wherein the machine-learning model is trained to quantify an amount of risk involved in accepting the plurality of quotes, respectively.

7. The method of claim 1, further comprising obtaining, by the device, data describing cryptographic keys and identifiers of institutional systems usable to implement the resource transfer, and wherein the transmitting of the semantic message is based on the data.

8. The method of claim 7, wherein the data is obtained by the digital wallet by crawling a decentralized identity directory space.

9. The method of claim 7, wherein the identifiers of the institutional systems are configured as decentralized identifiers (DIDs).

10. The method of claim 1, wherein the resource transfer involves a conversion between a fiat currency and at least one cryptographic token.

11. A method comprising:
receiving, by a device, a semantic message encoding parameters to be implemented as part of a resource transfer involving a digital wallet;
generating, by the device, a quote using a machine-learning model, the quote specifying attributes as part of implementing communication connections to perform the resource transfer in compliance with the parameters specified by the semantic message;
receiving, by the device, an acceptance message indicating acceptance of the quote, the acceptance message including credentials of the digital wallet;
initiating, by the device, generation of an application executable as part of a blockchain as complying with the parameters and the attributes;
transmitting, by the device, data describing the application as executable as part of the blockchain for distribution to the digital wallet; and
initiating, by the device, the resource transfer through execution of the application as part of the blockchain.

12. The method of claim 11, wherein the generating the quote is based at least in part on the machine-learning model trained to determine a probability of acceptance, of the quote by the digital wallet.

13. The method of claim 11, wherein the generating the quote is based at least in part on the machine-learning model trained to quantify an amount of risk involved in the resource transfer.

14. The method of claim 13, wherein the amount of risk is used as a basis to determine whether to provide the quote or an amount of resources to be requested to perform the resource transfer.

15. The method of claim 11, wherein the application is executable as part of a distributed state machine implemented by the blockchain as a smart contract.

16. The method of claim 11, wherein the quote includes cryptographic keys and a decentralized identifier usable to perform the resource transfer.

17. The method of claim 11, wherein the application is executable as part of a distributed state machine implemented by the blockchain as a smart contract.

18. A system comprising:
a processing device; and
a computer-readable storage medium storing instructions that, responsive to execution by the processing device, causes the processing device to perform operation including:
transmitting a semantic message encoding parameters using a digital wallet for distribution to a plurality of institutional systems, the parameters to be implemented as part of a resource transfer involving a digital wallet;
receiving a plurality of quotes specifying attributes as part of implementing communication connections to perform the resource transfer by the plurality of institutional systems in compliance with the parameters specified by the semantic message;
transmitting an acceptance message of a quote of the plurality of quotes to a respective said institutional system;
confirming generation of an application executable as part of a blockchain as complying with the parameters and the attributes, the application is executable as part of a distributed state machine implemented by the blockchain as a smart contract; and initiating the communication connection to implement the resource transfer to the respective said institutional system.

19. The system of claim 18, wherein the transmitting the semantic message includes selecting the plurality of institutional systems based at least in part on a machine-learning model.

20. The system of claim 19, wherein the machine-learning model is trained to indicate:
 a probability of the plurality of institutional systems as providing a respective said quote; or
 a probability of acceptance, respectively, of the plurality of quotes by the digital wallet.

\* \* \* \* \*